United States Patent
Yu et al.

(10) Patent No.: US 8,571,133 B2
(45) Date of Patent: Oct. 29, 2013

(54) METHOD AND APPARATUS FOR TRANSMITTING A SIGNAL WITHIN A PREDETERMINED SPECTRAL MASK

(75) Inventors: Zhi-Zhong Yu, Farnborough (GB); Mungal S. Dhanda, Slough (GB)

(73) Assignee: QUALCOMM Incorporated, San Diego, CA (US)

( * ) Notice: Subject to any disclaimer, the term of this patent is extended or adjusted under 35 U.S.C. 154(b) by 759 days.

(21) Appl. No.: 12/701,686

(22) Filed: Feb. 8, 2010

(65) Prior Publication Data

US 2010/0203854 A1 Aug. 12, 2010

Related U.S. Application Data

(60) Provisional application No. 61/151,497, filed on Feb. 10, 2009, provisional application No. 61/153,285, filed on Feb. 17, 2009, provisional application No. 61/240,012, filed on Sep. 4, 2009.

(51) Int. Cl.
*H04L 27/00* (2006.01)

(52) U.S. Cl.
USPC ............. 375/295; 455/91; 455/450; 455/500; 455/509; 375/146

(58) Field of Classification Search
None
See application file for complete search history.

(56) References Cited

U.S. PATENT DOCUMENTS

2006/0209986 A1   9/2006   Jensen et al.

FOREIGN PATENT DOCUMENTS

| EP | 1833200 | 9/2007 |
| WO | WO2005032087 | 4/2005 |

OTHER PUBLICATIONS

International Search Report and Written Opinion—PCT/US2010/023748, International Search Authority—European Patent Office—Nov. 11, 2010.

*Primary Examiner* — Adolf Dsouza
(74) *Attorney, Agent, or Firm* — QUALCOMM Patent Group; James Hunt Yancey, Jr.

(57) ABSTRACT

An apparatus and method are described for transmitting a signal within a predetermined spectral mask defining a range of power density limits across a frequency range. A signal source provides an input signal to a low-pass filter, which filters the input signal to produce a filtered signal. The filter is selectively operable in a first mode in which the input signal is filtered within a narrower bandwidth, and in a second mode in which the input signal is filtered within a broader bandwidth. The filtered signal is output to a modulator, which modulates the filtered signal to produce a modulated signal. The modulated signal is output to a transmitter, which transmits the modulated signal.

41 Claims, 37 Drawing Sheets

US 8,571,133 B2

METHOD AND APPARATUS FOR TRANSMITTING A SIGNAL WITHIN A PREDETERMINED SPECTRAL MASK

CLAIM OF PRIORITY UNDER 35 U.S.C. §119

The present Application for Patent claims priority to Provisional Application No. 61/151,497, entitled "Method and Apparatus for Transmitting a Signal Within a Predetermined Spectral Mask" filed Feb. 10, 2009; Provisional Application No. 61/153,285, entitled "Method and Apparatus for Transmitting a Signal Withing a Predetermined Spectral Mask" filed Feb. 17, 2009; and Provisional Application No. 61/240,012, entitled "Method of Adapting Pulse Shape of Data Pulses For Transmission In a Digital Communications System" filed Sep. 4, 2009 and hereby expressly incorporated by reference herein.

FIELD OF THE INVENTION

The invention relates generally to the field of radio communications and in particular to the increasing of channel capacity in a radio communications system.

BACKGROUND

More and more people are using mobile communication devices, such as, for example, mobile phones, not only for voice but also for data communications. In the GSM/EDGE Radio Access Network (GERAN) specification, GPRS and EGPRS provide data services. The standards for GERAN are maintained by the 3GPP (Third Generation Partnership Project). GERAN is a part of Global System for Mobile Communications (GSM). More specifically, GERAN is the radio part of GSM/EDGE together with the network that joins the base stations (the Ater and Abis interfaces) and the base station controllers (A interfaces, etc.). GERAN represents the core of a GSM network. It routes phone calls and packet data from and to the PSTN and Internet and to and from remote stations, including mobile stations. UMTS (Universal Mobile Telecommunications System) standards have been adopted in GSM systems, for third-generation communication systems employing larger bandwidths and higher data rates. GERAN is also a part of combined UMTS/GSM networks.

The following issues are present in today's networks. First, more traffic channels are needed which is a capacity issue. Since there is a higher demand of data throughput on the downlink (DL) than on the uplink (UL), the DL and UL usages are not symmetrical. For example a mobile station (MS) doing FTP transfer is likely to be given 4D1U, which could mean that it takes four users resources for full rate, and eight users resources for half rate. As it stands at the moment, the network has to make a decision whether to provide service to 4 or 8 callers on voice or 1 data call. More resources will be necessary to enable DTM (dual transfer mode) where both data calls and voice calls are made at the same time.

Second, if a network serves a data call while many new users also want voice calls, the new users will not get service unless both UL and DL resources are available. Therefore some UL resource could be wasted. On the one hand, there are customers waiting to make calls and no service can be made; on the other hand, the UL is available but wasted due to lack of pairing DL.

Third, there is less time for mobile stations (also known as User Equipment or UE) working in multi-timeslot mode to scan neighbor cells and monitor them, which may cause call drops and performance issues.

FIG. 1 shows a block diagram of a transmitter 118 and a receiver 150 in a wireless communication system. For the downlink, the transmitter 118 may be part of a base station, and receiver 150 may be part of a wireless device (remote station). For the uplink, the transmitter 118 may be part of a wireless device, and receiver 150 may be part of a base station. A base station is generally a fixed station that communicates with the wireless devices and may also be referred to as a Node B, an evolved Node B (eNode B), an access point, etc. A wireless device may be stationary or mobile and may also be referred to as a remote station, a mobile station, user equipment, mobile equipment, a terminal, a remote terminal, an access terminal, a station, etc. A wireless device may be a cellular phone, a personal digital assistant (PDA), a wireless modem, a wireless communication device, a handheld device, a subscriber unit, a laptop computer, etc.

At transmitter 118, a transmit (TX) data processor 120 receives and processes (e.g., formats, encodes, and interleaves) data and provides coded data. A modulator 130 performs modulation on the coded data and provides a modulated signal. Modulator 130 may perform Gaussian minimum shift keying (GMSK) for GSM, 8-ary phase shift keying (8-PSK) for Enhanced Data rates for Global Evolution (EDGE), etc. GMSK is a continuous phase modulation protocol whereas 8-PSK is a digital modulation protocol. A transmitter unit (TMTR) 132 conditions (e.g., filters, amplifies, and upconverts) the modulated signal and generates an RF modulated signal, which is transmitted via an antenna 134.

At receiver 150, an antenna 152 receives RF modulated signals from transmitter 110 and other transmitters. Antenna 152 provides a received RF signal to a receiver unit (RCVR) 154. Receiver unit 154 conditions (e.g., filters, amplifies, and downconverts) the received RF signal, digitizes the conditioned signal, and provides samples. A demodulator 160 processes the samples as described below and provides demodulated data. A receive (RX) data processor 170 processes (e.g., deinterleaves and decodes) the demodulated data and provides decoded data. In general, the processing by demodulator 160 and RX data processor 170 is complementary to the processing by modulator 130 and TX data processor 120, respectively, at transmitter 110.

Controllers/processors 140 and 180 direct operation at transmitter 118 and receiver 150, respectively. Memories 142 and 182 store program codes in the form of computer software and data used by transmitter 118 and receiver 150, respectively.

FIG. 2 shows a block diagram of a receiver unit 154 and demodulator 160 at receiver 150 in FIG. 1. Within receiver unit 154, a receive chain 440 processes the received RF signal and provides I and Q baseband signals, which are denoted as $I_{bb}$ and $Q_{bb}$. Receive chain 440 may perform low noise amplification, analog filtering, quadrature downconversion, etc. An analog-to-digital converter (ADC) 442 digitizes the I and Q baseband signals at a sampling rate of $f_{adc}$ and provides I and Q samples, which are denoted as $I_{adc}$ and $Q_{adc}$. In general, the ADC sampling rate $f_{adc}$ may be related to the symbol rate $f_{sym}$ by any integer or non-integer factor.

Within demodulator 160, a pre-processor 420 performs pre-processing on the I and Q samples from ADC 442. For example, pre-processor 420 may remove direct current (DC) offset, remove frequency offset, etc. An input filter 422 filters the samples from pre-processor 420 based on a particular frequency response and provides input I and Q samples, which are denoted as $I_{in}$ and $Q_{in}$. Filter 422 may filter the I and Q samples to suppress images resulting from the sampling by ADC 442 as well as jammers. Filter 422 may also perform sample rate conversion, e.g., from 24× oversampling down to 2× oversampling. A data filter 424 filters the input I and Q samples from input filter 422 based on another frequency response and provides output I and Q samples, which are denoted as $I_{out}$ and $Q_{out}$. Filters 422 and 424 may be implemented with finite impulse response (FIR) filters, infinite impulse response (IIR) filters, or filters of other types. The frequency responses of filters 422 and 424 may be selected to achieve good performance. In one design, the frequency response of filter 422 is fixed, and the frequency response of filter 424 is configurable.

An adjacent channel interference (ACI) detector 430 receives the input I and Q samples from filter 422, detects for ACI in the received RF signal, and provides an ACI indicator to filter 424. The ACI indicator may indicates whether or not ACI is present and, if present, whether the ACI is due to the higher RF channel centered at +200 KHz and/or the lower RF channel centered at −200 KHz. The frequency response of filter 424 may be adjusted based on the ACI indicator, as described below, to achieve good performance.

An equalizer/detector 426 receives the output I and Q samples from filter 424 and performs equalization, matched filtering, detection, and/or other processing on these samples. For example, equalizer/detector 426 may implement a maximum likelihood sequence estimator (MLSE) that determines a sequence of symbols that is most likely to have been transmitted given a sequence of I and Q samples and a channel estimate.

The Global System for Mobile Communications (GSM) is a widespread standard in cellular, wireless communication. GSM employs a combination of Time Division Multiple Access (TDMA) and Frequency Division Multiple Access (FDMA) for the purpose of sharing the spectrum resource. GSM networks typically operate in a number of frequency bands. For example, for uplink communication, GSM-900 commonly uses a radio spectrum in the 890-915 MHz bands (Mobile Station to Base Transceiver Station). For downlink communication, GSM 900 uses 935-960 MHz bands (base station to mobile station). Furthermore, each frequency band is divided into 200 kHz carrier frequencies providing 124 RF channels spaced at 200 kHz. GSM-1900 uses the 1850-1910 MHz bands for the uplink and 1930-1990 MHz bands for the downlink. Like GSM 900, FDMA divides the GSM-1900 spectrum for both uplink and downlink into 200 kHz-wide carrier frequencies. Similarly, GSM-850 uses the 824-849 MHz bands for the uplink and 869-894 MHz bands for the downlink, while GSM-1800 uses the 1710-1785 MHz bands for the uplink and 1805-1880 MHz bands for the downlink.

Each channel in GSM is identified by a specific absolute radio frequency channel identified by an Absolute Radio Frequency Channel Number or ARFCN. For example, ARFCN 1-124 are assigned to the channels of GSM 900, while ARFCN 512-810 are assigned to the channels of GSM 1900. Similarly, ARFCN 128-251 are assigned to the channels of GSM 850, while ARFCN 512-885 are assigned to the channels of GSM 1800. Also, each base station is assigned one or more carrier frequencies. Each carrier frequency is divided into eight time slots (which are labeled as time slots 0 through 7) using TDMA such that eight consecutive time slots form one TDMA frame with a duration of 4.615 ms. A physical channel occupies one time slot within a TDMA frame. Each active wireless device/user is assigned one or more time slot indices for the duration of a call. User-specific data for each wireless device is sent in the time slot(s) assigned to that wireless device and in TDMA frames used for the traffic channels.

Each time slot within a frame is used for transmitting a "burst" of data in GSM. Sometimes the terms time slot and burst may be used interchangeably. Each burst includes two tail fields, two data fields, a training sequence (or midamble) field, and a guard period (GP). The number of symbols in each field is shown inside the parentheses. A burst includes 148 symbols for the tail, data, and midamble fields. No symbols are sent in the guard period. TDMA frames of a particular carrier frequency are numbered and formed in groups of 26 or 51 TDMA frames called multi-frames.

FIG. 3 shows example frame and burst formats in GSM. The timeline for transmission is divided into multiframes. For traffic channels used to send user-specific data, each multi-frame in this example includes 26 TDMA frames, which are labeled as TDMA frames 0 through 25. The traffic channels are sent in TDMA frames 0 through 11 and TDMA frames 13 through 24 of each multiframe. A control channel is sent in TDMA frame 12. No data is sent in idle TDMA frame 25, which is used by the wireless devices to make measurements for neighbor base stations.

FIG. 4 shows an example spectrum in a GSM system. In this example, five RF modulated signals are transmitted on five RF channels that are spaced apart by 200 KHz. The RF channel of interest is shown with a center frequency of 0 Hz. The two adjacent RF channels have center frequencies that are +200 KHz and −200 KHz from the center frequency of the desired RF channel. The next two nearest RF channels (which are referred to as blockers or non-adjacent RF channels) have center frequencies that are +400 KHz and −400 KHz from the center frequency of the desired RF channel. There may be other RF channels in the spectrum, which are not shown in FIG. 3 for simplicity. In GSM, an RF modulated signal is generated with a symbol rate of $f_{sym}=13000/40=270.8$ kilo symbols/second (Ksps) and has a −3 dB bandwidth of up to ±135 KHz. The RF modulated signals on adjacent RF channels may thus overlap one another at the edges, as shown in FIG. 4.

One or more modulation schemes are used in GSM to communicate information such as voice, data, and/or control information. Examples of the modulation schemes may include GMSK (Gaussian Minimum Shift Keying), M-ary QAM (Quadrature Amplitude Modulation) or M-ary PSK (Phase Shift Keying), where $M=2^n$, with n being the number of bits encoded within a symbol period for a specified modulation scheme. GMSK, is a constant envelope binary modulation scheme allowing raw transmission at a maximum rate of 270.83 kilobits per second (Kbps).

GSM is efficient for standard voice services. However, high-fidelity audio and data services desire higher data throughput rates due to increased demand on capacity to transfer both voice and data services To increase capacity, the General Packet Radio Service (GPRS), EDGE (Enhanced Data rates for GSM Evolution) and UMTS (Universal Mobile Telecommunications System) standards have been adopted in GSM systems.

General Packet Radio Service (GPRS) is a non-voice service. It allows information to be sent and received across a mobile telephone network. It supplements Circuit Switched Data (CSD) and Short Message Service (SMS). GPRS employs the same modulation schemes as GSM. GPRS allows for an entire frame (all eight time slots) to be used by a single mobile station at the same time. Thus, higher data throughput rates are achievable.

The EDGE standard uses both the GMSK modulation and 8-PSK modulation. Also, the modulation type can be changed from burst to burst. 8-PSK modulation in EDGE is a linear, 8-level phase modulation with $3\pi/8$ rotation, while GMSK is a non-linear, Gaussian-pulse-shaped frequency modulation. However, the specific GMSK modulation used in GSM can be approximated with a linear modulation (i.e., 2-level phase modulation with a π/2 rotation). The symbol pulse of the approximated GMSK and the symbol pulse of 8-PSK are identical.

In GSM/EDGE, frequency bursts (FB) are sent regularly by the Base Station (BS) to allow Mobile Stations (MS) to synchronize their Local Oscillator (LO) to the Base Station LO, using frequency offset estimation and correction. These bursts comprise a single tone, which corresponds to an all "0" payload and training sequence. The all zero payload of the frequency burst is a constant frequency signal, or a single tone burst. When in power-on or camp-on mode or when first accessing the network, the remote station hunts continuously for a frequency burst from a list of carriers. Upon detecting a frequency burst, the MS will estimate the frequency offset relative to its nominal frequency, which is 67.7 KHz from the carrier. The MS LO will be corrected using this estimated frequency offset. In power-on mode, the frequency offset can be as much as +/−19 KHz. The MS will periodically wake up to monitor the frequency burst to maintain its synchronization in standby mode. In the standby mode, the frequency offset is within ±2 KHz.

Modern mobile cellular telephones are able to provide conventional voice calls and data calls. The demand for both types of calls continues to increase, placing increasing demands on network capacity. Network operators address this demand by increasing their capacity. This is achieved for example by dividing or adding cells and hence adding more base stations, which increases hardware costs. It is desirable to increase network capacity without unduly increasing hardware costs, in particular to cope with unusually large peak demand during major events such as an international football match or a major festival, in which many users or subscribers who are located within a small area wish to access the network at one time. When a first remote station is allocated a channel for communication (a channel comprising a channel frequency and a time slot), a second remote station can only use the allocated channel after the first remote station has finished using the channel. Maximum cell capacity is reached when all the allocated channel frequencies are used in the cell and all available time slots are either in use or allocated. This means that any additional remote station user will not be able to get service. In reality, another capacity limit exists due to co-channel interferences (CCI) and adjacent channel interferences (ACI) introduced by high frequency re-use pattern and high capacity loading (such as 80% of timeslots and channel frequencies).

Network operators have addressed this problem in a number of ways, all of which require added resources and added cost. For example, one approach is to divide cells into sectors by using sectored, or directional, antenna arrays. Each sector can provide communications for a subset of remote stations within the cell and the interference between remote stations in different sectors is less than if the cell were not divided into sectors and all the remote stations were in the same cell. Another approach is to divide cells into smaller cells, each new smaller cell having a base station. Both these approaches are expensive to implement due to added network equipment. In addition, adding cells or dividing cells into several smaller cells can result in remote stations within one cell experiencing more CCI and ACI interference from neighboring cells because the distance between cells is reduced.

SUMMARY OF THE INVENTION

The invention is defined by the appended claims comprising: a transmitting apparatus; a method; a computer readable medium; and a computer program product.

BRIEF DESCRIPTION OF THE DRAWINGS

The above and further features of the invention are set forthwith particularity in the appended claims and together with advantages thereof will become clearer from consideration of the following detailed description of exemplary embodiments of the invention given by way of example with reference to the accompanying drawings wherein:

DETAILED DESCRIPTION

Figure 1:
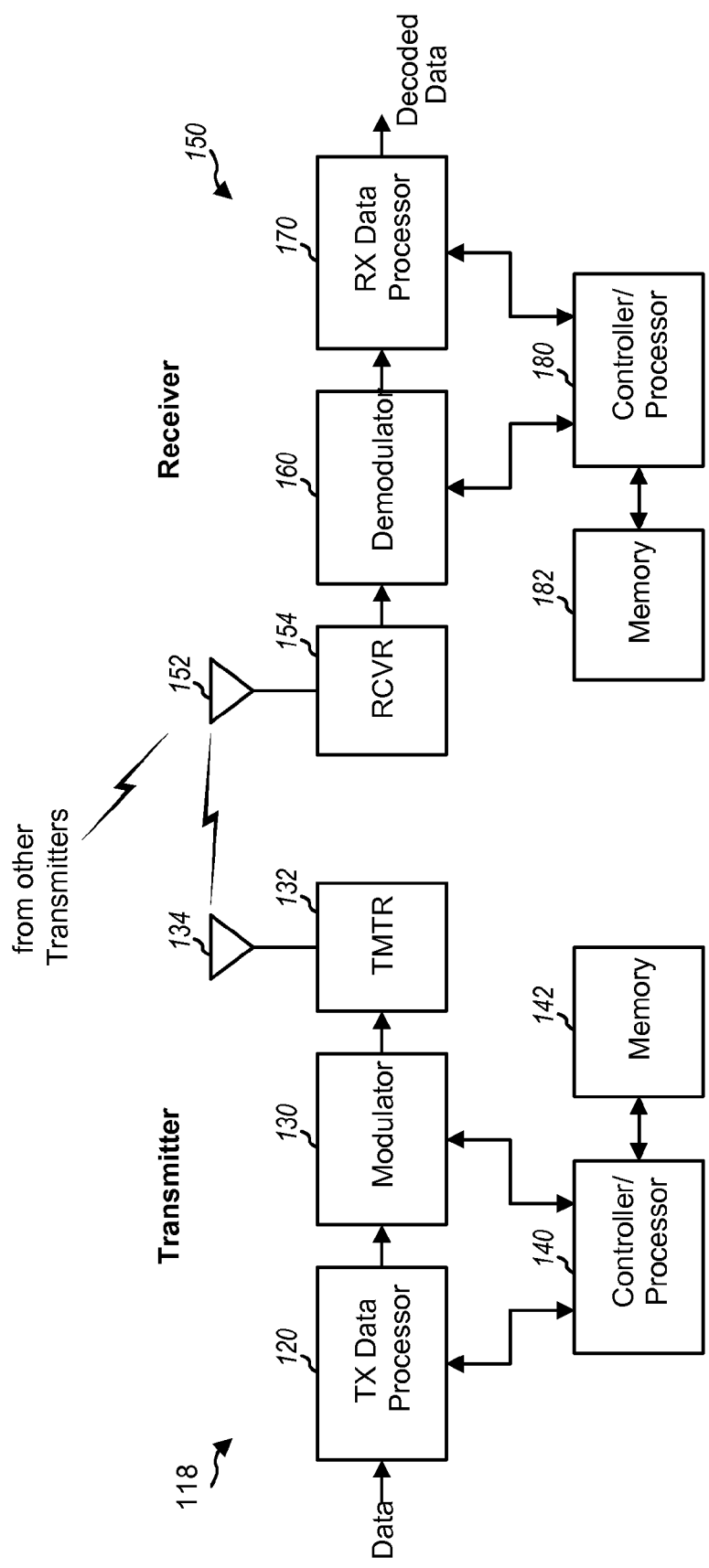
FIG. 1 shows a block diagram of a transmitter and a receiver.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well known structures and devices are shown in block diagram form in order to avoid obscuring the concepts of the present invention.

Interference due to other users limits the performance of wireless networks. This interference can take the form of either interference from neighboring cells on the same frequency, known as CCI, discussed above, or neighboring frequencies on the same cell, known as ACI, also discussed above.

Single-antenna interference cancellation (SAIC) is used to reduce Co-Channel Interference (CCI), The 3G Partnership Project (3GPP) has standardized SAIC performance. SAIC is a method used to combat interference. The 3GPP adopted downlink advanced receiver performance (DARP) to describe the receiver that applies SAIC.

DARP increases network capacity by employing lower reuse factors. Furthermore, it suppresses interference at the same time. DARP operates at the baseband part of a receiver of a remote station. It suppresses adjacent-channel and co-channel interference that differ from general noise. DARP is available in previously defined GSM standards (since Rel-6 in 2004) as a release-independent feature, and is an integral part of Rel-6 and later specs. The following is a description of two DARP methods.

The first DARP method is the joint detection/demodulation (JD) method. JD uses knowledge of the GSM signal structure in adjacent cells in synchronous mobile networks to demodulate one of several interference signals in addition to the desired signal. JD's ability to retrieve interference signals allows the suppression of specific adjacent-channel interferers. In addition to demodulating GMSK signals, JD also can be used to demodulate EDGE signals.

The second DARP method is blind interferer cancellation (BIC). With BIC, the receiver has no knowledge of the structure of any interfering signals that may be received at the same time that the desired signal is received. Since the receiver is effectively "blind" to any adjacent-channel interferers, the method attempts to suppress the interfering component as a whole. The GMSK signal is demodulated from the wanted carrier by the BIC method. BIC is most effective when used for GMSK-modulated speech and data services and can be used in asynchronous networks.

Figure 2:
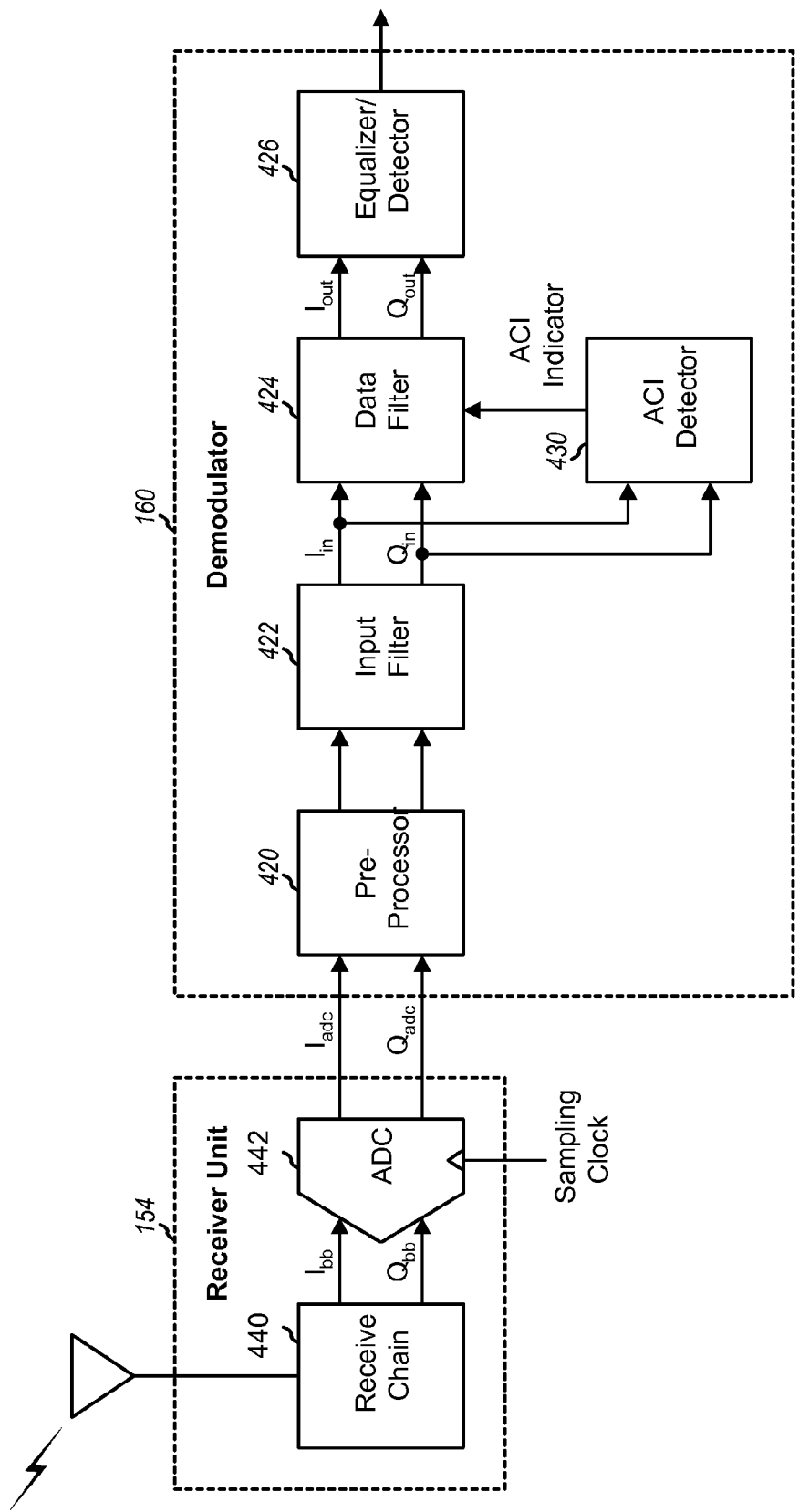
FIG. 2 shows a block diagram of a receiver unit and a demodulator.
Figure 3:
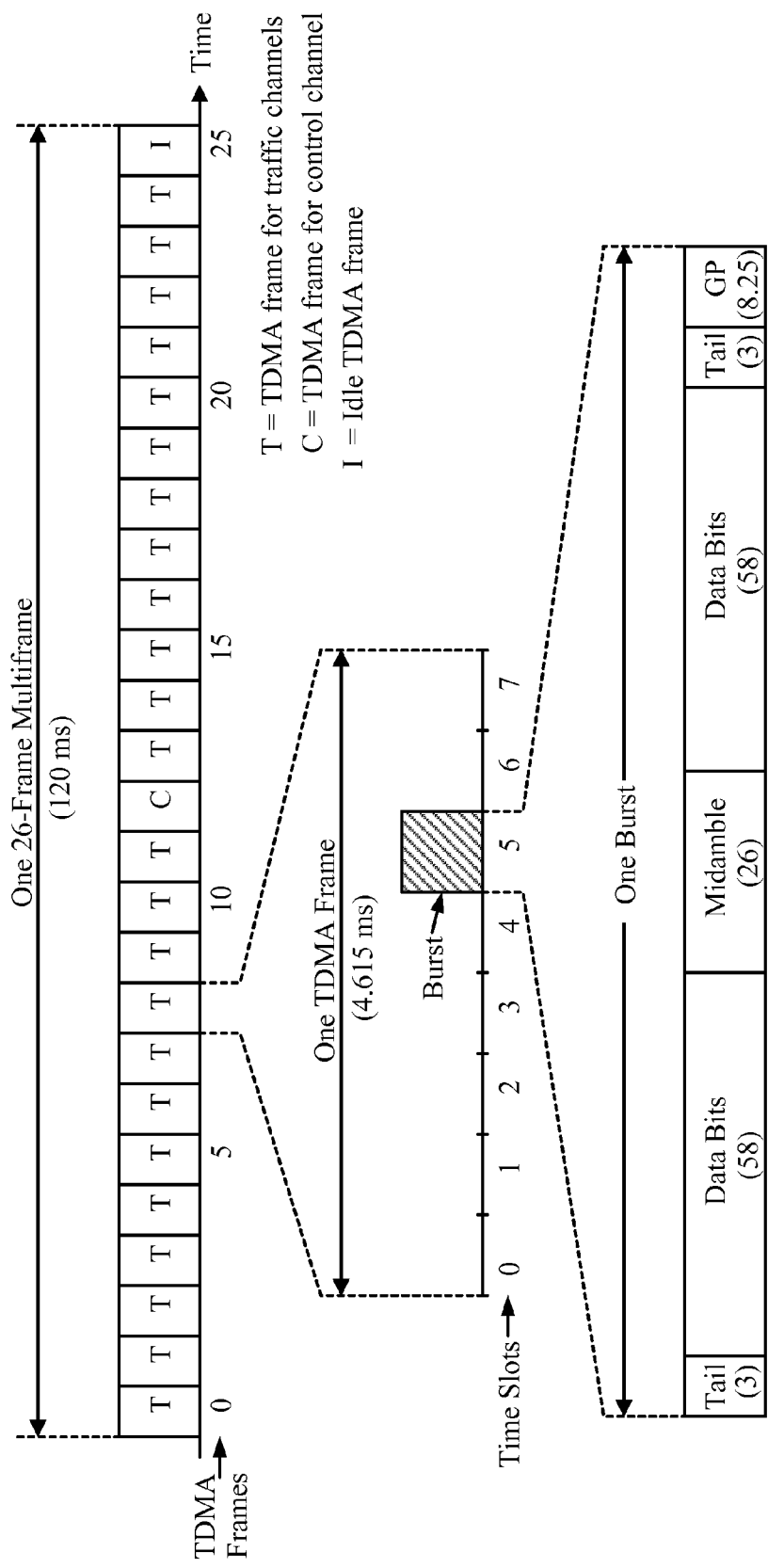
FIG. 3 shows example frame and burst formats in GSM.
Figure 4:
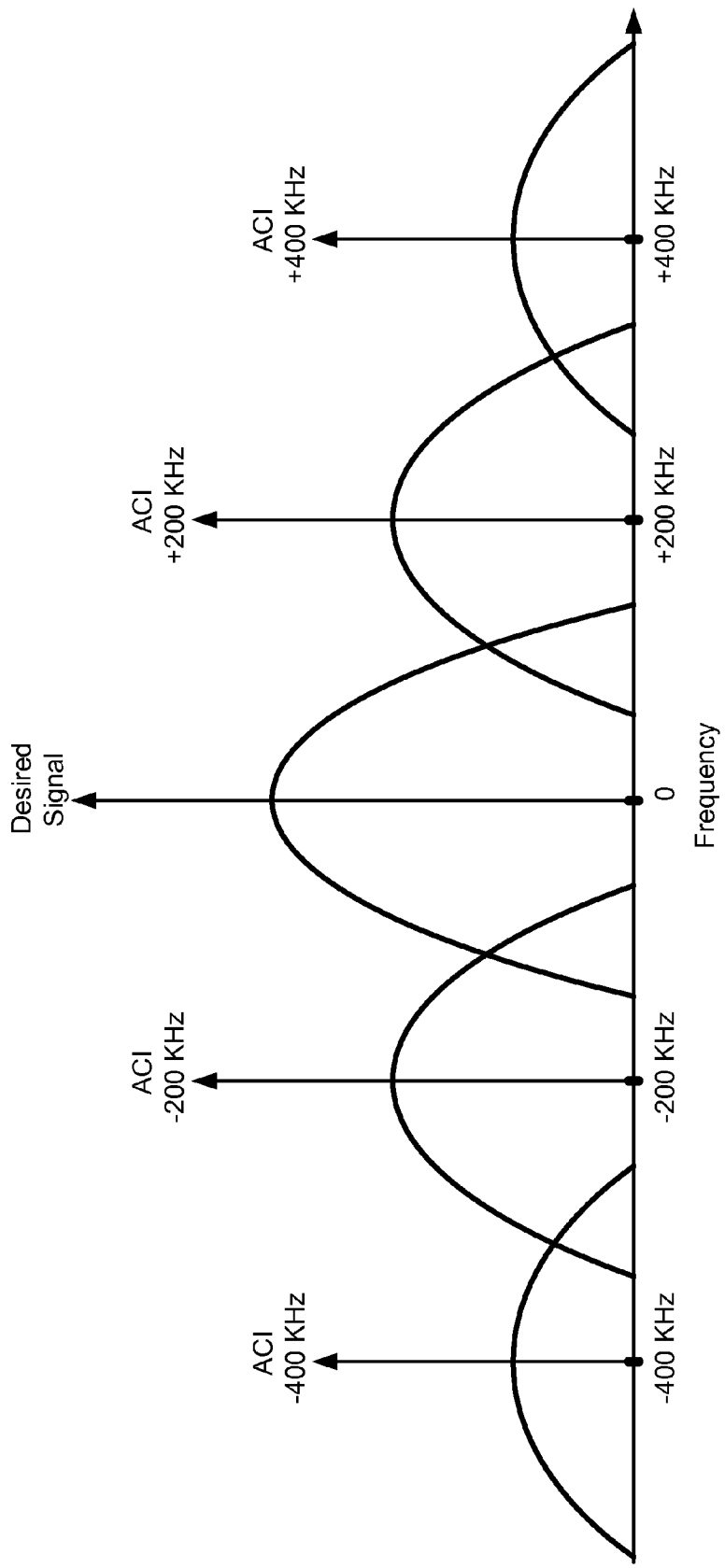
FIG. 4 shows an example spectrum in a GSM system.

A DARP capable remote station equalizer/detector 426 of the present method and apparatus also performs CCI cancellation prior to equalization, detection, etc. Equalizer/detector 426 in FIG. 2 provides demodulated data. CCI cancellation normally is available on a BS 110, 111, 114. Also, remote stations 123-127 may or may not be DARP capable. The network may determine whether a remote station is DARP capable or not at the resource assignment stage, a starting point of a call, or during the power-on stage for a GSM remote station (e.g. mobile station).

It is desirable to increase the number of active connections to remote stations that can be handled by a base station.

Figure 5:
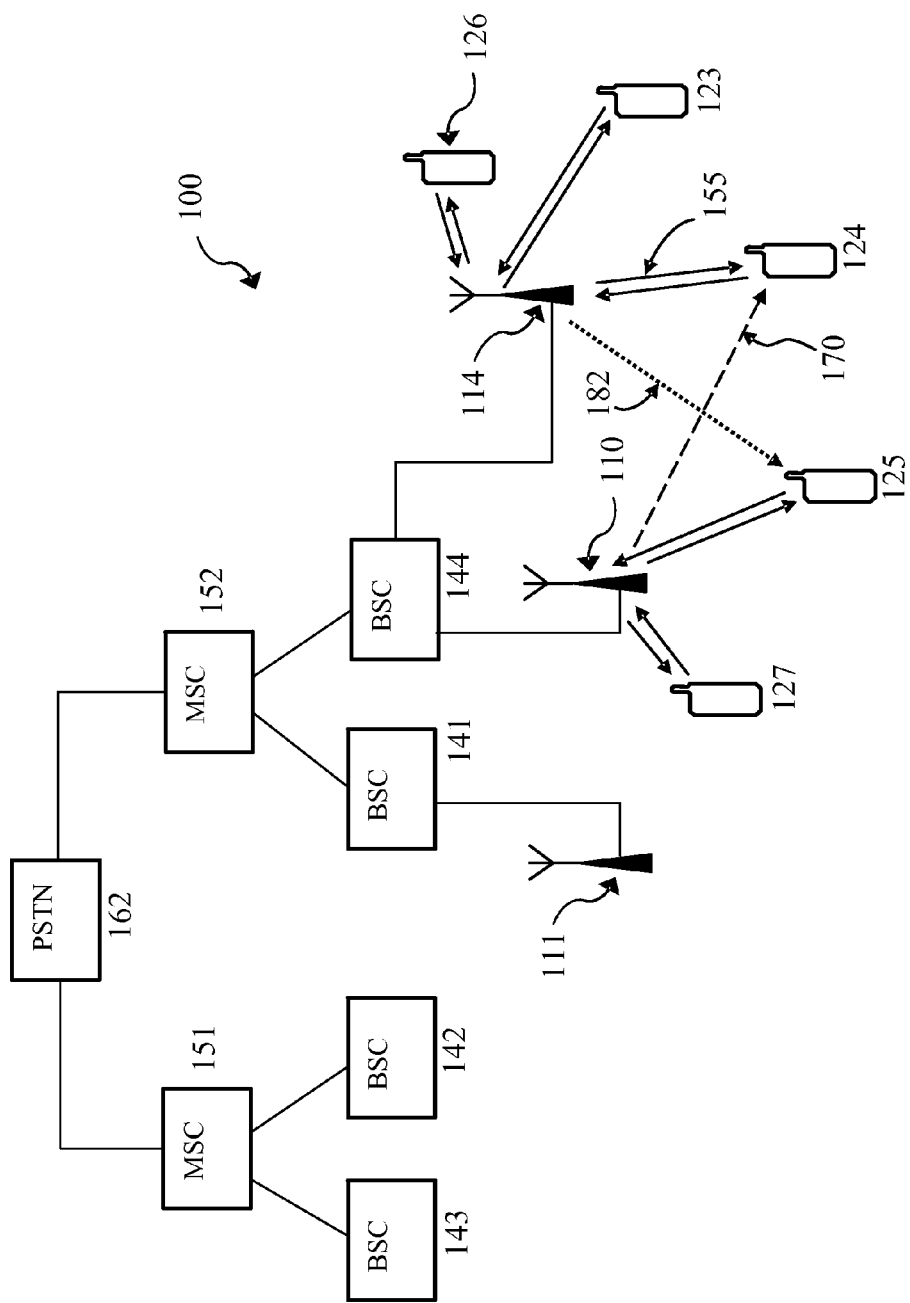
FIG. 5 is a simplified representation of a cellular communications system.

FIG. 5 of the accompanying drawings is a simplified representation of a cellular communications system 100. The system comprises base stations 110, 111 and 114 and remote stations 123, 124, 125, 126 and 127. Base station controllers 141 to 144 act to route signals to and from the different remote stations 123-127, under the control of mobile switching centres 151, 152. The mobile switching centres 151, 152 are connected to a public switched telephone network (PSTN) 162. Although remote stations 123-127 are commonly handheld mobile devices, many fixed wireless devices and wireless devices capable of handling data also fall under the general title of remote station 123-127.

Signals carrying, for example, voice data are transferred between each of the remote stations 123-127 and other remote stations 123-127 by means of the base station controllers 141-144 under the control of the mobile switching centres 151, 152. Alternatively, signals carrying, for example, voice data are transferred between each of the remote stations 123-127 and other communications equipment of other communications networks via the public switched telephone network 162. The public switched telephone network 162 allows calls to be routed between the mobile cellular system 100 and other communication systems. Such other systems include other mobile cellular communications systems 100 of different types and conforming to different standards.

Each of remote stations 123-127 can be serviced by any one of a number of base stations 110, 111, 114. A remote station 124 receives both a signal transmitted by the serving base station 114 and signals transmitted by nearby non-serving base stations 110, 111 and intended to serve other remote stations 125.

The strengths of the different signals from base stations 110, 111, 114 are periodically measured by the remote station 124 and reported to BSC 144, 114, etc. If the signal from a nearby base station 110, 111 becomes stronger than that of the serving base station 114, then the mobile switching centre 152 acts to make the nearby base station 110 become the serving base station and acts to make the serving base station 114 become a non-serving base station and handovers the signal to the nearby base station 110. Handover refers to the method of transferring a data session or an ongoing call from one channel connected to the core network to another.

In cellular mobile communications systems, radio resources are divided into a number of channels. Each active connection (for example a voice call) is allocated a particular channel having a particular channel frequency for the downlink signal (transmitted by the base station 110, 111, 114 to a remote station 123-127 and received by the remote station 123-127) and a channel having a particular channel frequency for the uplink signal (transmitted by the remote station 123-127 to the base station 110, 111, 114 and received by the base station 110, 111, 114). The frequencies for downlink and uplink signals are often different, to allow simultaneous transmission and reception and to reduce interference between transmitted signals and the received signals at the remote station or 123-127 at the base station 110, 111, 114.

Figure 6:
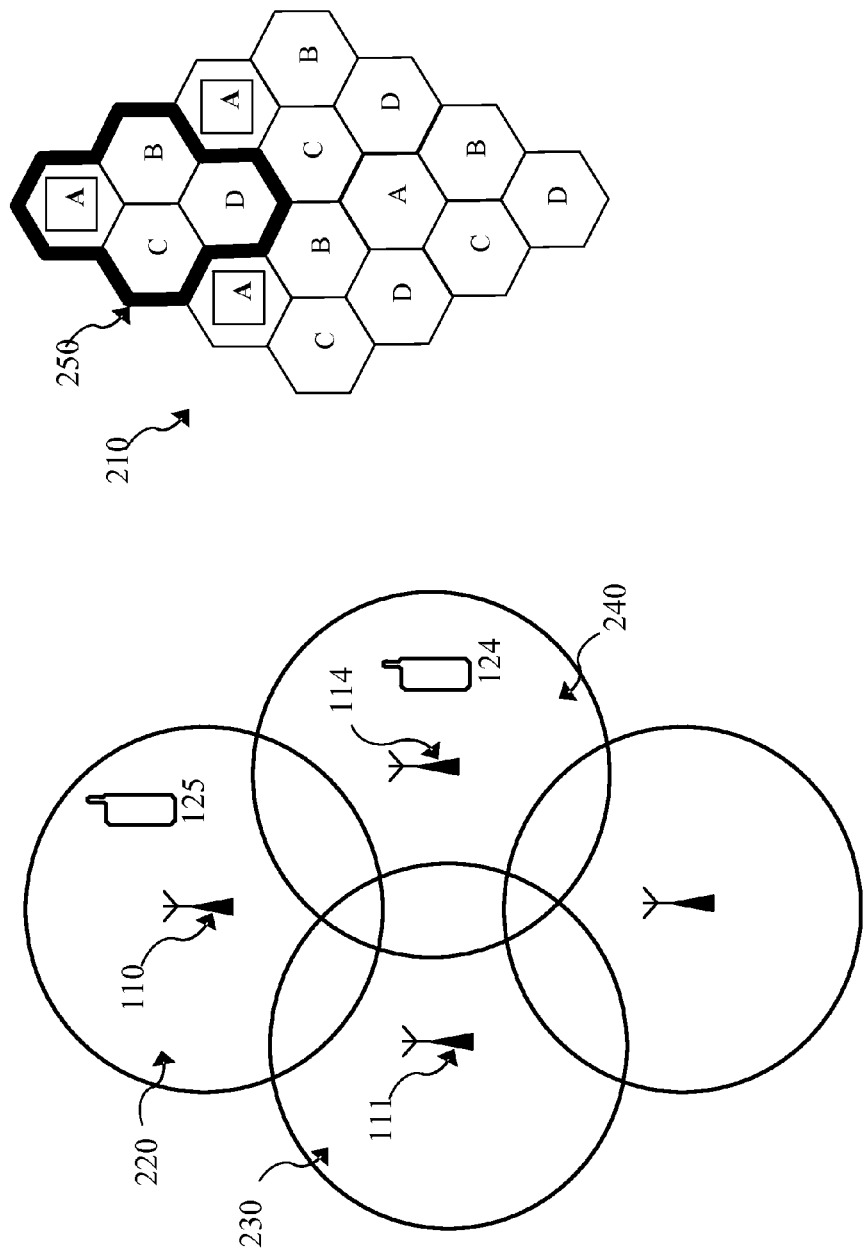
FIG. 6 shows an arrangement of cells in a cellular system.

FIG. 6 of the accompanying drawings shows an arrangement of cells in a cellular communications system that uses frequency reuse, a method that may be used in a cellular system to provide access to many users of the system. This particular example has a reuse factor of 4:12, which represents 4 sites and 12 frequencies. That means that the 12 frequencies available for use by a base station are allocated to the base stations of four sites labeled A-D, each site having one base station 110, 111, 114. Each site is divided into three sectors (now usually called cells). Stated another way, one frequency is allocated to each of the three cells of each of 4 sites so that all of the 12 cells have different frequencies. The frequency reuse pattern repeats itself as shown in the figure. Base station 110 belongs to cell A, base station 114 belongs to cell B, base station 111 belongs to cell C and so on. Base station 110 has a service area 220 that overlaps with adjacent service areas 230 and 240 of adjacent base stations 111 and 114 respectively. Remote stations 124, 125 are free to roam between the service areas.

As discussed above, to reduce interference of signals between cells, each site is allocated a set of channel frequencies which is different to the set of channel frequencies allocated to each of its neighboring sites. However, two sites that are non-adjacent may use the same set of frequencies. Base station 110 could use for example frequency allocation set A comprising frequencies f1, f2 and f3 for communicating with remote stations 125 in its service area 220. Similarly, base station 114 could use for example frequency allocation set B comprising frequencies f4, f5 and f6, to communicate with remote stations 124 in its service area 240, and so on. The area defined by bold border 250 contains one four-site repeat pattern. The repeat pattern repeats in a regular arrangement for the geographical area serviced by the communications system 100. It may be appreciated that although the present example repeats itself after 4 sites, a repeat pattern may have a number of sites other than four and a total number of frequencies other than 12.

TDMA is a multiple access technique directed to providing increased capacity. Using TDMA, each carrier frequency is segmented into time intervals called frames. Each frame is further partitioned into assignable user time slots. In GSM, the frame is partitioned into eight time slots. Thus, eight consecutive time slots form one TDMA frame with a duration of 4.615 ms.

A physical channel occupies one time slot within each frame on a particular frequency. The TDMA frames of a particular carrier frequency are numbered, each user being assigned one or more time slots within each frame. Furthermore, the frame structure repeats, so that a fixed TDMA assignment constitutes one or more slots that periodically appear during each time frame. Thus, each base station can communicate with a plurality of remote stations 123-127 using different assigned time slots within a single channel frequency. As stated above, the time slots repeat periodically. For example, a first user may transmit on the $1^{st}$ slot of every frame of frequency f1, while a second user may transmit on the $2^{nd}$ slot of every frame of frequency f2. During each downlink time slot, the remote station 123-127 is given access to receive a signal transmitted by the base station 110, 111, 114 and during each uplink time slot the base station 110, 111, 114 is given access to receive a signal transmitted by the remote station 123-127. The channel for communication to a remote station 123-127 thus comprises both a frequency and a time slot, for a GSM system. Equally, the channel for communication to a base station 110, 111, 114 comprises both a frequency and a time slot.

Figure 7:
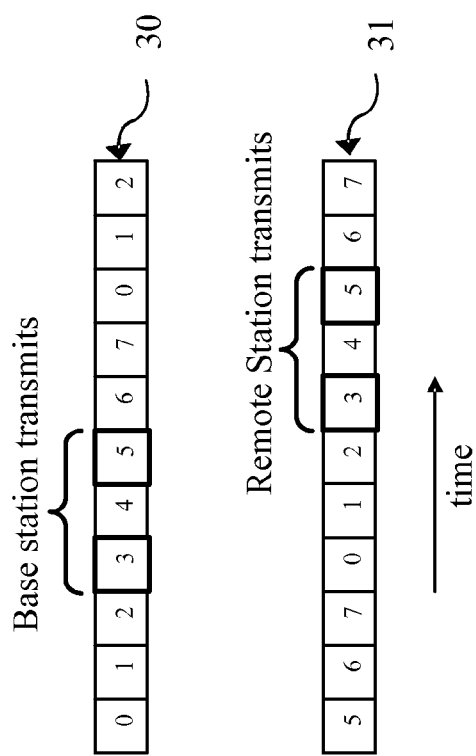
FIG. 7 shows an example arrangement of time slots for a time division multiple access (TDMA) communications system.

FIG. 7 shows an example arrangement of time slots for a time division multiple access (TDMA) communications system. A base station 114 transmits data signals in a sequence of numbered time slots 30, each signal being for only one of a set of remote stations 123-127 and each signal being received at the antenna of all remote stations 123-127 within range of the transmitted signals. The base station 114 transmits all the signals using slots on an allocated channel frequency. For example, a first remote station 124 might be allocated a first time slot 3 and a second remote station 126 might be allocated a second time slot 5.

The base station 114 transmits, in this example, a signal for the first remote station 124 during time slot 3 of the sequence of time slots 30, and transmits a signal for the second remote station 126 during time slot 5 of the sequence of time slots 30. The first and second remote stations 124, 126 are active during their respective time slots 3 and 5 of time slot sequence 30, to receive the signals from the base station 114. The remote stations 124, 126 transmit signals to the base station 114 during corresponding time slots 3 and 5 of time slot sequence 31 on the uplink. It can be seen that the time slots for the base station 114 to transmit (and the remote stations 124, 126 to receive) 30 are offset in time with respect to the time slots for the remote stations 124, 126 to transmit (and the base station 114 to receive) 31.

This offsetting in time of transmit and receive time slots is known as time division duplexing (TDD), which among other things, allows transmit and receive operations to occur at different instances of time.

Voice and data signals are not the only signals to be transmitted between the base station 110, 111, 114 and the remote station 123-127. A control channel is used to transmit data that controls various aspects of the communication between the base station 110, 111, 114 and the remote station 123-127. Among other things, the base station 110, 111, 114 uses the control channel to send to the remote station 123-127 a sequence code, or training sequence code (TSC) which indicates which of a set of sequences the base station 110, 111, 114 will use to transmit the signal to the remote station 123-127. In GSM, a 26-bit training sequence is used for equalization. This is a known sequence which is transmitted in a signal in the middle of every time slot burst.

The sequences are used by the remote station 123-127 to compensate for channel degradations which vary quickly with time; to reduce interference from other sectors or cells; and to synchronize the remote station's 123-127 receiver to the received signal. These functions are performed by an equalizer which is part of the remote station's 123-127 receiver. An equalizer 426 determines how the known transmitted training sequence signal is modified by multipath fading. Equalization may use this information to extract the desired signal from the unwanted reflections by constructing an inverse filter to extract the rest of the desired signal. Different sequences (and associated sequence codes) are transmitted by different base stations 110, 111, 114 in order to reduce interference between sequences transmitted by base stations 110, 111, 114 that are close to each other.

As stated above, with DARP the remote station 123-127 of the present method and apparatus is able to use the sequence to distinguish the signal transmitted to it by the base station 110, 111, 114 serving the remote station 123-127 from other unwanted signals transmitted by non-serving base stations 110, 111, 114 of other cells. This holds true so long as the received amplitudes or power levels of the unwanted signals are below a threshold relative to the amplitude of the wanted signal. The unwanted signals can cause interference to the wanted signal if they have amplitudes above this threshold. In addition, the threshold can vary according to the capability of the remote station's 123-127 receiver. The interfering signal and the desired (or wanted) signal can arrive at the remote station's 123-127 receiver contemporaneously if, for example, the signals from the serving and non-serving base stations 110, 111, 114 share the same time slot for transmitting.

Referring again to FIG. 5, at remote station 124, transmissions from base station 110 for remote station 125 can interfere with transmissions from base station 114 for remote station 124 (the path of the interfering signal shown by dashed arrow 170). Similarly, at remote station 125 transmissions from base station 114 for remote station 124 can interfere with transmissions from base station 110 for remote station 125 (the path of the interfering signal shown by dotted arrow 182).

and similar power levels (−82 dBm and −81 dBm respectively). Similarly, the information in rows 6 and 7 show that for remote station 125 both a wanted signal from the second base station 110 and an unwanted interferer signal from the first base station 114 and intended for remote station 124 are received and the two received signals have the same channel and similar power levels (−80 dBm and −79 dBm respectively).

Each remote station 124, 125 thus receives both a wanted signal and an unwanted interferer signal that have similar power levels from different base stations 114, 110, on the same channel (i.e. contemporaneously). Because the two signals arrive on the same channel and similar power levels, they interfere with each other. This may cause errors in demodulation and decoding of the wanted signal. This interference is co-channel interference discussed above.

The co-channel interference may be mitigated to a greater extent than previously possible, by the use of DARP enabled remote stations 123-127, base stations 110, 111, 114 and base station controllers 151, 152. While base stations 110, 111, 114 may be capable of simultaneously receiving and demodulating two co-channel signals having similar power levels, DARP allows remote stations 123-127 to have, by means of DARP, similar capability. This DARP capability may be implemented by means of SAIC or by means of a method known as dual antenna interference cancellation (DAIC).

The receiver of a DARP-capable remote station 123-127 may demodulate a wanted signal while rejecting an unwanted co-channel signal even when the amplitude of the received unwanted co-channel signal is similar or higher than the amplitude of the wanted signal. The DARP feature works better when the amplitudes of the received co-channel signals are similar. This situation would typically occur in existing systems such as GSM not yet employing the present method and apparatus, when each of two remote stations 123-127, each communicating with a different base station 110, 111, 114, is near a cell boundary, where the path losses from each base station 110, 111, 114 to each remote station 123-127 are similar.

A remote station 123-127 that is not DARP-capable, by contrast, may only demodulate the wanted signal if the

TABLE 1

| Row | Base station transmitting the signal | Remote station 1 receiving the signal | Channel frequency of the signal | Remote station 2 for which the signal is intended | Downlink time slot (TS) of the signal | Training sequence code (TSC) of the signal | Received power level at remote station 1 | Signal category |
|---|---|---|---|---|---|---|---|---|
| 2 | 114 | 123 | 41 | 123 | 5 | TSC 3 | −40 dBm | Wanted |
| 3 | 114 | 124 | 32 | 124 | 3 | TSC 3 | −82 dBm | Wanted |
| 4 | 110 | 124 | 32 | 125 | 3 | TSC 1 | −81 dBm | Interferer |
| 5 | | | | | | | | |
| 6 | 114 | 125 | 32 | 124 | 3 | TSC 3 | −79 dBm | Interferer |
| 7 | 110 | 125 | 32 | 125 | 3 | TSC 1 | −80 dBm | Wanted |

Table 1 shows example values of parameters for signals transmitted by the two base stations 110 and 114 illustrated in FIG. 6. The information in rows 3 and 4 of Table 1 show that for remote station 124 both a wanted signal from a first base station 114 and an unwanted interferer signal from a second base station 110 and intended for remote station 125 are received and the two received signals have the same channel unwanted co-channel interferer signal has an amplitude, or power level, lower than the amplitude of the wanted signal. In one example, it may be lower by at least 8 dB. The DARP-capable remote station 123-127 can therefore tolerate a much higher-amplitude co-channel signal relative to the wanted signal, than can the remote station 123-127 not having DARP capability.

The co-channel interference (CCI) ratio is the ratio between the power levels, or amplitudes, of the wanted and unwanted signals expressed in dB. In one example, the co-channel interference ratio could be, for example, −6 dB (whereby the power level of the wanted signal is 6 dB lower than the power level of the co-channel interferer (or unwanted) signal). In another example, the ratio may be +6 dB (whereby the power level of the wanted signal is 6 dB higher than the power level of the co-channel interferer (or unwanted) signal). For those remote stations 123-127 of the present method and apparatus with good DARP performance, the amplitude of the interferer signal can be as much as 10 dB higher than the amplitude of the wanted signal, and the remote stations 123-127 may still process the wanted signal. If the amplitude of the interferer signal is 10 dB higher than the amplitude of the wanted signal, the co-channel interference ratio is −10 dB.

DARP capability, as described above, improves a remote station's 123-127 reception of signals in the presence of ACI or CCI. A new user, with DARP capability, will better reject the interference coming from an existing user. The existing user, also with DARP capability, would do the same and not be impacted by the new user. In one example, DARP works well with CCI in the range of 0 dB (same level of co-channel interference for the signals) to −6 dB (co-channel is 6 dB stronger than the desired or wanted signal). Thus, two users using the same ARFCN and same timeslot, but assigned different TSCs, will get good service.

The DARP feature allows two remote stations 124 and 125, if they both have the DARP feature enabled, to each receive wanted signals from two base stations 110 and 114, the wanted signals having similar power levels, and each remote station 124, 125 to demodulate its wanted signal. Thus, the DARP enabled remote stations 124, 125 are both able to use the same channel simultaneously for data or voice.

The feature described above of using a single channel to support two simultaneous calls from two base stations 110, 111, 114 to two remote stations 123-127 is somewhat limited in its application in the prior art. To use the feature, the two remote stations 124, 125 are within range of the two base stations 114, 110 and are each receiving the two signals at similar power levels. For this condition, typically the two remote stations 124, 125 would be near the cell boundary, as mentioned above.

The present method and apparatus allows the supporting of two or more simultaneous calls on the same channel (consisting of a time slot on a carrier frequency), each call comprising communication between a single base station 110, 111, 114 and one of a plurality of remote stations 123-127 by means of a signal transmitted by the base station 110, 111, 114 and a signal transmitted by the remote station 123-127. The present method and apparatus provides a new and inventive application for DARP. As stated above, with DARP, two signals on the same time slot on the same carrier frequency may be distinguished by using different training sequences at higher levels of interference than before DARP. Since the signal from the BS 110, 111, 114 not being used acts as interference, DARP filters/suppresses out the unwanted signal (signal from the BS 110, 111, 114 not being used) by use of the training sequences.

The present method and apparatus allows the use of two or more training sequences in the same cell. In the prior art, one of the training sequences, the one not assigned to the base station 110, 111, 114, will only act as interference as it also does in Multi-User on One Slot (MUROS) for at least one mobile station's 123-127 receiver. However, a key difference is that the unwanted signal for that mobile station 123-127 is wanted by another mobile station 123-127 in the same cell. In legacy systems, the unwanted signal is for a mobile station 123-127 in another cell. According to the present method and apparatus, both training sequence signals may be used in the same time slot on the same carrier frequency in the same cell by the same base station 110, 111, 114. Since two training sequences can be used in a cell, twice as many communication channels may be used in the cell. By taking a training sequence which would normally be interference from another (non-neighboring) cell or sector and allowing a base station 110, 111, 114 to use it in addition to its already-used training sequence for the same time slot, the number of communication channels is doubled. If three training sequences are used in the same time slot in this way, the number of communication channels is tripled.

DARP, when used along with the present method and apparatus, therefore enables a GSM network to use a co-channel already in use (i.e., the ARFCN that is already in use) to serve additional users. In one example, each ARFCN can be used for two users for full-rate (FR) speech and 4 for half-rate (HR) speech. It is also possible to serve the third or even fourth user if the remote stations 123-127 have excellent DARP performance.

In order to serve additional users using the same AFRCN on the same timeslot, the network transmits the additional users' RF signal on the same carrier, using a different phase shift, and assigns the same traffic channel (the same ARFCN and timeslot that is in use) to the additional user using a different TSC. The bursts are modulated with the training sequence corresponding to the TSC accordingly. A DARP capable remote station 123-127 may detect the wanted or desired signal. It is possible to add the third and fourth users in the same way as the first and second users were.

Figure 8A:
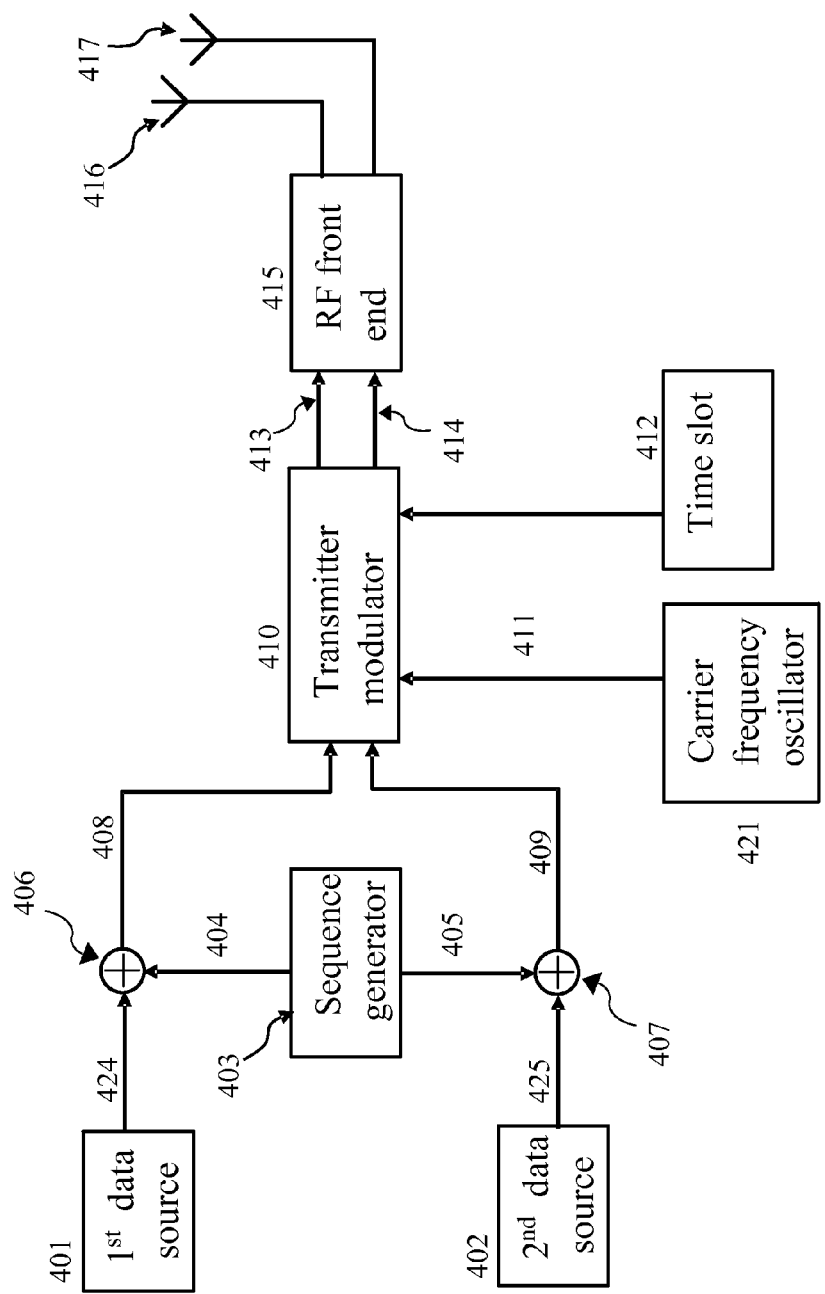
FIG. 8A shows an apparatus for operating in a multiple access communication system to produce first and second signals sharing a single channel.

FIG. 8A of the accompanying drawings shows an apparatus for operating in a multiple access communication system to produce first and second signals sharing a single channel. A first data source 401 and a second data source 402 (for a first and a second remote station 123-127) produce first data 424 and second data 425 for transmission. A sequence generator 403 generates a first sequence 404 and a second sequence 405. A first combiner 406 combines the first sequence 404 with the first 424 data to produce first combined data 408. A second combiner 407 combines the second sequence 405 with the second data 425 to produce second combined data 409.

The first and second combined data 408, 409 are input to a transmitter modulator 410 for modulating both the first and the second combined data 408, 409 using a first carrier frequency 411 and a first time slot 412. In this example, the carrier frequency may generated by an oscillator 421. The transmitter modulator outputs a first modulated signal 413 and a second modulated signal 414 to a RF front end 415. The RF front end processes the first and second modulated signals 413, 414 by upconverting them from baseband to an RF (radio frequency) frequency. The upconverted signals are sent to antennas 416 and 417 where they are respectively transmitted.

The first and second modulated signals may be combined in a combiner prior to being transmitted. The combiner 422 may be a part of either the transmitter modulator 410 or the RF front end 415 or a separate device. A single antenna 416 provides means for transmitting the combined first and second signals by radiation. This is illustrated in FIG. 8B.

Figure 8B:
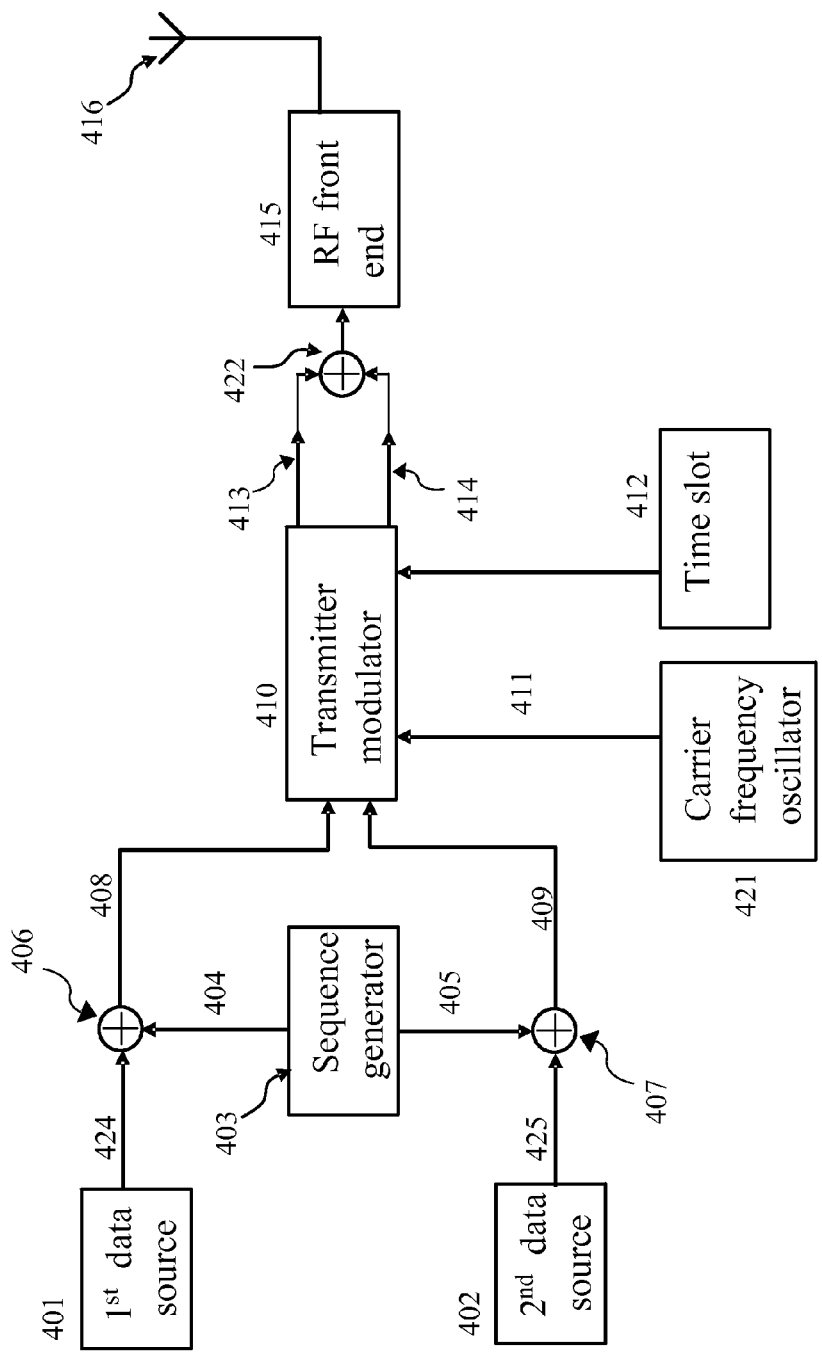
FIG. 8B shows an apparatus for operating in a multiple access communication system to produce first and second signals sharing a single channel and using a combiner to combine first and second modulated signals.
Figure 9:
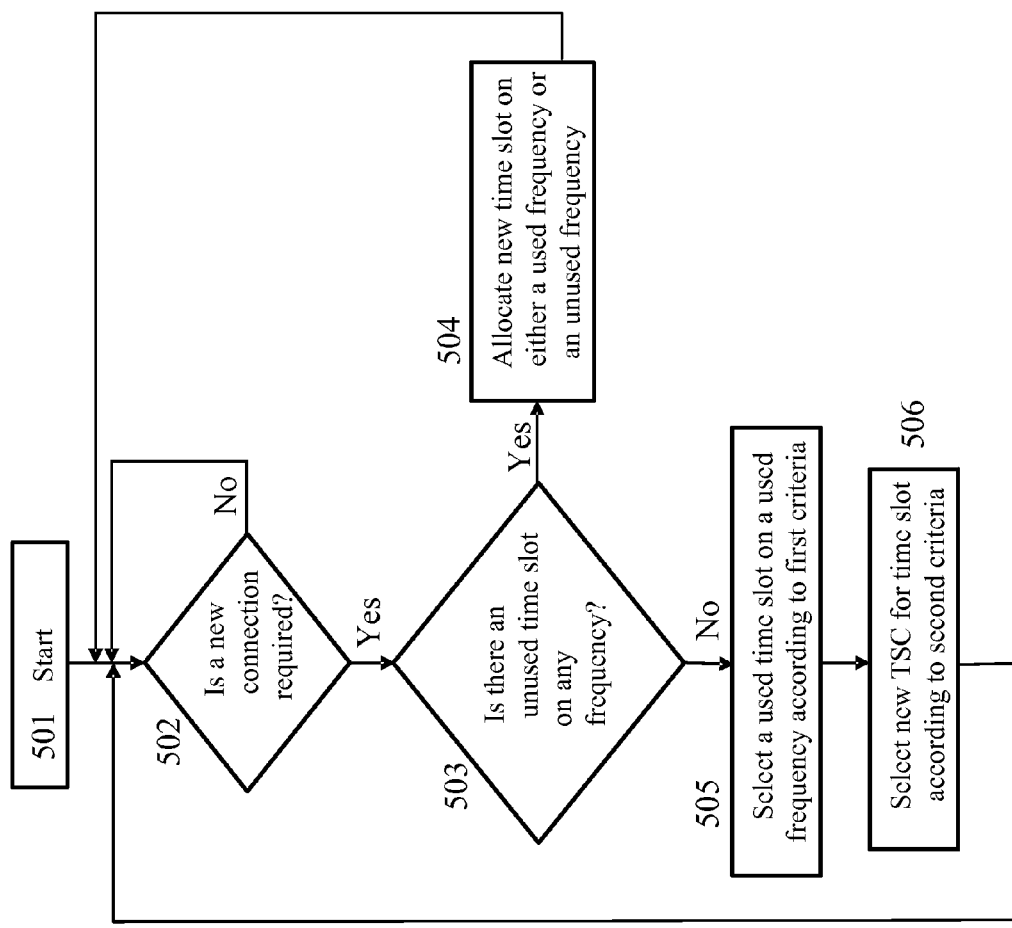
FIG. 9 of the accompanying drawings is a flowchart of a method of using the apparatus shown in any of FIG. 8A or 8B.

FIG. 9 of the accompanying drawings is a flowchart of a method of using the apparatus shown in FIG. 8A or 8B of the accompanying drawings. The method includes allocating a particular channel frequency and a particular time slot for a base station 110, 111, 114 to use to transmit to a plurality of remote stations 123-127 whereby a different training sequence is assigned for each remote station 123-127. Thus in one example, this method may be executed in the base station controller 151, 152. In another example, this method may be executed in a base station 110, 111, 114.

Following the start of the method 501, a decision is made in step 502 as to whether to set up a new connection between the base station 110, 111, 114 and a remote station 123-127. If the answer is NO, then the method moves back to the start block 501 and the steps above are repeated. When the answer is YES, a new connection is set up. Then in block 503 a decision is made as to whether there is an unused channel (i.e. an unused time slot for any channel frequency). If there is an unused time slot on a used or unused channel frequency, then a new time slot is allocated in block 504. The method then moves back to the start block 501 and the steps above are repeated.

When eventually there is no longer an unused time slot (because all time slots are used for connections), the answer to the question of block 503 is NO, and the method moves to block 505. In block 505, a used time slot is selected for the new connection to share with an existing connection, according to a set of first criteria. There can be a variety of criteria. For example one criterion might be that a time slot may be selected if it has low traffic. Another criterion may be that the time slot is already used by no more than one remote station 123-127. It can be appreciated that there will be other possible criteria based on the network planning methods employed, and the criteria is not limited to those two examples.

A used time slot on a channel frequency having been selected for the new connection to share along with an existing connection, a TSC for the new connection is then selected in block 506 according to a set of second criteria. These second criteria may include some of the criteria used for the selection of the time slot in block 505, or other criteria. One criterion is that the TSC has not yet been used by the cell or sector for the channel comprising the used time slot. Another criterion might be that the TSC is not used on that channel by a nearby cell or sector. The method then moves back to the start block 501 and the steps above are repeated.

Figure 10A:
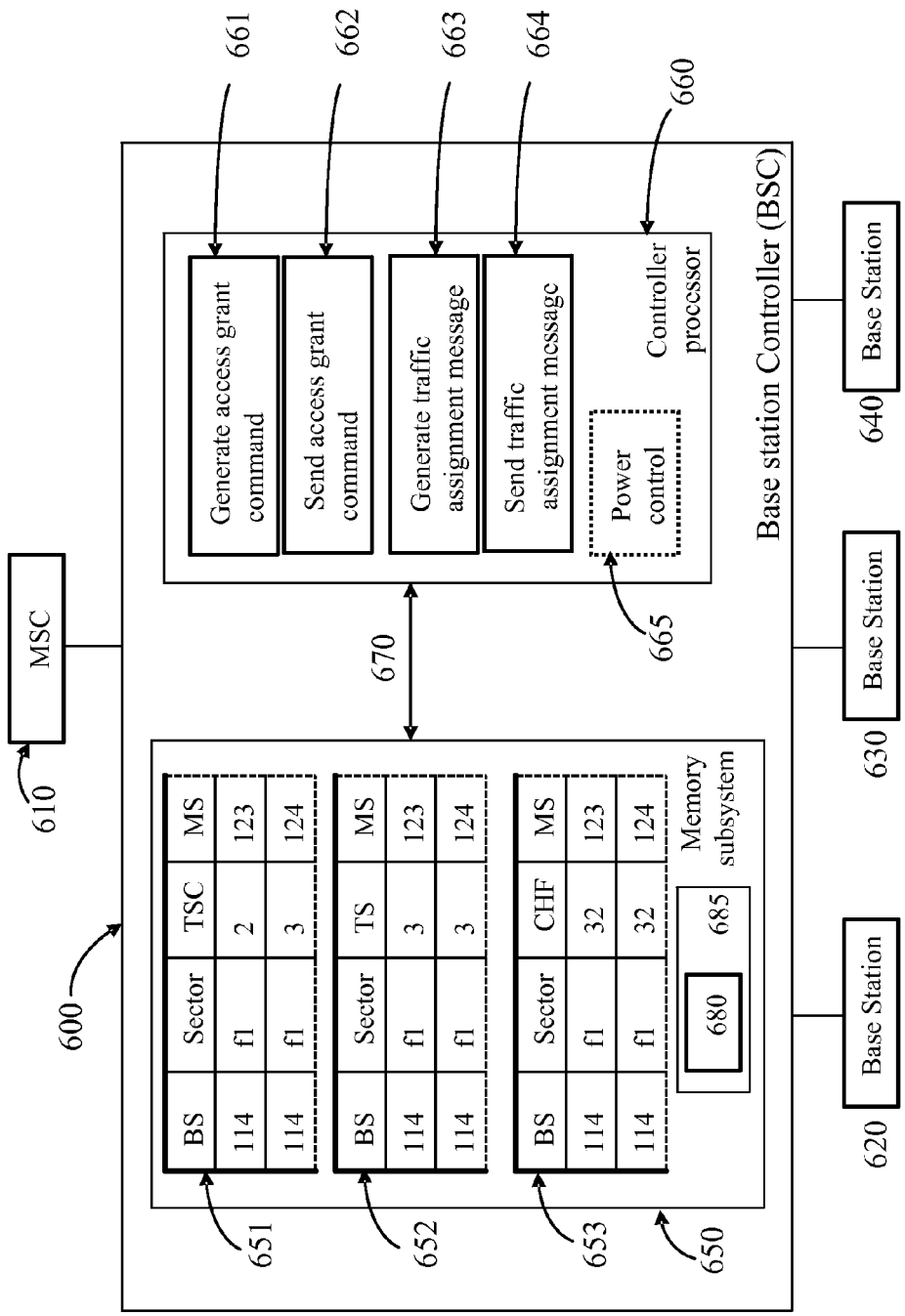
FIG. 10A shows an example embodiment wherein the method described by FIG. 9 would reside in the base station controller.

FIG. 10A of the accompanying drawings shows an example embodiment wherein the method described by FIG. 9 would reside in the base station controller 600. Within base station controller 600 reside controller processor 660 and memory subsystem 650. The steps of the method may be stored in software 680 in memory 685 in memory subsystem 650, or within software 680 in memory 685 residing in controller processor 660, or within software 680 memory 685 in the base station controller 600, or within some other digital signal processor (DSP) or in other forms of hardware. The base station controller 600 is connected to the mobile switching centre 610 and also to base stations 620, 630 and 640, as shown by FIG. 10A.

Shown within memory subsystem 650 are parts of three tables of data 651, 652, 653. Each table of data stores values of a parameter for a set of remote stations 123, 124 indicated by the column labeled MS. Table 651 stores values of training sequence code. Table 652 stores values for time slot number TS. Table 653 stores values of channel frequency CHF. It can be appreciated that the tables of data could alternatively be arranged as a multi-dimensional single table or several tables of different dimensions to those shown in FIG. 10A.

Controller processor 660 communicates via data bus 670 with memory subsystem 650 in order to send and receive values for parameters to/from memory subsystem 650. Within controller processor 660 are contained functions that include a function 661 to generate an access grant command, a function 662 to send an access grant command to a base station 620, 630, 640, a function 663 to generate a traffic assignment message, and a function 664 to send a traffic assignment message to a base station 620, 630 or 640. These functions may be executed using software 680 stored in memory 685.

Within controller processor 660, or elsewhere in the base station controller 600, there may also be a power control function 665 to control the power level of a signal transmitted by a base station 620, 630 or 640.

It can be appreciated that the functions shown as being within base station controller 600, namely memory subsystem 650 and controller processor 660 could also reside in the mobile switching centre 610. Equally some or all of the functions described as being part of base station controller 600 could equally well reside in one or more of base stations 620, 630 or 640.

Figure 10B:
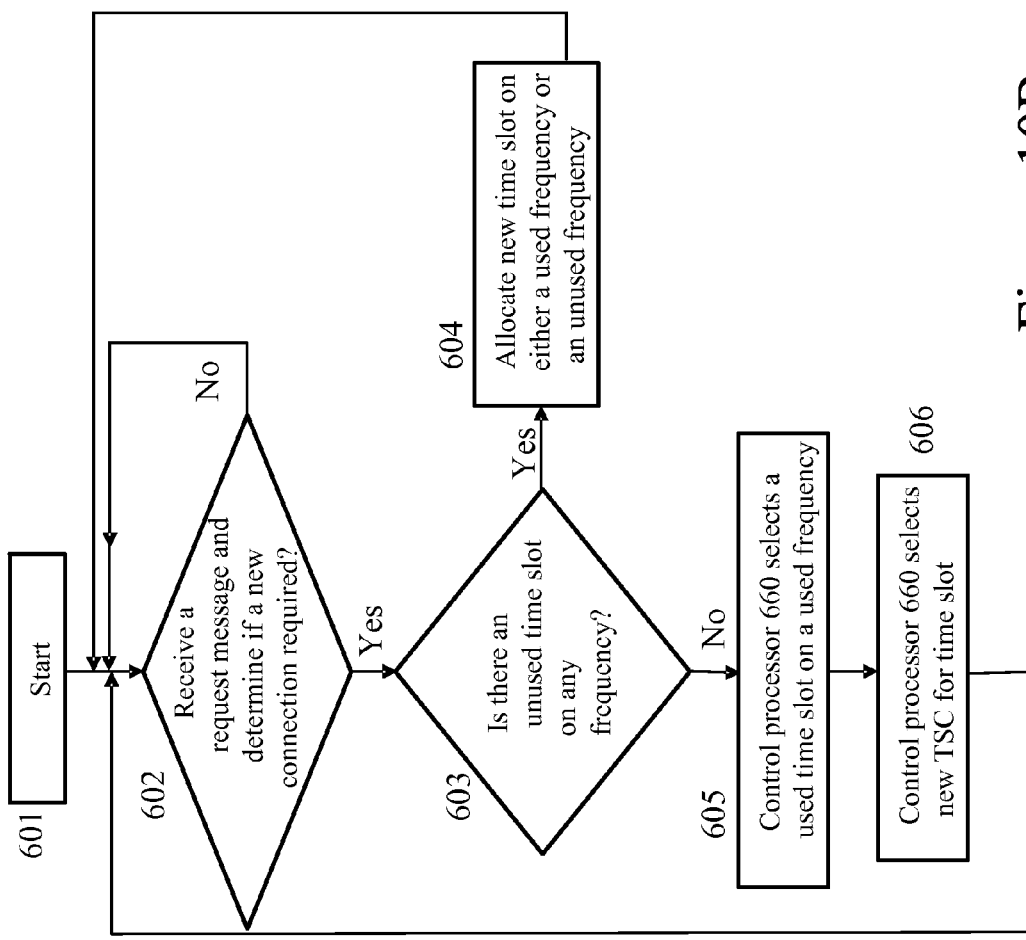
FIG. 10B is a flowchart illustrating the steps executed by the base station controller of FIG. 10A.

FIG. 10B is a flowchart illustrating the steps executed by the base station controller 600 of FIG. 10A. When allocating a channel to a remote station 123, 124 (e.g. remote station MS 123), for example when the remote station 123 requests service, the base station 620, 630, 640 wishing to service the remote station 123, 124 sends a request message to the base station controller 600 for a channel assignment. Controller processor 660, upon receiving the request message at step 602 via data bus 670, determines if a new connection is required. If the answer is NO, then the method moves back to the start block 601 and the steps above are repeated. When the answer is YES a new connection set up is initiated. Then in block 603 a decision is made as to whether there is an unused channel (i.e. an unused time slot for any channel frequency). If there is an unused time slot on a used or unused channel frequency, then a new time slot is allocated in block 604. The method then moves back to the start block 601 and the steps above are repeated.

On the other hand, if the controller processor 660 determines there is not an unused time slot on any channel frequency, it selects a used time slot. See step 605 of FIG. 10B. The selection could be based on accessing memory subsystem 650 or other memory 685 to obtain information on criteria such as the current usage of time slots, and whether both or only one of remote stations 123, 124 are DARP enabled. Controller processor 660 selects a used time slot, and selects a training sequence code for the time slot. See step 606 of FIG. 10B Since the time slot is already used, this will be the second training sequence selected for that time slot.

In order to apply criteria for selecting a time slot, the controller processor 660 accesses memory 650 via data bus 670, or accesses other memory 685, to obtain information, for example information about the current allocation of time slots or training sequences or both, and whether remote stations 123, 124 have DARP capability. Controller processor 660 then generates a command (661 or 663) and sends the command (662 or 664) to the base station 620 to assign a channel frequency, time slot and training sequence to the remote station 123. The method then moves back to the start block 601 and the steps above are repeated.

Figure 11:
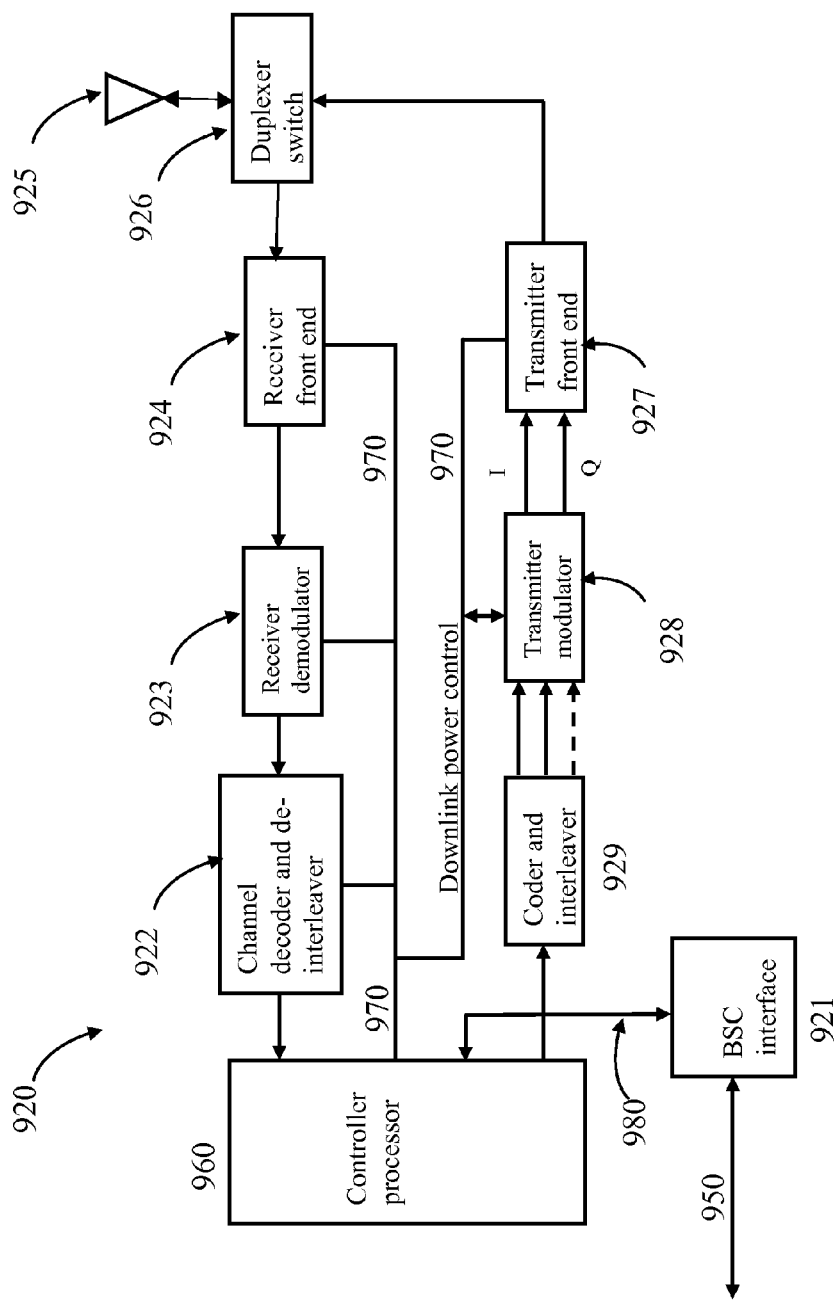
FIG. 11 shows the flow of signals in a base station.

FIG. 11 of the accompanying drawings shows the flow of signals in a base station 620, 920. Base station controller interface 921 communicates, via communications link 950, with a base station controller 600. Communications link 950 might be a data cable or a RF link for example. Controller processor 960 communicates with and controls, via data bus 970, receiver components 922, 923 and 924, and transmitter components 927, 928, and 929. Controller processor 960 communicates via data bus 980 with BSC interface 921. The data bus 970 could comprise just one bus or several buses and could be partly or wholly bi-directional. Data buses 970 and 980 could be the same bus.

In one example, a message requesting grant of a channel is received from a remote station 123, 124 in a coded, modulated, radiated signal at base station antenna 925 and is input to duplexer switch 926. The signal passes from the receive port of duplexer switch 926 to the receiver front end 924 which conditions the signal (for example by means of down-converting, filtering, and amplifying). The receiver demodulator 923 demodulates the conditioned signal and outputs the demodulated signal to channel decoder and de-interleaver 922 which decodes and de-interleaves the demodulated signal and outputs the resulting data to controller processor 960. Controller processor 960 derives from the resulting data the message requesting grant of a channel. Controller processor 960 sends the message via base station controller interface 921 to a base station controller 600. The base station controller 600 then acts to grant, or not grant, a channel to the remote station 23, 24, either autonomously or together with mobile switching centre 610.

Base station controller 600 generates and sends access grant commands, and other digital communication signals or traffic for remote stations 123, 124, for example assignment messages, to BSC interface 921 via communications link 950. The signals are then sent via data bus 980 to controller processor 960. Controller processor 960 outputs signals for remote stations 123, 124 to coder and interleaver 929 and the coded and interleaved signals then pass to transmitter modulator 928. It can be seen from FIG. 11 that there are several signals input to transmitter modulator 928, each signal for a remote station 123, 124. These several signals can be combined within transmitter modulator 928 to provide a combined modulated signal having I and Q components as shown in FIG. 11.

However the combining of the several signals could alternatively be performed post-modulation within transmitter front end module 927 and or in other stages within the transmit chain. The modulated combined signal is output from transmitter front end 927 and input to the transmit port of duplexer switch 926. The signal is then output via the common or antenna port of duplexer switch 926 to the antenna 925 for transmission.

In another example, a second message from a second remote station 123, 124 requesting grant of a channel is received in a second received signal at the base station antenna 925. The second received signal is processed as described above and the request for grant of a channel is sent in the processed second received signal to the base station controller 600.

The base station controller 600 generates and sends to the base station 620, 920 a second access grant message as described above, and the base station 620, 920 transmits a signal comprising the second access grant message, as described above, for the remote station 123, 124.

Phase Shift

The absolute phase of the modulation for the two signals transmitted by the base station 110, 111, 114 may not be identical. In order to serve additional users using the same channel (co-TCH), in addition to providing more than one TSC, the network may phase shift the symbols of the RF signal of the new co-channel (co-TCH) remote station 123-127 with respect to the existing co-TCH remote station(s) 123-127. If possible the network may control them with evenly distributed spaced phase shift, thus improving receiver performance.

For example, the phase shift of the carrier frequency (having a particular ARFCN) for two users would be 90 degrees apart, three users 60 degrees apart. The phase shift of the carrier (ARFCN) for four users would be 45 degree apart. As stated above, the users will use different TSCs. Each additional MS 123-127 of the present method and apparatus is assigned a different TSC and uses its own TSC and the DARP feature to get its own traffic data.

Thus, for improved DARP performance, the two signals intended for the two different mobile stations (remote stations) 123, 124 may ideally be phase shifted by $\pi/2$ for their channel impulse response, but less than this will also provide adequate performance.

When the first and second remote stations 123, 124 are assigned the same channel (i.e. same time slot on the same channel frequency), signals may preferably be transmitted to the two remote stations 123, 124 (using different training sequences as described previously) such that the modulator 928 modulates the two signals at 90 degrees phase shift to each other, thus further reducing interference between the signals due to phase diversity. So, for example, the I and Q samples emerging from the modulator 928 could each represent one of the two signals, the signals being separated by 90 degrees phase. The modulator 928 thus introduces a phase difference between the signals for the two remote stations 123, 124.

In the case of several remote stations 123, 124 sharing the same channel, multiple sets of I and Q samples can be generated with different offsets. For example, if there is a third signal for a third remote station 123, 124 on the same channel, the modulator 928 introduces phase shifts of preferably 60 degrees and 120 degrees for the second and third signals relative to the phase of the first signal, and the resulting I and Q samples represent all three signals. For example, the I and Q samples could represent the vector sum of the three signals.

In this way, the transmitter modulator 928 provides means at the base station 620, 920 for introducing a phase difference between contemporaneous signals using the same time slot on the same frequency and intended for different remote stations 123, 124. Such means can be provided in other ways. For example, separate signals can be generated in the modulator 928 and resulting analogue signals can be combined in the transmitter front end 927 by passing one of them through a phase shift element and then simply summing the phase shifted and non-phase shifted signals.

Power Control Aspects

Table 2 below shows example values of channel frequency, time slot, training sequence and received signal power level for signals transmitted by the two base stations 110 and 114 as shown in FIG. 5 and received by remote stations 123 to 127.

TABLE 2

| Row | BASE STATION transmitting the signal | Remote station1 receiving the signal | Base Station1 serving Remote station1 | Remote station for which the signal is intended | Channel freq-uency. | Downlink TS | TSC | MS Received power level of signal | Signal category |
|---|---|---|---|---|---|---|---|---|---|
| 2 | 114 | 126 | 114 | 126 | 32 | 5 | TSC 3 | -33 dBm | Wanted |
| 3 | 114 | 123 | 114 | 123 | 32 | 3 | TSC 2 | -67 dBm | Wanted |
| 4 | 114 | 124 | 114 | 124 | 32 | 3 | TSC 3 | -102 dBm | Wanted |
| 5 | 114 | 123 | 114 | 124 | 32 | 3 | TSC 3 | -67 dBm | interferer |
| 6 | 114 | 124 | 114 | 123 | 32 | 3 | TSC 2 | -102 dBm | interferer |
| 7 | 114 | 125 | 110 | 124 | 32 | 3 | TSC 3 | -105 dBm | interferer |
| 8 | 110 | 124 | 114 | 125 | 32 | 3 | TSC 1 | -99 dBm | interferer |
| 9 | 110 | 125 | 110 | 125 | 32 | 3 | TSC 1 | -101 dBm | Wanted |
| 10 | 110 | 127 | 110 | 127 | 32 | 3 | TSC 4 | -57 dBm | Wanted |

The rows 3 and 4 of Table 2, outlined by a bold rectangle, show both remote station 123 and remote station 124 using channel frequency having index 32 and using time slot 3 for receiving a signal from base station 114 but allocated different training sequences TSC2 and TSC3 respectively. Similarly, rows 9 and 10 also show the same channel frequency and time slot being used for two remote stations 125, 127 to receive signals from the same base station 110. It can be seen that in each case the remote station 125, 127 received power levels of the wanted signals are substantially different for the two remote stations 125, 127.

The highlighted rows 3 and 4 of Table 3 show that base station 114 transmits a signal for remote station 123 and also transmits a signal for remote station 124. The received power level at remote station 123 is -67 dBm whereas the received power level at remote station 124 is -102 dBm. Rows 9 and 10 of Table 3 show that base station 110 transmits a signal for remote station 125 and also transmits a signal for remote station 127. The received power level at remote station 125 is -101 dBm whereas the received power level at remote station 127 is -57 dBm. The large difference in power level, in each case, could be due to different distances of the remote stations 125, 127 from the base station 110. Alternatively the difference in power levels could be due to different path losses or different amounts of multi-path cancellation of the signals, between the base station transmitting the signals and the remote station receiving the signals, for one remote station as compared to the other remote station.

Although this difference in received power level for one remote station compared to the other remote station is not intentional and not ideal for cell planning, it does not compromise the operation of the present method and apparatus.

A remote station 123-127 having DARP capability may successfully demodulate either one of two co-channel, contemporaneously received signals, so long as the amplitudes or power levels of the two signals are similar at the remote station's 123-127 antenna. This is achievable if the signals are both transmitted by the same base station 110, 111, 114 and (could have more than one antenna, e.g., one per signal) the power levels of the two transmitted signals are substantially the same because then each remote station 123-127 receives the two signals at substantially the same power level (say within 6 dB of each other). The transmitted powers are similar if either the base station 110, 111, 114 is arranged to transmit the two signals at similar power levels, or the base station 110, 111, 114 transmits both signals at a fixed power level. This situation can be illustrated by further reference to Table 2 and by reference Table 3.

While Table 2 shows remote stations 123, 124 receiving from base station 114 signals having substantially different power levels, on closer inspection it can be seen that, as shown by rows 3 and 5 of Table 2, remote station 123 receives two signals from base station 114 at the same power level (-67 dBm), one signal being a wanted signal intended for remote station 123 and the other signal being an unwanted signal which is intended for remote station 124. The criteria for a remote station 123-127 to receive signals having similar power levels is thus shown as being met in this example. If mobile station 123 has a DARP receiver, it can, in this example, therefore demodulate the wanted signal and reject the unwanted signal.

Similarly, it can be seen by inspecting rows 4 and 6 of Table 2 (above) that remote station 124 receives two signals sharing the same channel and having the same power level (-102 dBm). Both signals are from base station 114. One of the two signals is the wanted signal, for remote station 124 and the other signal is the unwanted signal which is intended for use by remote station 123.

To further illustrate the above concepts, Table 3 is an altered version of Table 2 wherein the rows of Table 2 are simply re-ordered. It can be seen that remote stations 123 and 124 each receive from one base station 114 two signals, a wanted and an unwanted signal, having the same channel and similar power levels. Also, remote station 125 receives from two different base stations 110, 114 two signals, a wanted and an unwanted signal, having the same channel and similar power levels.

TABLE 3

| Row | BASE STATION transmitting the signal | Remote station1 receiving the signal | Base Station1 serving Remote station1 | Remote station for which the signal is intended | Channel freq-uency. | Downlink TS | TSC | MS Received power level of signal | Signal category |
|---|---|---|---|---|---|---|---|---|---|
| 2 | 114 | 126 | 114 | 126 | 32 | 5 | TSC 3 | -33 dBm | wanted |
| 3 | 114 | 123 | 114 | 123 | 32 | 3 | TSC 2 | -67 dBm | wanted |
| 4 | 114 | 123 | 114 | 124 | 32 | 3 | TSC 3 | -67 dBm | interferer |
| 5 | 114 | | | | | | | | |
| 6 | 114 | 124 | 114 | 123 | 32 | 3 | TSC 2 | -102 dBm | interferer |
| 7 | 114 | 124 | 114 | 124 | 32 | 3 | TSC 3 | -102 dBm | wanted |
| 8 | 110 | 124 | 114 | 125 | 32 | 3 | TSC 1 | -99 dBm | interferer |
| 9 | | | | | | | | | |
| 10 | 114 | 125 | 110 | 124 | 32 | 3 | TSC 3 | -105 dBm | interferer |
| 11 | 110 | 125 | 110 | 125 | 32 | 3 | TSC 1 | -101 dBm | wanted |
| | 110 | 127 | 110 | 127 | 32 | 3 | TSC 4 | -57 dBm | wanted |

The apparatus and method described above have been simulated and the method has been found to work well in a GSM system. The apparatus described above and shown in FIGS. 8A, 8B, 10A, 11 and 12 could be part of a base station 110, 111, 114 of a GSM system for example.

According to another aspect of the present method and apparatus it is possible for a base station 110, 111, 114 to maintain a call with two remote stations 123-127 using the same channel, such that a first remote station 123-127 has a DARP-enabled receiver and a second remote station 123-127 does not have a DARP-enabled receiver. The amplitudes of signals received by the two remote stations 124-127 are arranged to be different by an amount which is within a range of values, in one example it may be between 8 dB and 10 dB, and also arranged such that the amplitude of the signal intended for the DARP-enabled remote station is lower than the amplitude of the signal intended for the non-DARP-enabled remote station 124-127.

A MUROS or non-MUROS mobile may treat its unwanted signal as interference. However, for MUROS, both signals may be treated as wanted signals in a cell. An advantage with MUROS enabled networks (the networks including e.g., a BS 110, 111, 114 and BSC 141, 144) is that the BS 110, 111, 114 may use two or more training sequences per timeslot instead of only one so that both signals may be treated as desired signals in the same cell. The BS 110, 111, 114 transmits the signals at suitable amplitudes so that each remote station 123-127 of the present method and apparatus receives its own signal at a high enough amplitude and the two signals are maintained with an amplitude ratio such that the two signals corresponding to the two training sequences may be both be detected.

This feature may be implemented using software stored in memory in the BS 110, 111, 114 or BSC 600. For example, MSs 123-127 are selected for pairing based on their path losses and based on existing traffic channel availability. However, MUROS can still work if the path losses are very different for one remote station 123-127 than for the other remote station 123-127. This may occur when one remote station 123-127 is much further away from the BS 110, 111, 114.

Regarding power control there are different possible combinations of pairings. Both remote stations 123-127 can be DARP capable or alternatively only one can be DARP capable. In both cases, the received amplitudes or power levels at the mobile stations 123-127 may be within 10 dB of each other. However if only one remote station 123-127 is DARP capable, a further constraint is that the non-DARP mobile 123-127 receives its wanted (or desired) first signal at a level higher than the level at which it receives the second signal (in one example, at least 8 dB higher than the second signal). The DARP capable remote station 123-127 receives its second signal at a level which is lower than the level of the first signal by an amount which is less than a threshold amount (in one example, the second signal is no lower than 10 dB below the first signal).

Hence in one example, the amplitude ratio can be 0 dB to ±10 dB for two DARP capable remote stations 123-127 or, in the case of a non-DARP/DARP pairing of remote stations 123-127, the signal for the non-DARP remote station 123-127 is received 8 dB to 10 dB higher than the signal for the DARP remote station 123-127. Also, it is preferable for the BS 110, 111, 114 to transmit the two signals so that each remote station 123-127 receives its wanted signal above its sensitivity limit. (In one example, it is at least 6 dB above its sensitivity limit). So if one remote station 123-127 has more path loss, the BS 110, 111, 114 transmits that remote station's 123-127 signal at an amplitude high enough to ensure that the transmitted signal is received by the remote station 123-127 at a level above the sensitivity limit. This sets the absolute transmitted amplitude for that signal. The difference in level required between that signal and the other signal then determines the absolute amplitude of the other signal.

Figure 12:
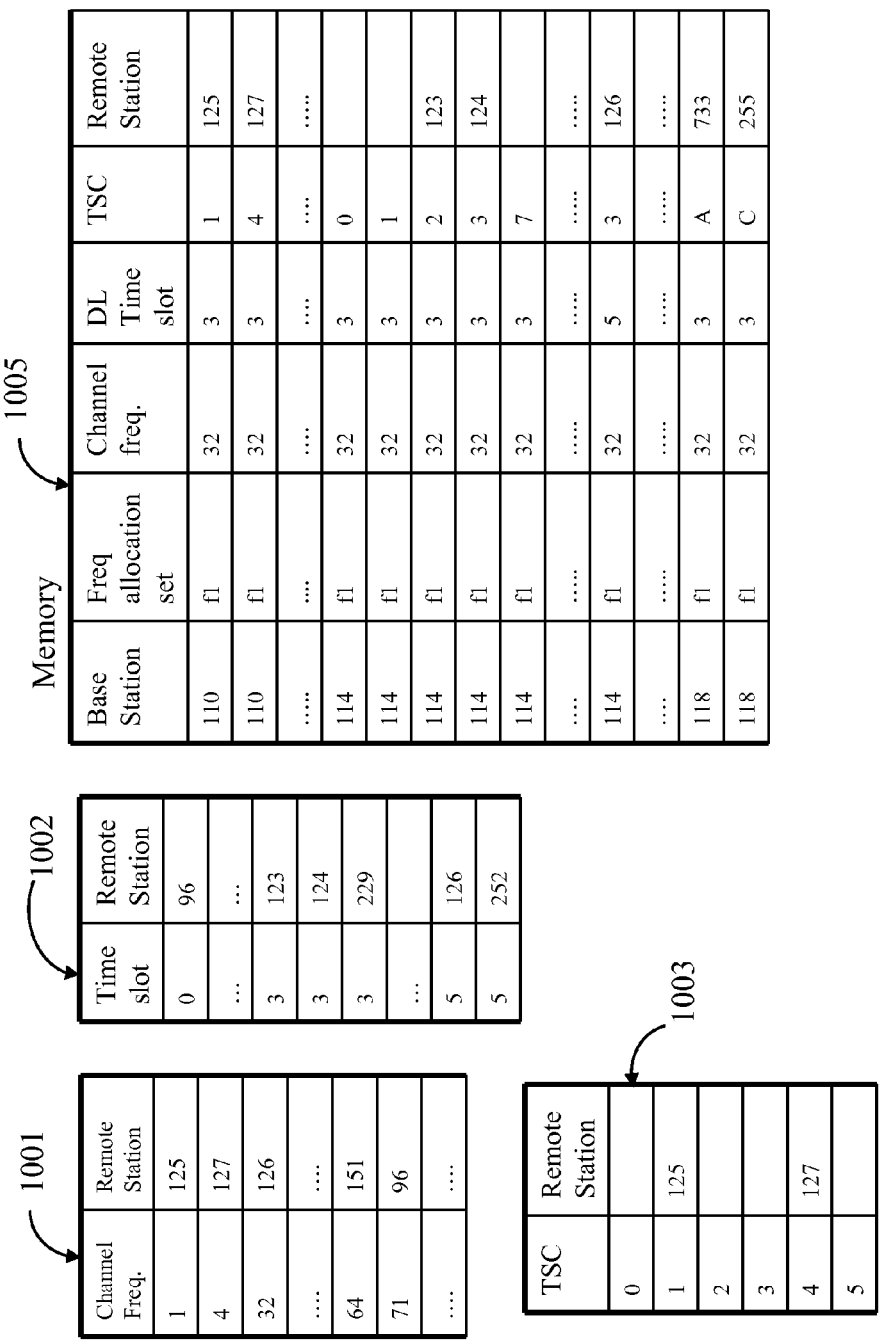
FIG. 12 shows example arrangements for data storage within a memory subsystem which might reside within a base station controller (BSC) of a cellular communication system.

FIG. 12 of the accompanying drawings shows example arrangements for data storage within a memory subsystem 650 which might reside within a base station controller (BSC) 600 of the present method and apparatus of cellular communication system 100. Table 1001 of FIG. 12 is a table of values of channel frequencies assigned to remote stations 123-127, the remote stations 123-127 being numbered. Table 1002 is a table of values of time slots wherein remote station numbers 123-127 are shown against time slot number. It can be seen that time slot number 3 is assigned to remote stations 123, 124 and 229. Similarly table 1003 shows a table of data allocating training sequences (TSCs) to remote stations 123-127.

Table 1005 of FIG. 12 shows an enlarged table of data which is multi-dimensional to include all of the parameters shown in tables 1001, 1002, and 1003 just described. It will be appreciated that the portion of table 1005 shown in FIG. 12 is only a small part of the complete table that would be used. Table 1005 shows in addition the allocation of frequency allocation sets, each frequency allocation set corresponding to a set of frequencies used in a particular sector of a cell or in a cell. In Table 1005, frequency allocation set f1 is assigned to all remote stations 123-127 shown in the table 1005 of FIG. 12. It will be appreciated that other portions of Table 1005, which are not shown, will show frequency allocation sets f2, f3 etc. assigned to other remote stations 123-127. The fourth row of data shows no values but repeated dots indicating that there are many possible values not shown between rows 3 and 5 of the data in table 1001.

Figure 13:
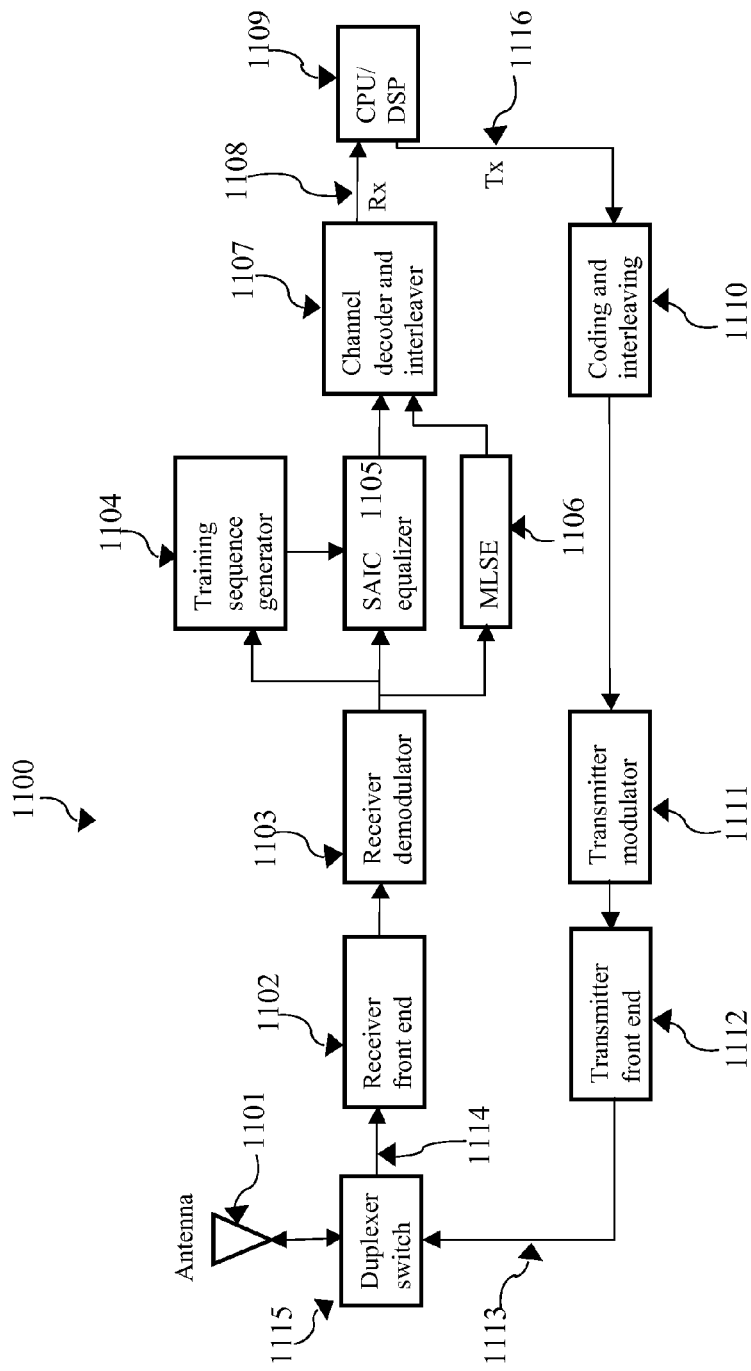
FIG. 13 shows an example receiver architecture for a remote station having the DARP feature.

FIG. 13 of the accompanying drawings shows an example receiver architecture for a remote station 123-127 of the present method and apparatus having the DARP feature. In one example, the receiver is adapted to use either the single antenna interference cancellation (SAIC) equalizer 1105, or the maximum likelihood sequence estimator (MLSE) equalizer 1106. Other equalizers implementing other protocols may also be used. The SAIC equalizer is preferred for use when two signals having similar amplitudes are received. The MLSE equalizer is typically used when the amplitudes of the received signals are not similar, for example when the wanted signal has an amplitude much greater than that of an unwanted co-channel signal.

Figure 14:
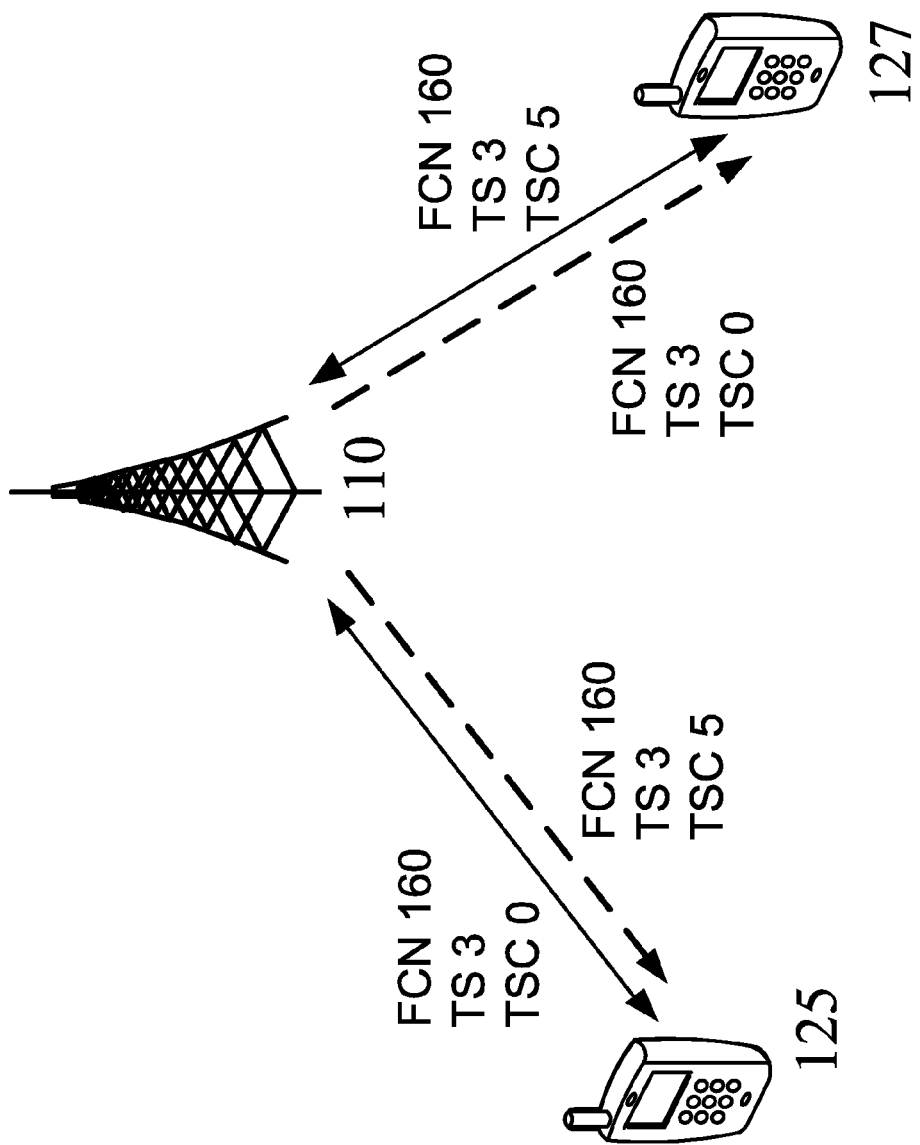
FIG. 14 shows part of a GSM system adapted to assign the same channel to two remote stations.

FIG. 14 of the accompanying drawings shows part of a GSM system adapted to assign the same channel to two remote stations 123-127. The system comprises a base station transceiver subsystem (BTS), or base station 110, and two remote stations, mobile stations 125 and 127. The network can assign, via the base station transceiver subsystem 110, the same channel frequency and the same time slot to the two remote stations 125 and 127. The network allocates different training sequences to the two remote stations 125 and 127. Remote stations 125 and 127 are both mobile stations and are both assigned a channel frequency having ARFCN equal to 160 and a time slot with time slot index number, TS, equal to 3. Remote station 125 is assigned training sequence having a TSC of 5 whereas remote station 127 is assigned training sequence having a TSC of 0. Each remote station 125, 127 will receive its own signal (shown by solid lines in the figure) together with the signal intended for the other remote station 125, 127 (shown by dotted lines in the figure). Each remote station 125, 127 is able to demodulate its own signal whilst rejecting the unwanted signal.

As described above, according to the present method and apparatus a single base station 110, 111, 114 can transmit a first and second signal, the signals for first and second remote stations 123-127 respectively, each signal transmitted on the same channel, and each signal having a different training sequence. The first remote station 123-127 having DARP capability is able to use the training sequences to distinguish the first signal from the second signal and to demodulate and use the first signal, when the amplitudes of the first and second signals are substantially within, say, 10 dB of each other.

In summary, FIG. 14 shows that the network assigns the same physical resources to two mobile stations 125, 127, but allocates different training sequences to them. Each MS will receive its own signal (shown as a solid line in FIG. 14) and that intended for the MS of the other co-TCH user (shown as a dotted line in FIG. 14). On the downlink, each mobile station will consider the signal intended for the other mobile station as a CCI and reject the interference. Thus, two different training sequences may be used to allow the suppression of interference from a signal for another MUROS user.

Joint Detection on the Uplink

The present method and apparatus uses GMSK and the DARP capability of the handset to avoid the need for the network to support a new modulation method. A network may use existing methods on the uplink to separate each user, e.g., joint detection. It uses co-channel assignment where the same physical resources are assigned to two different remote stations 123-127, but each mobile is assigned a different training sequence. On the uplink each remote station 123-127 of the present method and apparatus may use a different training sequence. The network may use a joint detection method to separate two users on the uplink.

Speech Codec and Distance to New User

To reduce the interference to other cells, the BS 110, 111, 114 controls its downlink power relative to the remote or mobile station's distance from it. When the MS 123-127 is close to the BS 110, 111, 114, the RF power level transmitted by the BS 110, 111, 114 to the remote station 123-127 on the downlink may be lower than to remote stations 123-127 that are further away from the BS 110, 111, 114. The power levels for the co-channel users are large enough for the caller who is further away when they share the same ARFCN and timeslot. They can both have the same level of the power, but this can be improved if the network considers the distance of co-channel users from the base station 110, 111, 114.

In one example, power may be controlled by identifying the distance and estimate the downlink power needed for the new user 123-127. This can be done through the timing advance (TA) parameter of each user 123-127. Each user's 123-127 RACH provides this info to the BS 110, 111, 114.

Similar Distances for Users

Another novel feature is to pick a new user with a similar distance as a current/existing user. The network may identify the traffic channel (TCH=ARFCN and TS) of an existing user who is in the same cell and at similar distance and needs roughly the same power level identified above. Also, another novel feature is that the network may then assign this TCH to the new user with a different TSC from the existing user of the TCH.

Selection of Speech Codec

Another consideration is that the CCI rejection of a DARP capable mobile will vary depending on which speech codec is used. Thus, the network (NW) may use this criteria and assign different downlink power levels according to the distance to the remote station 123-127 and the codecs used.

Thus, it may be better if the network finds co-channel users who are of similar distance to the BS 110, 111, 114. This is due to the performance limitation of CCI rejection. If one signal is too strong compared to the other, the weaker signal may not be detected due to the interference. Therefore, the network may consider the distance from the BS 110, 111, 114 to new users when assigning co-channels and co-timeslots.

The following are procedures which the network may execute to minimize the interference to other cells:

Frequency Hopping to Achieve User Diversity and Take Full Advantage of DTx

Voice calls can be transmitted with a DTx (discontinuous transmission) mode. This is the mode that the allocated TCH burst can be quiet for the duration of no speech (while one is listening). The benefit of that when every TCH in the cell uses DTx is to reduce the overall power level of the serving cell on both UL and DL, hence the interference to others can be reduced. This has significant effect, as normally people do have 40% of time listening. The DTx feature can be used in MUROS mode as well to achieve the know benefit as stated.

There is an extra benefit for MUROS to be achieved when frequency hopping is used to establish user diversity. When two MUROS users pair together, there could be some period of time both MUROS paired users are in DTx. Although this is a benefit to other cells as stated above, neither of the MUROS paired users get the benefit from each other. For this reason, when both are in DTx, the allocated resources are wasted. To take the advantage of this potentially helpful DTx period, one can let frequency hopping to take place so that a group of users are pairing with each other dynamically on every frame basis. This method introduces user diversity into the MUROS operation, and reduces the probability that both paired MUROS users are in DTx. It also increases the probability of having one GMSK on the TCH. Benefits include increasing the performance of speech calls and maximizing the overall capacity of the network (NW).

An example of such case can be illustrated: Suppose the NW identified 8 MUROS callers using full rate speech codecs, A, B, C, D, T, U, V, W, who use similar RF power. Callers A, B, C, D can be non-frequency hopping. In addition, callers A, B, C, D are on the same timeslot, say TS3, but use four different frequencies, ARFCN f1, f2, f3 and f4. Callers T, U, V, W are frequency hopping. In addition, callers T, U, V, W are on the same timeslot TS3 and use frequencies f1, f2, f3 and f4 (Mobile Allocation (MA) list). Suppose they are given Hopping Sequence Number (HSN)=0, and Mobile Allocation Index Offset (MAIO) 0, 1, 2 and 3 respectively. This will let A, B, C, D pair with T, U, V, W in a cyclic form as shown in the table below.

network side, with minor or no changes made on the remote station side 123-127. The network allocates a TCH to a second remote station 123-127 that is already in use by a first remote station 123-127 with a different TSC. For example, when all the TCHs have been used, any additional service(s) required will be paired with the existing TCH(s) that is (are) using similar power.

For example, if the additional service is a 4D1U data call, then the network finds four existing voice call users that use four consecutive timeslots with similar power requirement to the additional new remote station 123-127. If there is no such match, the network can reconfigure the timeslot and ARFCN to make a match. Then the network assigns the four timeslots to the new data call which needs 4D TCH. The new data call also uses a different TSC. In addition, the uplink power for the additional one may brought to be close or to equal the uplink power of the remote station 123-127 already using the timeslot.

Assigning a Remote Station 123-127 More than One TSC

If considering data services which use more than one timeslot, all (when it is even) or all but one (when it is odd) of the timeslots may be paired. Thus, improved capacity may be achieved by giving the remote station 123-127 more than one TSC. By using multiple TSCs, the remote station 123-127 may, in one example, combine its paired timeslots into one timeslot so that the actual RF resource allocation may be cut by half.

For example, for 4DL data transfer, suppose that the remote station 123-127 currently has bursts B1, B2, B3 and B4 in TS1, TS2, TS3 and TS4 in each frame. Using the present method, B1 and B2 are assigned one TSC, say TSC0, while B3 and B4 have a different TSC, say TSC1. The, B1 and B2 may be transmitted on TS1, and B3 and B4 may be transmitted on TS2 in the same frame. In this way, the previous 4DL-assignment just uses two timeslots to transmit four bursts over the air. The SAIC receiver can decode B1 and B2 with TSC0, and B3 and B4 with TSC1. Pipeline processing of decoding the four bursts may make this feature work seamlessly with conventional approaches.

| | Frame No. | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| f1 | A/T | A/W | A/V | A/U | A/T | A/W | A/V | A/U | A/T | A/W | A/V | A/U |
| f2 | B/U | B/T | B/W | B/V | B/U | B/T | B/W | B/V | B/U | B/T | B/W | B/V |
| f3 | C/V | C/U | C/T | C/W | C/V | C/U | C/T | C/W | C/V | C/U | C/T | C/W |
| f4 | D/W | D/V | D/U | D/T | D/W | D/V | D/U | D/T | D/W | D/V | D/U | D/T |

The above is only an example. This form is selected to show how it works. However it should not be limited to this particular arrangement. It works even better if more randomness of pairing is introduced. This can be achieved by put all of 8 users on frequency hopping on the four MA list, and give them different HSNs (in the above example 0 to 3) and MAIOs, provided two users are on each ARFCN.

Data Transfer

The first method pairs the traffic channel (TCH) being used. In one example, this feature is implemented on the Combining Timeslots Combining one user's even number of timeslots may halve the over the air (OTA) allocation, saving battery energy. This also frees additional time for scanning and/or monitoring of neighbor cells and system information update for both serving cell and neighbor cells. There are some further features on the network side. The network may make the additional assignment of co-channel, co-time slot (co-TS) based on the distance of the new users. Initially the network may use the TCH whose users are at a similar distance. This can be done through timing TA of each user. Each user's RACH provides this info to the BS 110, 111, 114.

Changes in Network Traffic Assignment

The above also means that if two co-channel, co-TS users are moving in different directions one moving towards the BS 110, 111, 114 and the other moving away from the BS 110, 111, 114, there will be a point that one of them will switch to another TCH that has a better match of the power level. This should not be a problem, as the network may be continuously re-allocating the users on different ARFCN and TS. Some further optimization may be helpful, such as optimizing selection of the new TSC to be used, as this is related with the frequency reuse pattern in the local area. One advantage of this feature is that it uses mainly software changes on network side. e.g., BS 110, 111, 114 and BSC 141-144. Changes on network traffic channel assignment may increase the capacity.

Co-channel Operation for Both Voice and Data

Further improvements may be made. First, Co-TCH (co-channel and co-timeslot) may be used for voice calls as well as for data calls on the same TCH to improve capacity-data rate. This feature may be applied to GMSK modulated data services, such as CS1 to 4 and MCS1 to 4. 8PSK.

Fewer Timeslots Used

This feature may be applied to reuse of co-channel (co-TCH) on data calls to achieve increased capacity. Two timeslots of data transfer may be paired and transmitted using one timeslot with two training sequences used in each of the corresponding bursts. They are assigned to the target receiver. This means that 4-timeslot downlink may be reduced to a 2-timeslot downlink, which saves power and time for the receiver. Changing from 4-timeslots to 2-timeslots gives the remote station more time to do other tasks, such as monitoring neighbor cells (NC), which will improve the hand off or HO. The constraints of assignments with respect to Multi-slot Class configuration requirements such as Tra, Trb, Tta, Ttb—Dynamic and Extended Dynamic MAC mode rules may be relaxed. This means that there are more choices for the network to serve the demands from various callers in the cell. This reduces or minimizes the number of denied service requests. This increases the capacity and throughput from the network point of view.

Each user can use less resources without compromise of QoS. More users can be served. In one example, this may be implemented as a software change on the network side, and the remote station 123-127 is adapted to accept additional TSCs on top of its DARP capability. The changes on the network traffic channel assignment may increase the capacity-throughput. Use of uplink network resources can be conserved, even while the network is busy. Power can be saved on the remote station 123-127. Better handover performance and less restriction on network assigning data calls, and improved performance can be achieved.

Dual Carrier

The present method and apparatus may be used with dual carrier in addition, to improve performance. For improving data rate, there is a 3GPP specification which allocates dual carriers from which MS (or UE or remote station 123-127) can get two ARFCNs simultaneously in order to increase the data rate. Thus, the remote station 123-127 uses more RF resources to get extra data throughput, which intensifies the stated issues above.

Linear GMSK Baseband

One aim of GSM voice services is to achieve the best capacity such that all users use enough power level, but no greater, to maintain an acceptable error rate so that the user's signal may be detected. Any greater power would add to unneeded interference experienced by other users. Signal quality is affected by i) the distance between the base station 110, 111, 114 and the remote station 123-127 and ii) the RF environment. Therefore, different users 123-127 may be assigned different power levels according to their distance and the RF environment. In a GSM based system, power control on the uplink and downlink is good for limiting unnecessary interference and maintaining a good communication channel.

One advantage of using power control with a multiusers-on-one-time-slot (MUROS) enabled network is that different users 123-127 may be transmitted signals with different power levels to meet their individual needs. A second advantage is that a non-DARP enabled remote station 123-127 may be paired with a DARP enabled remote station 123-127 of the present method and apparatus. Then, the non-DARP capable remote station 123-127 may be given a signal with a power level a few dB higher than the DARP enabled remote station 123-127. A third advantage is that using power control allows remote stations 123-127 anywhere in the cell to be paired.

Transmitting Signals at the Same Power Level

DARP enabled mobile stations 123-127 may preferably receive signals at the same amplitude, regardless of whether one mobile is close and the other one far away. For example, two signals transmitted by one base station 110, 111, 114, to one mobile 123-127, the path losses for those signals, from the BS 110, 111, 114 to the particular mobile, say mobile 123, may be the same. Similarly, the path losses for the two signals from BS 110, 111, 114 to mobile 124 may be the same as each other. This occurs because the signals share the same frequency and time slot.

Transmitting Signals at Different Power Levels

However, in one example, two MUROS paired remote stations 123-127 may have different path losses. Therefore, their signal power levels could be different. Hence the BS 110, 111, 114 may send MUROS signals with a power imbalance (say +10 dB to −10 dB)."

Using DARP and Non-DARP Enabled Equipment

Another feature of the present method and apparatus is the use of a MUROS signal by a legacy remote station 123-127 which does not have DARP capability or MUROS features. The present method and apparatus allows a non-DARP remote station 123-127 to use one of two MUROS signals transmitted on the same channel. This is achieved by ensuring that the amplitude of the signal intended for the non-DARP remote station 123-127 is sufficiently greater than the amplitude of the other MUROS signal. The non-DARP remote station 123-127 does not need to indicate DARP capability as part of its radio access capability indicating message and the remote station 123-127 is not required to indicate a MUROS classmark. It is desirable to pair a MUROS remote station 123-127 with a legacy remote station 123-127 in situations where such an amplitude imbalance is acceptable or in situations where a second MUROS remote station 123-127 cannot be identified which is suitable for pairing with a first MUROS remote station 123-127.

It follows that one reason for transmitting the two signals at different amplitudes is to account for the situation where one of the two remote stations 123-127 are not DARP enabled, and the other is DARP enabled. The non-DARP enabled remote station 123-127 may be supplied a signal having more power/amplitude. (In one example, 3 to 8 dB more power depending on the training sequences and the corresponding degree of interference of the other signal (for the DARP remote station 123-127) at the non-DARP mobile station 123-127.

The range(s) of the remote stations 123-127 is a criteria for choosing remote stations 123-127 for MUROS pairing. The path loss (e.g., the RF environment) is another criteria used to determine the amplitude selected for the signal transmitted to the remote station 123-127 having the worst path loss. This also provides the possibility of pairing a larger range (in terms of location) of remote stations 123-127 because the one near the BS 110, 111, 114 may be given more power than necessary purely for an acceptable error rate, if there are no pairs which are better matched. An ideally matched pair of remote stations 123-127 would be a pair using signals of similar amplitudes.

As stated above, it is preferable for the BS 110, 111, 114 to transmit the two signals so that each remote station 123-127 receives its wanted signal above its sensitivity limit. (In one example, it is at least 6 dB above its sensitivity limit). If the non-DARP remote station 123-127 is close to sensitivity limit, then the corresponding DARP paired remote station 123-127 may be selected to be closer to the base station 110, 111, 114 i.e., hence have less path loss, otherwise the DARP enabled remote station 123-127 may lose its signal since its signal is received at a lower amplitude than the amplitude of the other signal. Different codecs may also be used to adapt the remote stations 123-127 to enhance performance when a non-DARP enabled remote station 123-127 is using MUROS enabled equipment of the present method and apparatus.

Transmitting Two Signals

Two signals may be transmitted by a base station 110, 111, 114 using one of two approaches. (Other approaches may also be possible). In the two alternative representations or examples, two GMSK signals may be combined with different amplitudes, $A_1$ for the first signal and $A_2$, for the second. The ratio of amplitudes (or amplitude ratio) corresponds to the ratio of amplitudes for the two transmitted (and received) signals. The path loss between the BS 110, 111, 114 and a given remote station 123-127 is likely to be the same or near-identical for the two signals transmitted by the BS 110, 111, 114.

As discussed above, the BS 110, 111, 114 transmits the signals at suitable amplitudes so that each remote station 123-127 of the present method and apparatus receives its own signal at a high enough amplitude and two signals have an amplitude ratio such that the two signals corresponding to the two TSCs may be detected. The signals may be both transmitted by one transmitter of a base station 110, 111, 114 on the same channel (comprising only one timeslot and only one frequency) with both signals received by the receiver of a first remote station 123-127 in the amplitude ratio and both signals received by the receiver of a second remote station 123-127 in the same amplitude ratio.

The ratio of amplitudes can be expressed as the product of $A_2$ divided by $A_1$ or the product of $A_1$ divided by $A_2$. The ratio is expressed in decibels as $20*\log 10(A_2/A_1)$ or $20*\log 10(A_1/A_2)$. The ratio can be adjusted and preferentially has a magnitude of either substantially 0 dB or substantially between 8 dB and 10 dB. The ratio can be less than one or greater than one and hence, the ratio expressed in dB can be correspondingly positive or negative.

Figure 21A:
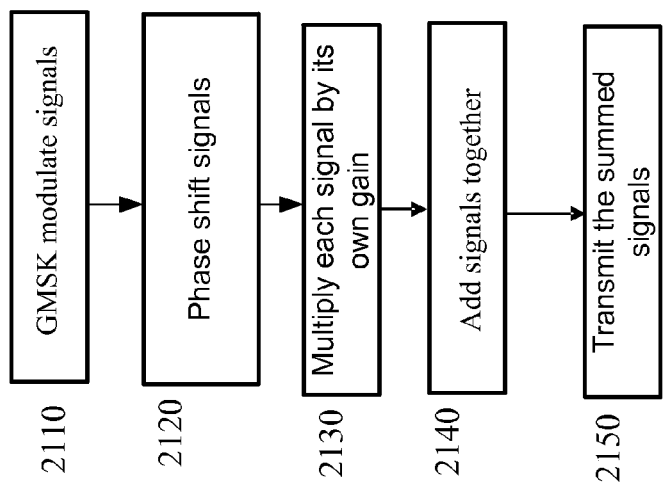
FIG. 21A of the accompanying drawings shows a flowchart illustrating the steps for combining and transmitting two signals with different amplitudes.

In a first approach or example, steps can be carried out in accordance with the flow diagram shown in FIG. 21A. The two signals may be GMSK modulated (step 2110) and added together (step 2140), each with a respective power level chosen to offset attenuation due to the different signal distances and environments. That is, each signal is multiplied by a its own gain (step 2130). The gains may be chosen to be in the ratio $R=A2/A1$, which yields the correct amplitude (hence power) ratio for the two signals. This is what yields the 8-10 dB ratio discussed above.

If both remote stations are DARP enabled, it is preferred in one example for the ratio to be unity (0 dB). For one remote station 123-127 to be DARP enabled and the other non-DARP enabled, it is preferred in one example for the ratio to be 8-10 dB in favour of the non-DARP enabled remote station 123-127. This may be referred to as differential power control and it may be implemented either at baseband or at RF, or both. Further (common) power control can be applied to both signals equally (to account for range, path loss of the remote station 123-127 requiring highest amplitude (e.g. the remote station 123-127 may be further away).

This additional power control may be applied partly at baseband and partly at RF, or only at RF. At baseband, common power control is applied to both signals by the equal scaling of gains A1 and A2, e.g. multiplying them both by 1.5. Common power control at RF is normally executed in the power amplifier (PA) 1830. It could also be partly executed in the RF modulator 1825.

Figure 15:
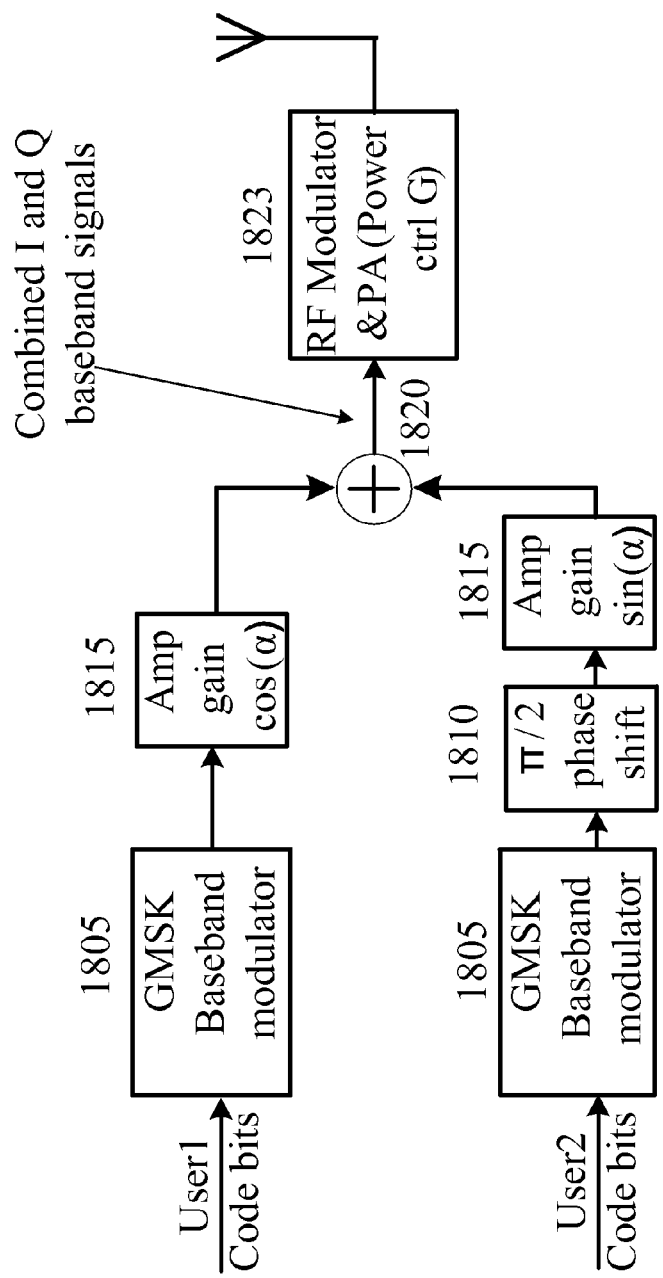
FIG. 15 of the accompanying drawings illustrates a first example of an apparatus for combining and transmitting two signals with different amplitudes.
Figure 16:
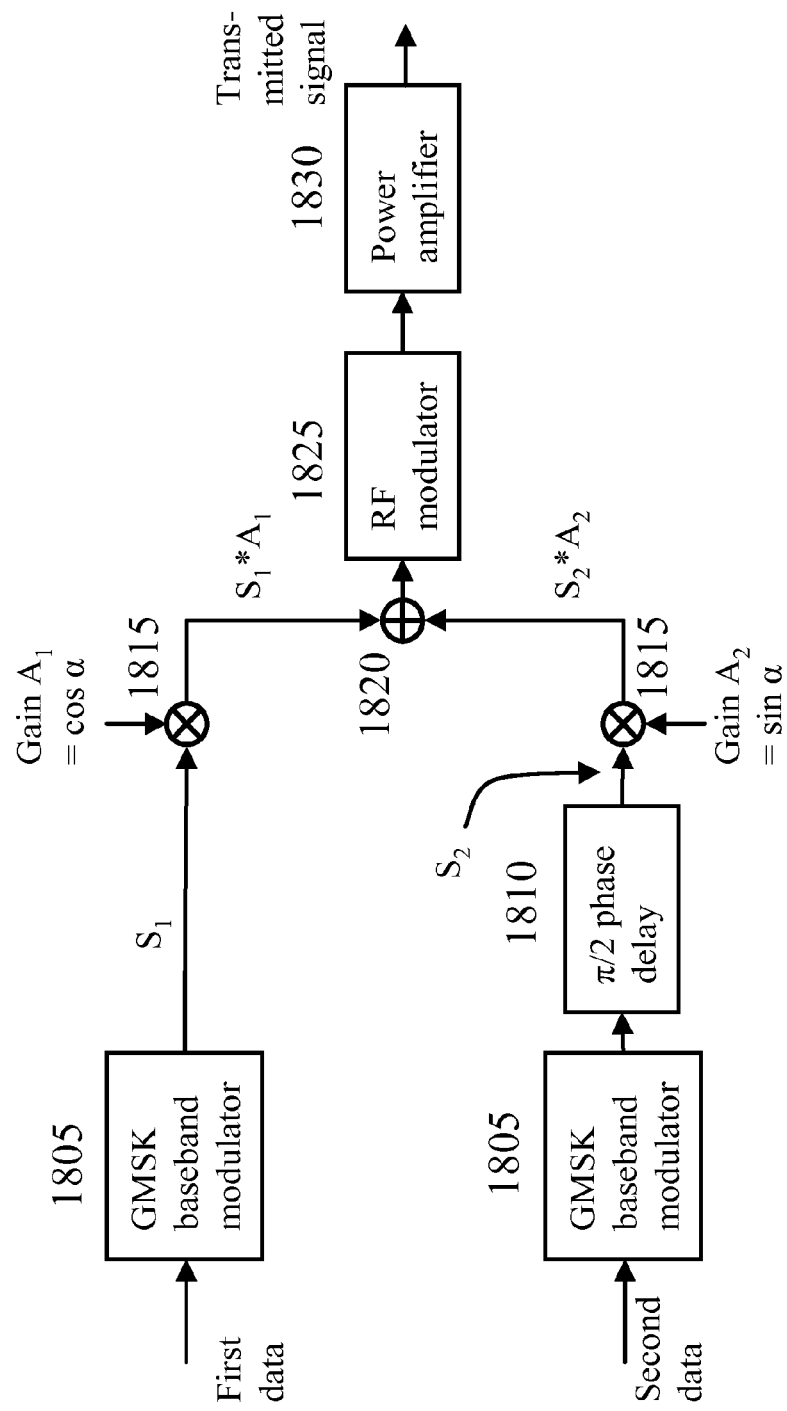
FIG. 16 of the accompanying drawings illustrates a second example of an apparatus for combining and transmitting two signals with different amplitudes.
Figure 17:
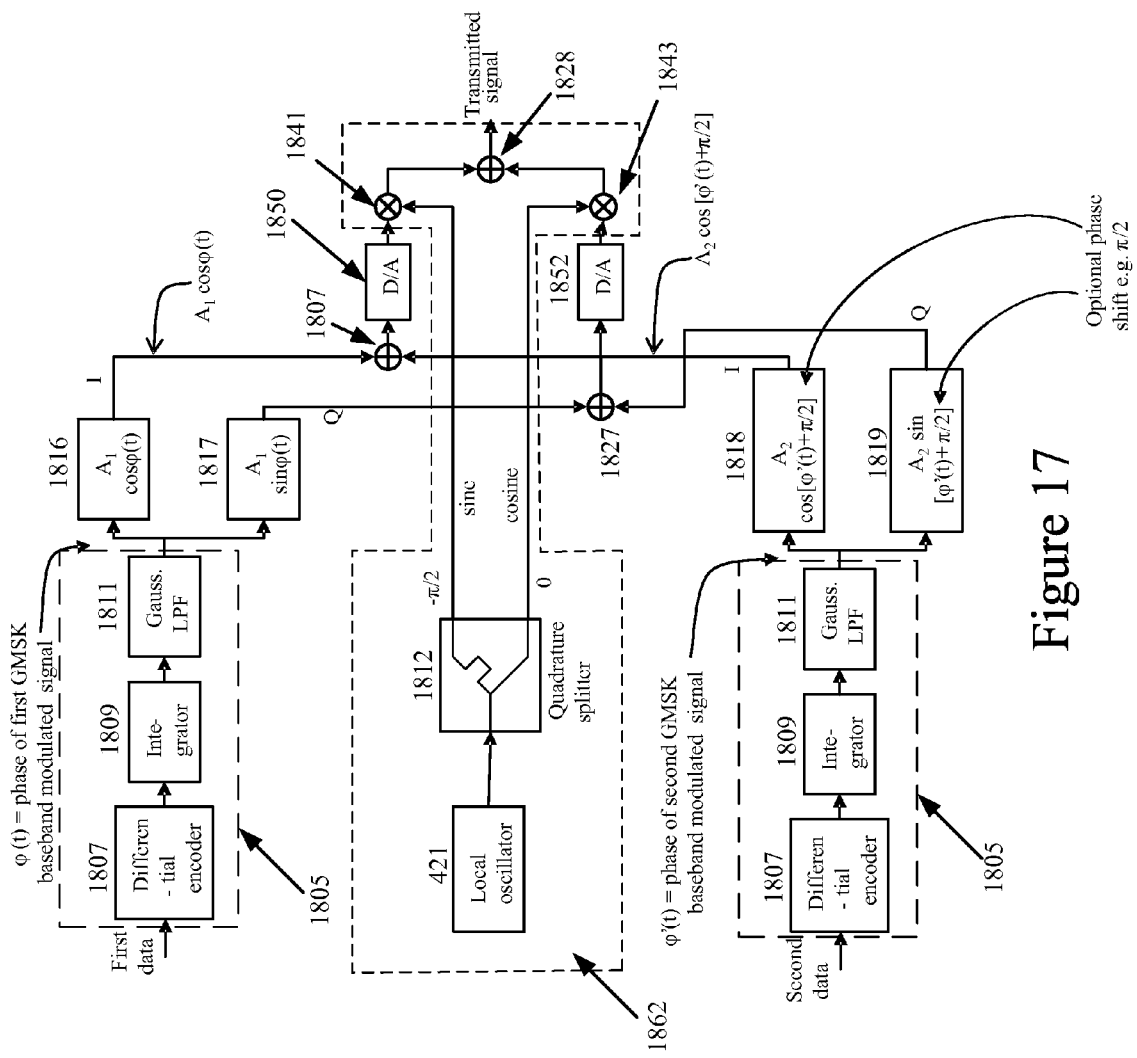
FIG. 17 of the accompanying drawings illustrates a third example of an apparatus for combining and transmitting two signals with different amplitudes.
Figure 18:
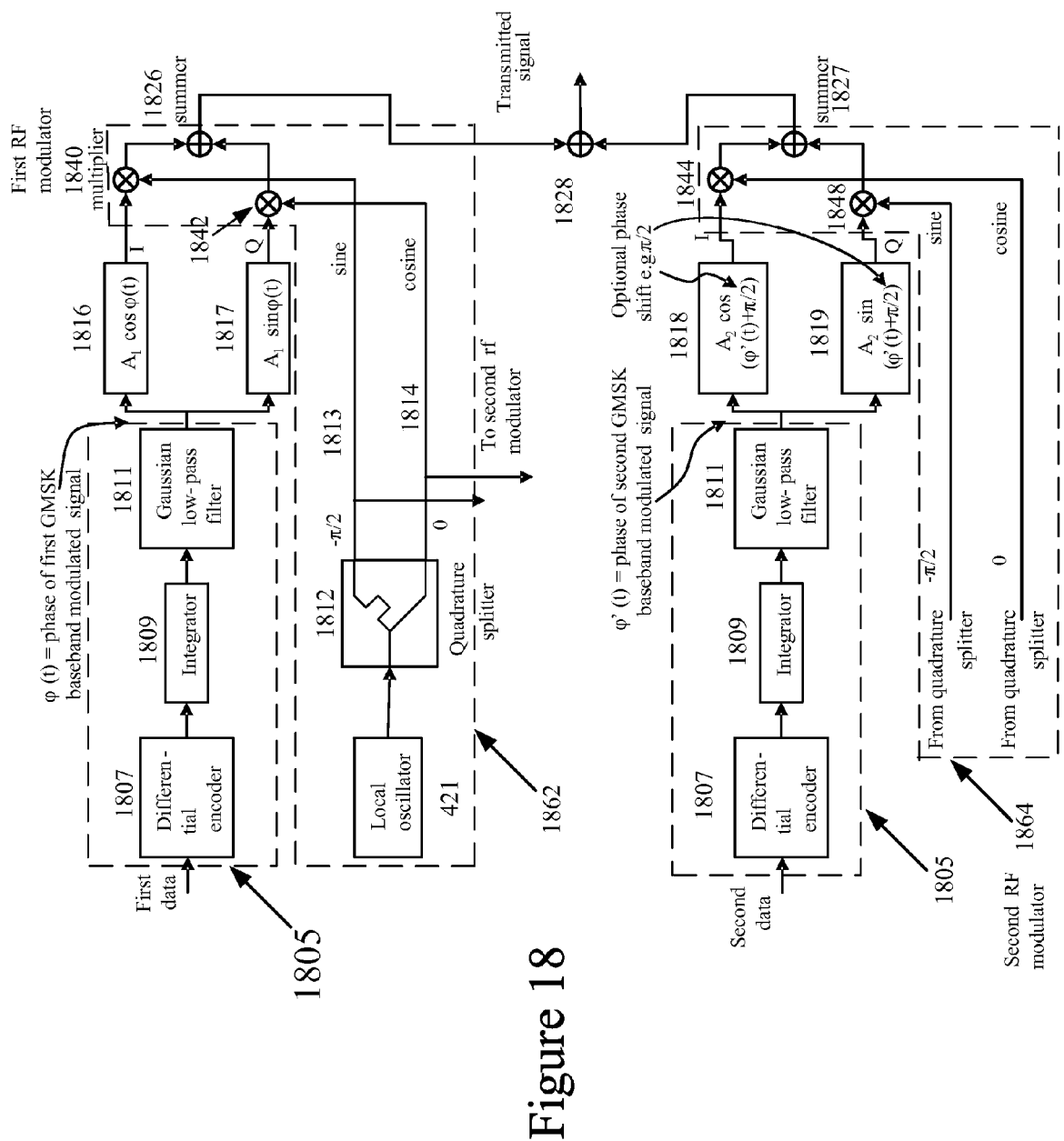
FIG. 18 of the accompanying drawings illustrates a fourth example of an apparatus for combining and transmitting two signals with different amplitudes.
Figure 19:
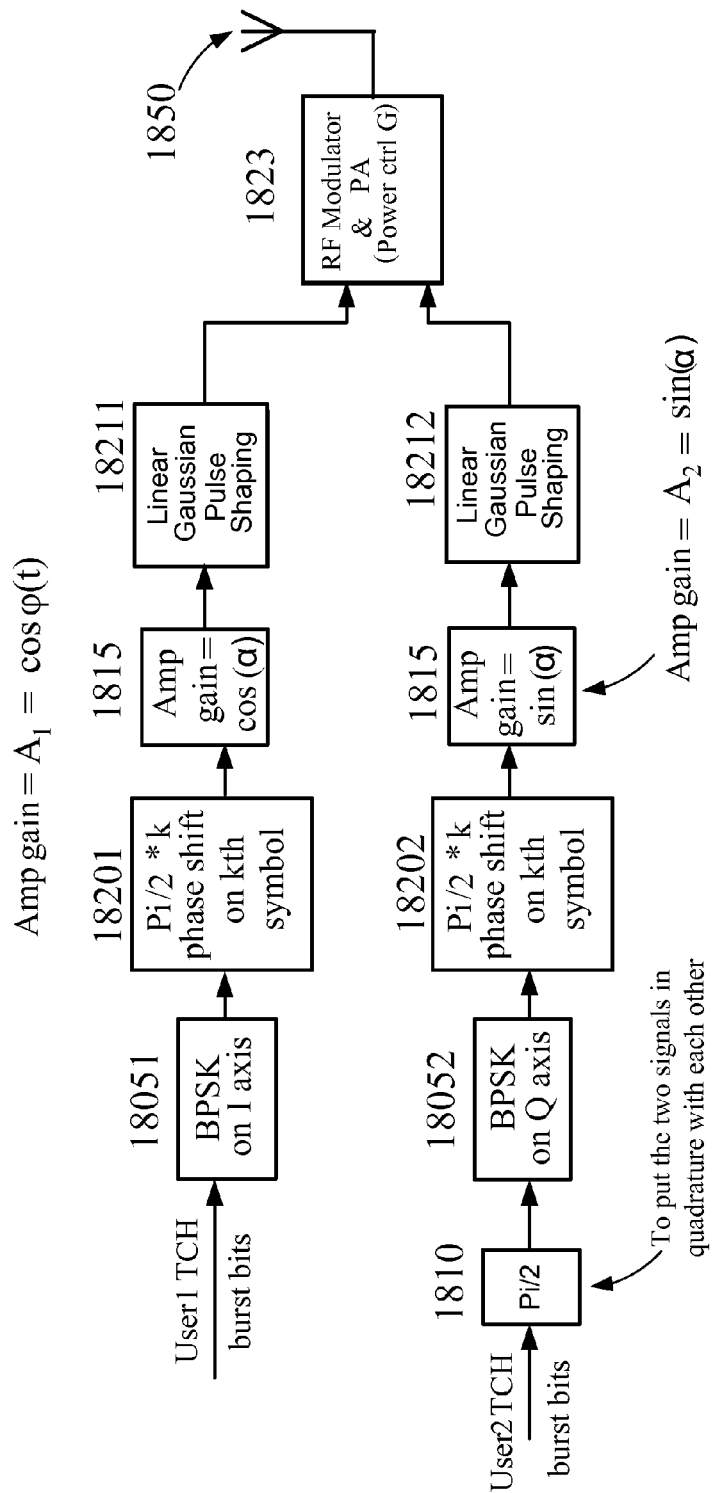
FIG. 19 illustrates an apparatus for combining two signals by mapping two users' data onto the I and Q axis respectively of a QPSK constellation.

Also, one of the signals may be phase shifted by $\pi/2$ relative to the other signal The $\pi/2$ phase shift is shown as step 2120 of FIG. 21A, in block 1810 of FIGS. 15, 16, and 19, and in blocks 1818 and 1819 of FIGS. 17 and 18. The added signals are then transmitted (step 2150). An example apparatus is shown in FIG. 15. Preferably, one of the two signals is shifted in phase relative to the other signal prior to transmission, and preferably by 90 degrees, i.e., $\pi/2$ radians. However the present method and apparatus may work with any phase shift between the signals including zero phase shift. If more than two signals are transmitted, each signal can be offset in phase from the others. For example, for three signals each can be offset from the others by 120 degrees. In FIG. 21A, the steps of phase shifting and amplifying by a gain may be done in either order as illustrated where steps 2120 and 2130 are reversed in the flowchart of FIG. 21C compared to FIG. 21A.

FIG. 15 illustrates an apparatus to combine two signals. It comprises two GMSK baseband modulators 1805 having at least one input and at least one output, whereby the signals are modulated. One amplifier 1815 is connected in series with each GMSK modulator 1805, whereby the two signals are multiplied by a respective amplitude, $A_1$ for the first signal and $A_2$, for the second signal where A1 is equal to $\cos \alpha$ and A2 is equal to $\sin \alpha$.

The output of each amplifier 1815 is combined in a combiner (adder) 1820, and a phase shifter 1810 is preferably operably connected between one of the series combinations of baseband modulator 1805 and amplifier 1815, so that one of said signals is phase shifted with respect to the other signal. The output of the combiner 1820 is input into a RF modulator/power amplifier module 1823, whereby the combined signals are RF modulated and transmitted. By RF modulated, it is meant that the signals are upconverted from baseband to RF frequency. It is noted that the phase shifter 1810 may be operably connected between one amplifier 1815 and the combiner 1820.

FIG. 16, FIG. 17 and FIG. 18 illustrate respectively second, third and fourth examples of apparatus for combining and transmitting two signals with different amplitudes.

In FIG. 16, the RF modulator & power amplifier 1823 is represented by a series connection of a RF modulator 1825 and power amplifier 1830. The example shown in FIG. 17 shows the use of GMSK baseband modulators 1805 and one RF modulator 1862. The first and second data are baseband modulated by baseband modulators 1805. Baseband modulators 1805 each comprise a differential encoder, an integrator and a Gaussian lowpass filter 1811. The outputs of the respective baseband modulators 1805 are each a digital value representing the phase of the GMSK modulated signal (φ(t) for the first signal and φ'(t) for the second signal). Block 1816 comprises a function which produces the cosine of said phase of the first signal and multiples the cosine by a gain A1 to provide an output signal, A1 cos φ(t) at the output of the block 1816.

Block 1818 comprises a function which adds a phase shift of pi/2 radians (90 degrees) to the phase of the second signal, produces the cosine of the resulting phase and multiples the cosine by a gain A2 to provide an output signal, A2 cos(φ'(t)+90) at the output of the block 1818.

Block 1817 comprises a function which produces the sine of said phase of the first signal and multiples the sine by a gain A1 to provide an output signal, A1 sin φ(t) at the output of the block 1817.

Block 1819 comprises a function which adds a phase shift of pi/2 radians (90 degrees) to the phase of the second signal, produces the sine of the resulting phase and multiples the sine by a gain A2 to provide an output signal, A2 sin (φ'(t)+90) at the output of the block 1819.

The outputs of blocks 1816 and 1818 are summed/combined by combiner 1807 to produce a summed I (in-phase) GMSK modulated baseband signal. The outputs of blocks 1817 and 1819 are summed/combined by combiner 1827 to produce a summed Q (quadrature-phase) GMSK modulated baseband signal.

Preferably, as shown, all operations and signals in blocks 1816-1819, 1807 and 1827, are digital, and so the outputs of the combiners 1807, 1827 are also digital values. Alternatively, some of the functions could be performed by analogue circuitry by the use of digital-to-analogue conversion, etc.

The summed GMSK modulated baseband digital signals output from combiners 1807, 1827 are each input to a digital-to-analogue converter (DAC or D/A) 1850, 1852 and suitably lowpass filtered (filter not shown) to form I and Q inputs to the RF modulator 1862, which upconverts the baseband signals onto a carrier frequency, the carrier frequency provided by local oscillator 421, to form a transmitted signal.

FIG. 17 and FIG. 18 each illustrate two GMSK baseband modulators 1805, each comprising a differential encoder 1807, an integrator 1809 operably connected to said differential encoder 1807, and a Gaussian low pass filter 1811 operably connected to said integrator 1809 The example shown in FIG. 18 shows the use of two GMSK baseband modulators 1805 and two RF modulators 1862, 1864. The output of each RF modulator 1862, 1864, one RF modulator 1862, 1864 for each of the first and second data respectively, are summed/combined with each other, in combiner 1828, for transmission.

FIG. 19 illustrates an apparatus for combining two signals by mapping two users' data onto the I and Q axis respectively of a QPSK constellation. According to this approach, the data of users 1 and 2 is mapped to the I and Q axis respectively of the QPSK constellation, with π/2 progressive phase rotation on every symbol (like EGPRS 3π/8 rotation on every symbol, but with pi/2 instead of 3π/8) with each user's signal power level determined by the $A_1$ and $A_2$ gains Amplifier gain for the I signal (for user 1) is $A_1$ which is equal to the cosine of alpha, α. Amplifier gain for the Q signal is $A_2$ which is equal to the sine of alpha. Alpha is the angle whose tangent is the amplitude ratio between the two signals for user 1 and user 2 respectively.

The baseband modulators 1805 comprise a binary phase shift keying (BPSK) baseband modulator 18051 for a first signal represented on an I axis and a BPSK baseband modulator 18052 for a second signal represented on a Q axis. The transmit I and Q signals which are input to phase rotators 18201 and 18202 of FIG. 19, may be filtered before or after phase shifting, by means of linear Gaussian filter or pulse-shaping filters 18211, 18212 (e.g., for use with EGPRS 8PSK modulation) to satisfy the GSM spectrum mask criteria. FIG. 19 shows a suitable pulse-shaping filter 18211 operably connected between said phase rotator 18201 and a RF modulator/power amplifier 1823 and a suitable pulse-shaping filter 18212 operably connected between said phase rotator 18202 and the RF modulator/power amplifier 1823. The RF modulator and PA 1823 acts to RF modulate, combine and amplify the I and Q signals to provide a combined signal for transmission via the antenna 1850.

In FIGS. 17 and 18 a −π/2 phase shift is introduced to the local oscillator signal by the outputs of the splitter 1812. Thus, the LO is split into in-phase and quadrature-phase carrier signals and input to each of two mixers/multipliers 1840-1844, 1848.

Figure 20:
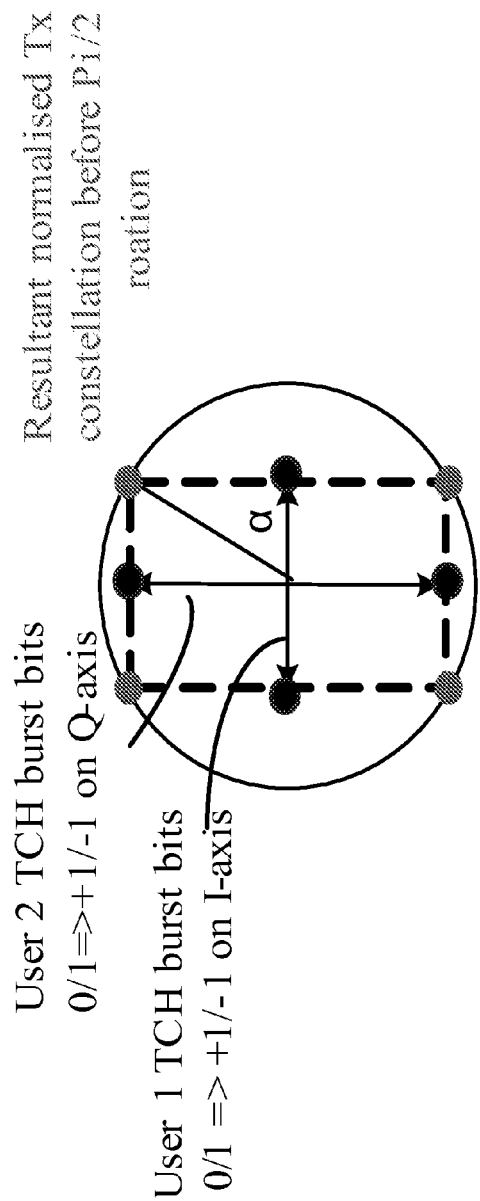
FIG. 20 is a QPSK constellation diagram.

FIG. 20 is a QPSK constellation diagram for a signal output from the apparatus shown in any of FIGS. 17 to 19.

Figure 21B:
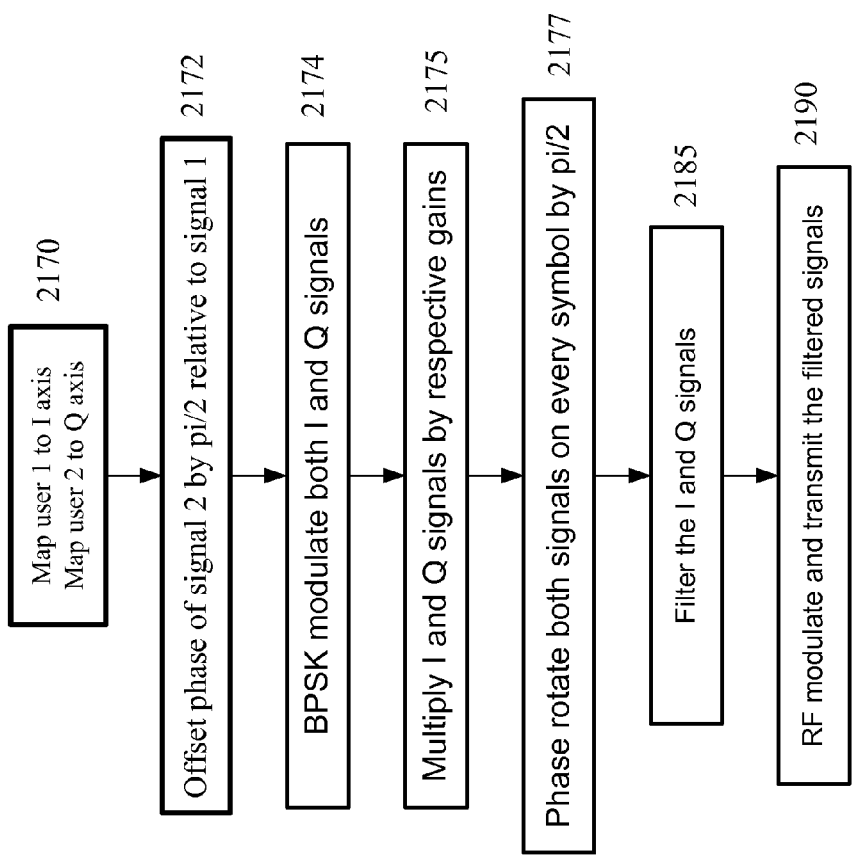
FIG. 21B of the accompanying drawings shows a flowchart illustrating the steps for combining signals by mapping both users the I and Q axis respectively of a QPSK constellation.
Figure 21C:
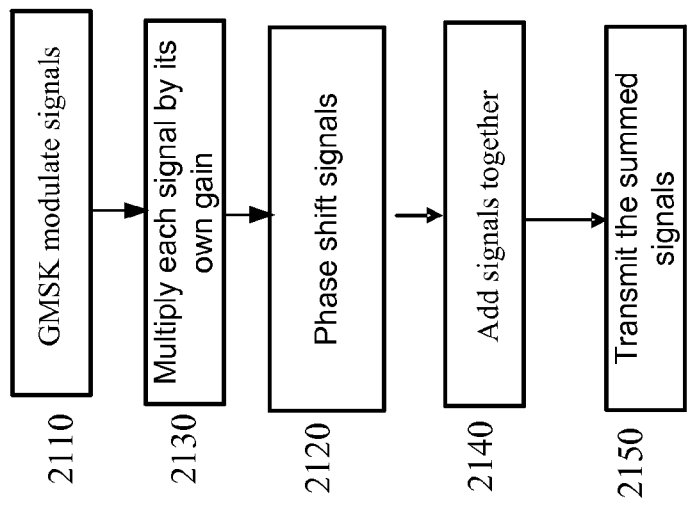
FIG. 21C of the accompanying drawings shows a flowchart illustrating the steps for combining and transmitting two signals with different amplitudes.

The steps executed in the two approaches (GMSK or QPSK based) are illustrated in the flowcharts of FIGS. 21A and 21B respectively. In FIG. 21A, the steps of phase shifting and amplifying by a gain may be done in either order as illustrated in FIG. 21C where the order of steps 2120 and 2130 are reversed compared to the flowchart of FIG. 21A.

With both of the approaches, when a MUROS enabled BS 110, 111, 114 sends a RF burst on the downlink channel, the BS 110, 111, 114 controls two parameters:

First, the I and Q data streams are normalized, which enhances the resolution and dynamic range of the digital-to-analog controller (DAC) 1850, 1852 used.

Second, the power level used for the signal burst containing both the I and Q signals is controlled. This is used to determine the gain for the power amplifier (PA) (see below).

Figure 22:
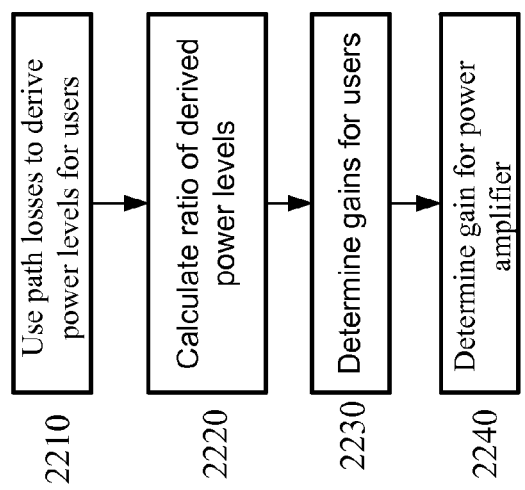
FIG. 22 is a flowchart comprising illustrating the steps taken when adapting a non-MUROS base station to identify an enabled MUROS-capability in a remote base station.

The following are additional steps which may be taken by a MUROS-enabled base station, as compared to a legacy base station, to use the present method and apparatus. See FIG. 22 for a simplified flow diagram.

First, use the path loss of the two signals to derive the power level to be used for both co-TCH callers, say power level 1, P1, for user 1 and power level 2, P2, for user 2 respectively (In this example, the power level is expressed in Watts, not dBm) (step 2210)

Second, calculate the amplitude ratio R of the two power levels (step 2220):

$$R=\sqrt{VP2/P1}$$

Third, determine the gains, G1 and G2, for the two users or callers, user 1 and user 2 respectively (step 2230): In one example, for user 1, $G1=A_1=\cos(\alpha)$, and for user 2, $G2=A_2=\sin(\alpha)$, while $\alpha=$arc tangent (R). Also, $A_2/A_1=\sin(\alpha)/\cos(\alpha)=\tan(\alpha)=R$.

Fourth, determine the gain for the power amplifier by considering the power level:

$$P=P1+P2. \qquad \text{(step 2240)}$$

The present method and apparatus combines two signals that may have different phases and power levels, so that: 1) Each user may receive a wanted signal having the required amplitude together with an unwanted signal, such that the amplitude of the unwanted signal is less than the amplitude at which the unwanted signal would cause unacceptable interference to the wanted signal. This may avoid excessive amplitude that could interfere with others in another cell.

However, in some cases, a lower power remote station 123-127 (lower power is used because it is nearer to the base station 110, 111, 114) can have higher power instead (more than the remote station 123-127 needs) in order to pair with a remote station 123-127 that is further away from the base station 110, 111, 114). The zero-crossing of the modulation 'eye diagram' may be avoided, which may help avoid AM-PM conversion distortion and low signal-to-noise ratio (SNR). In addition, a legacy (non-MUROS) remote station, either non-DARP enabled or DARP enabled, may be used with the MUROS enabled network, i.e., base station 110, 111, 114 or base station controller 140-143.

Adaptive Pulse Shaping

The following passage describes a situation in which two receivers each receive the same two co-channel signals. The principles described apply equally well to a situation in which there are more than two (for example N) receivers, each receiving the same N co-channel signals. A transmitter transmits first and second signals for first and second receivers respectively, each receiver receiving both signals at different amplitudes on the same channel.

There is a conflict between the requirements of the first and second receiver. Each receiver operates best if it receives its own signal at amplitude (or power level) higher than for the other signal. If the transmitter increases the amplitude of the signal for the second receiver, the second signal acts more as interference for the first receiver. Conversely, if the transmitter increases the amplitude of the signal for the first receiver, the first signal acts more as interference for the second receiver.

If the first receiver is closer to the transmitter than the second receiver, or the second receiver suffers greater path loss between the receiver and the transmitter than for the first receiver, then the transmitter may transmit the second signal (for the second receiver) with higher amplitude and the first signal with lower amplitude. The second receiver then receives its own signal at a higher amplitude than that of the first receiver's signal, for example 10 dB or 12 dB higher. This is particularly advantageous for the second receiver if the second receiver receives its signal at an amplitude which is close to the minimum for which the receiver can make use of the signal (the sensitivity limit).

The first receiver, on the other hand, receives its own first signal at a power level less than the level at which it receives the second, co-channel signal.

This situation may occur for example if the second receiver is near a cell boundary of a large cell, or in an area having large signal attenuation, and the first receiver is much closer to the transmitter than the second receiver. Such a situation is sometimes referred to as the 'near-far problem'.

The first receiver may be able to tolerate the co-channel second signal at a high amplitude relative to the amplitude of its own signal. For example, the first receiver may receive its own signal at the same amplitude as for the second signal. This improved tolerance may be due to the receiver having improved capability such as DARP. The first receiver which receives its own first signal at amplitude less than the amplitude of the second signal, cannot make use of its signal if the power of the second signal is greater than a given threshold, relative to the power of the first signal. This places a limit on the maximum range of a second receiver which needs to receive its own second signal at significantly higher amplitude than the amplitude at which it receives the first signal.

One way of addressing this limitation is to increase the effective power of the first signal by spreading its bandwidth by means of pulse-shaping using a broader-bandwidth baseband filter. This allows the power level of the second signal to be increased, while still allowing the first receiver to receive and make use of the first signal. Additionally, due to the broader bandwidth and associated narrower pulse-shaping of the first signal, the second receiver can operate effectively while receiving a higher power level of interfering first signal because the power of the interfering first signal is spread across a wider bandwidth an therefore the first signal acts less as interference than if the first signal occupied a narrower bandwidth.

Figure 24:
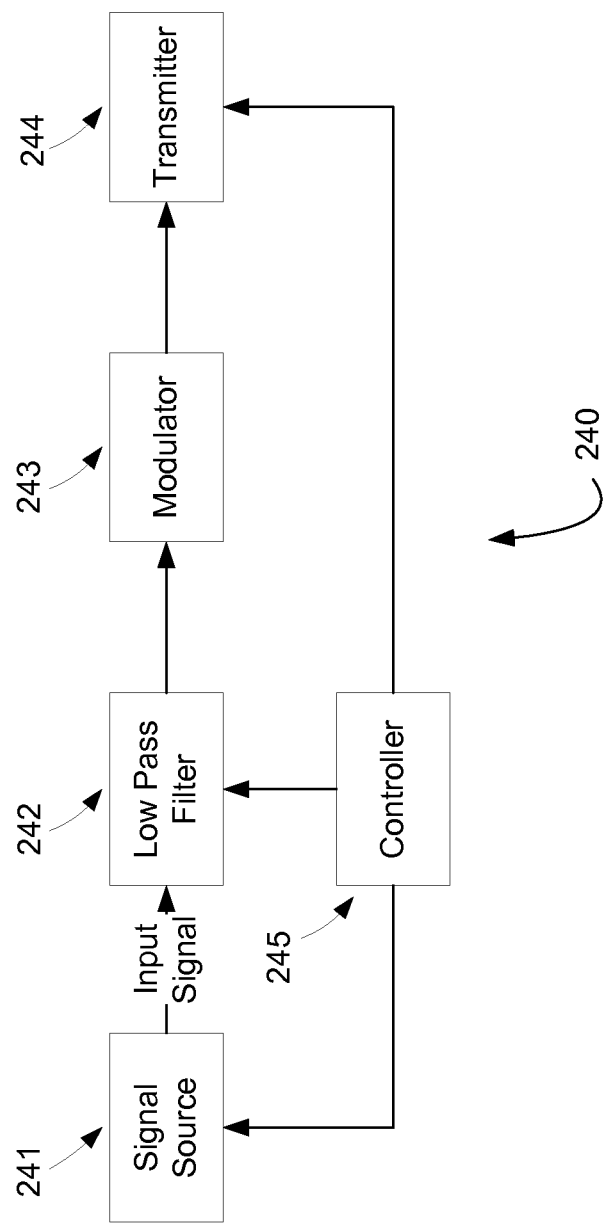
FIG. 24 is a diagram of a transmitting apparatus 240.

FIG. 24 is a diagram of a transmitting apparatus 240. A signal source 241 provides an input signal to a low-pass filter 242 which filters the input signal to produce a filtered signal. The filter 242 is selectively operable in a first mode in which the input signal is filtered within a narrower bandwidth; and in a second mode in which the input signal is filtered within a broader bandwidth. The filtered signal is output to a modulator 243 which modulates the filtered signal to produce a modulated signal. The modulated signal is output to a transmitter 244 which transmits the modulated signal.

A controller 245, connected to the filter 242 and to the transmitter, controls operation of the filter and transmitter depending on the required amplitude of the transmitted signal. If the required amplitude of transmitted signal is higher, the filter is configured to filter the input signal in the first mode and the transmitter is configured to transmit the transmitted signal at a higher power level. If the required amplitude of the transmitted signal is lower, the filter is configured to filter the input signal in the second mode and the transmitter is configured to transmit the transmitted signal at a lower power level.

Figure 25:
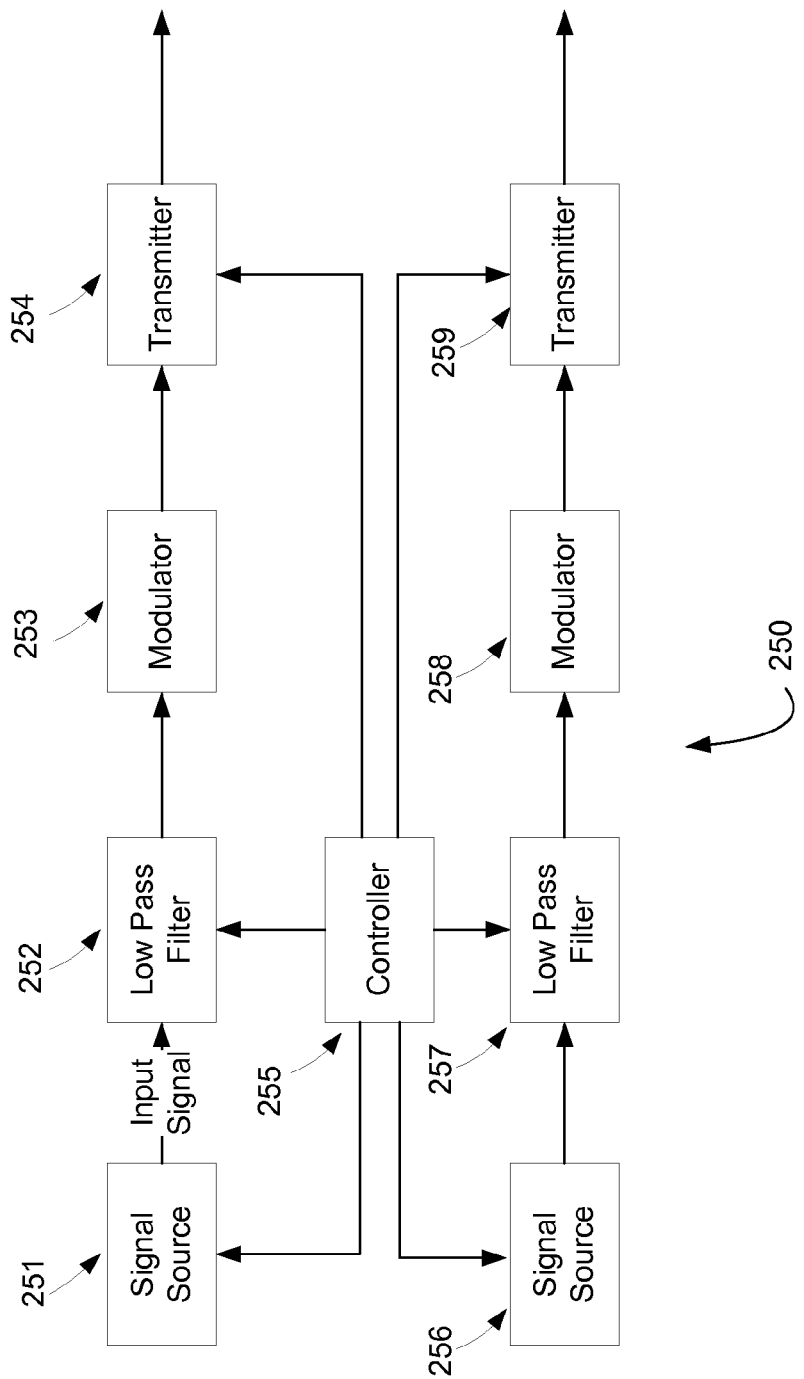
FIG. 25 is a diagram of a transmitting apparatus 250 for transmitting two signals substantially simultaneously.

FIG. 25 is a diagram of a transmitting apparatus 250 for transmitting two signals substantially simultaneously. The apparatus 250 shown in FIG. 25 is similar to the apparatus 240 shown in FIG. 24. The apparatus 250 comprises two signal sources 251, 256, two filters 252, 257, two modulators 253, 258 and two transmitters 254, 259, controlled by a controller 255. The apparatus comprises two signal paths 251 to 254 and 256 to 259 along which respective input signals travel. Thus, signal source 251, low-pass filter 252, modulator 253 and transmitter 254 cooperate to produce a first transmitted signal. Similarly, signal source 256, low-pass filter 257, modulator 258 and transmitter 259 cooperate to produce a second transmitted signal.

Figure 26:
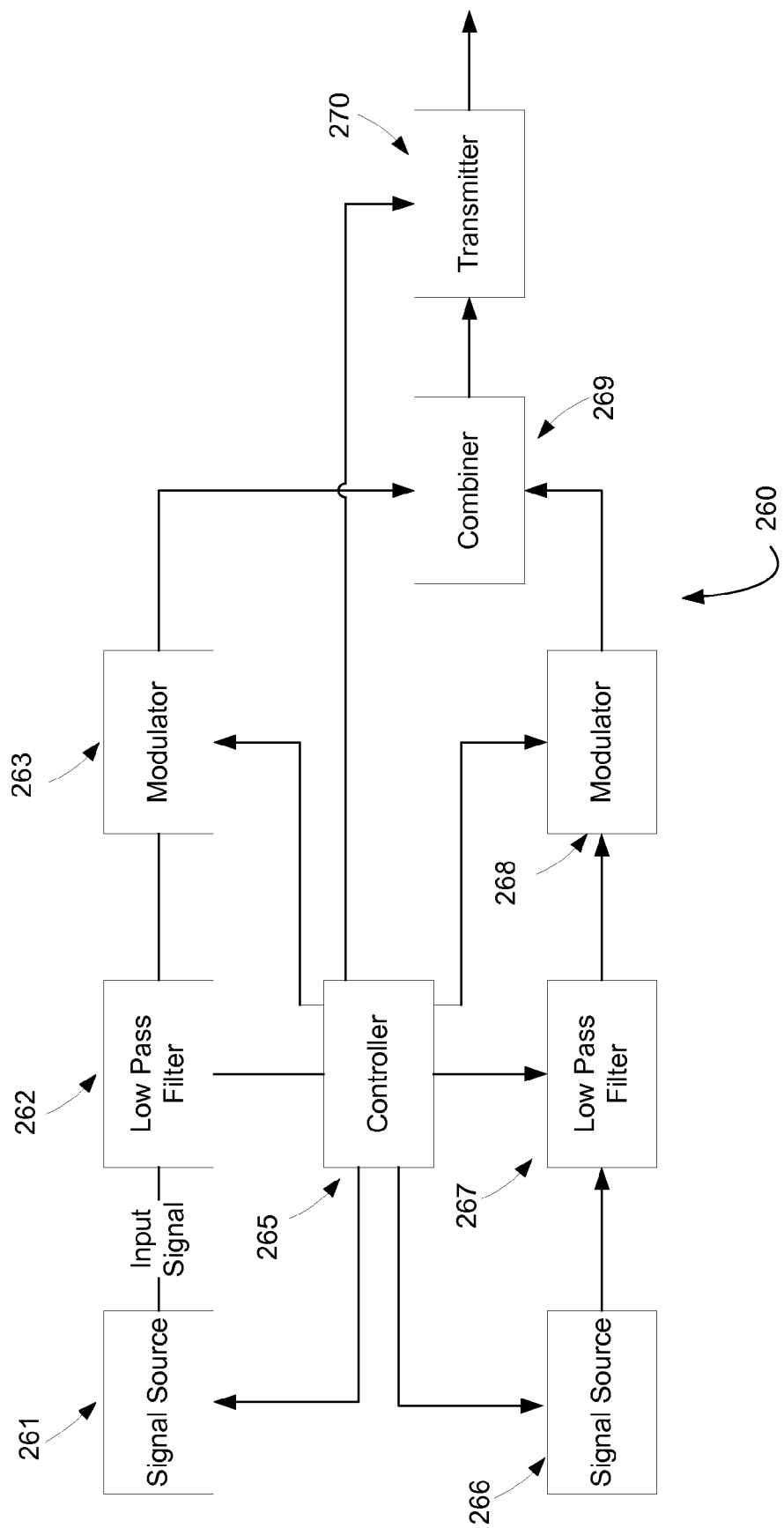
FIG. 26 is a diagram of a transmitting apparatus 260 for transmitting two signals in combination.

FIG. 26 is a diagram of a transmitting apparatus 260 for transmitting two signals in combination. The apparatus 260 shown in FIG. 26 is similar to the apparatus 250 shown in FIG. 25 in that it comprises two signal paths 261 to 265 and 266 to 268 along which respective input signals travel. The apparatus 260 also comprises: a combiner 269 between the two modulators 263, 268; and a transmitter 270 for combining the signals from the two paths 261 to 263 and 266 to 268 before transmission. The combiner 269 combines the first and second modulated signals. The combiner may comprise for example a passive or active summing network. The combiner outputs a combined signal to a transmitter 270. The transmitter 270 transmits the combined signal.

Figure 27:
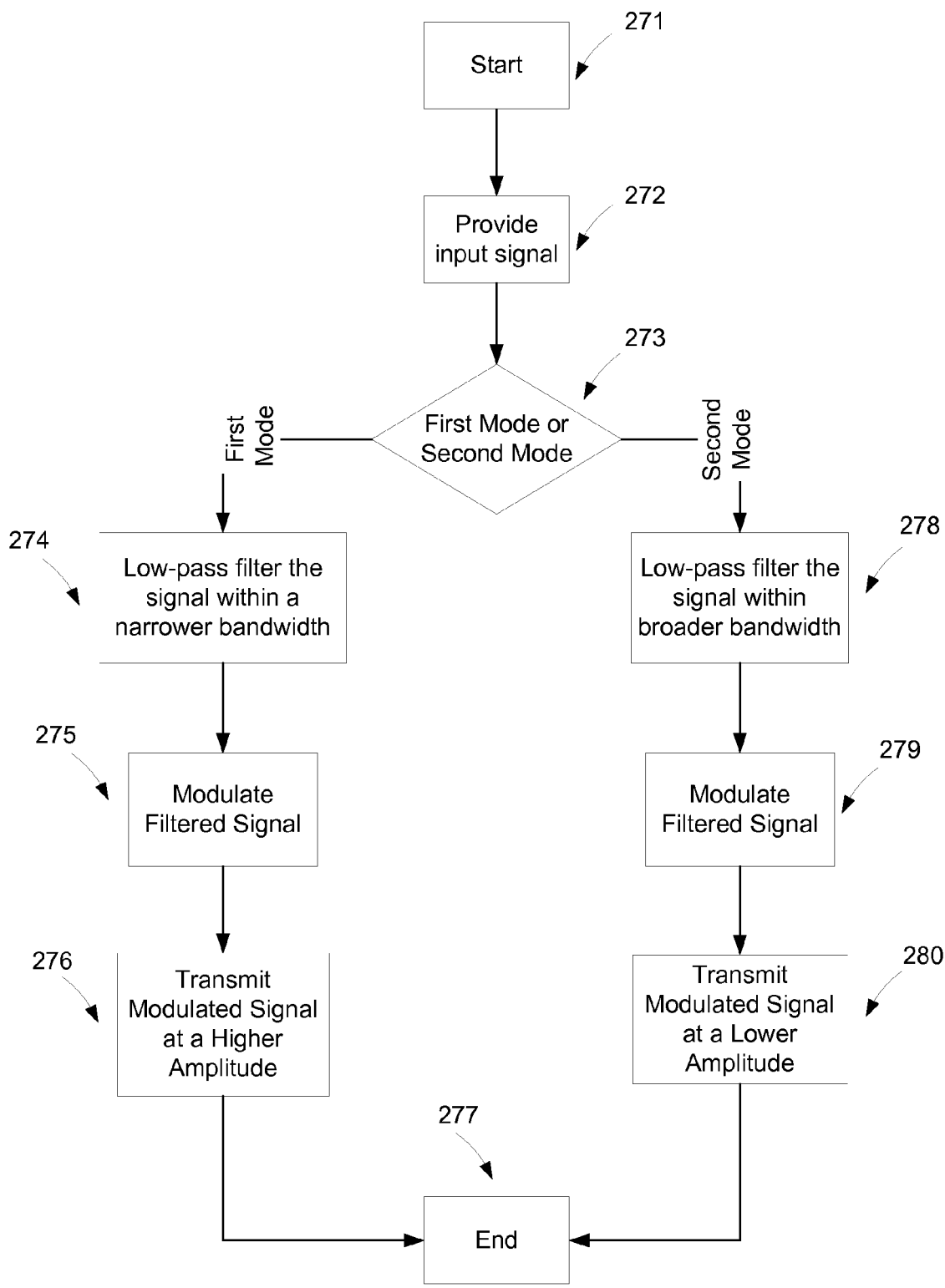
FIG. 27 is a flow diagram representing a method for filtering, modulating and transmitting a signal according to a first or second mode of operation.

FIG. 27 is a flow diagram representing a method for filtering, modulating and transmitting a signal according to a first or second mode of operation. At the start of the flowchart, a first input signal is provided 272. A decision is made in block 273 whether to carry out the method according to a first or a second mode of operation. The decision is based on the required amplitude for the transmitted signal.

If the required amplitude is higher then according to the first mode in block 274 the input signal is low-pass filtered within a narrower bandwidth, then in block 275 the low-pass signal is modulated to produce a modulated signal, then in block 276 the modulated signal is transmitted at a higher amplitude.

If the required amplitude is lower then in block 278 the input signal is low-pass filtered within a broader bandwidth, then in block 279 the low-pass signal is modulated to produce a modulated signal, then in block 280 the modulated signal is transmitted at a lower amplitude.

Figure 28:
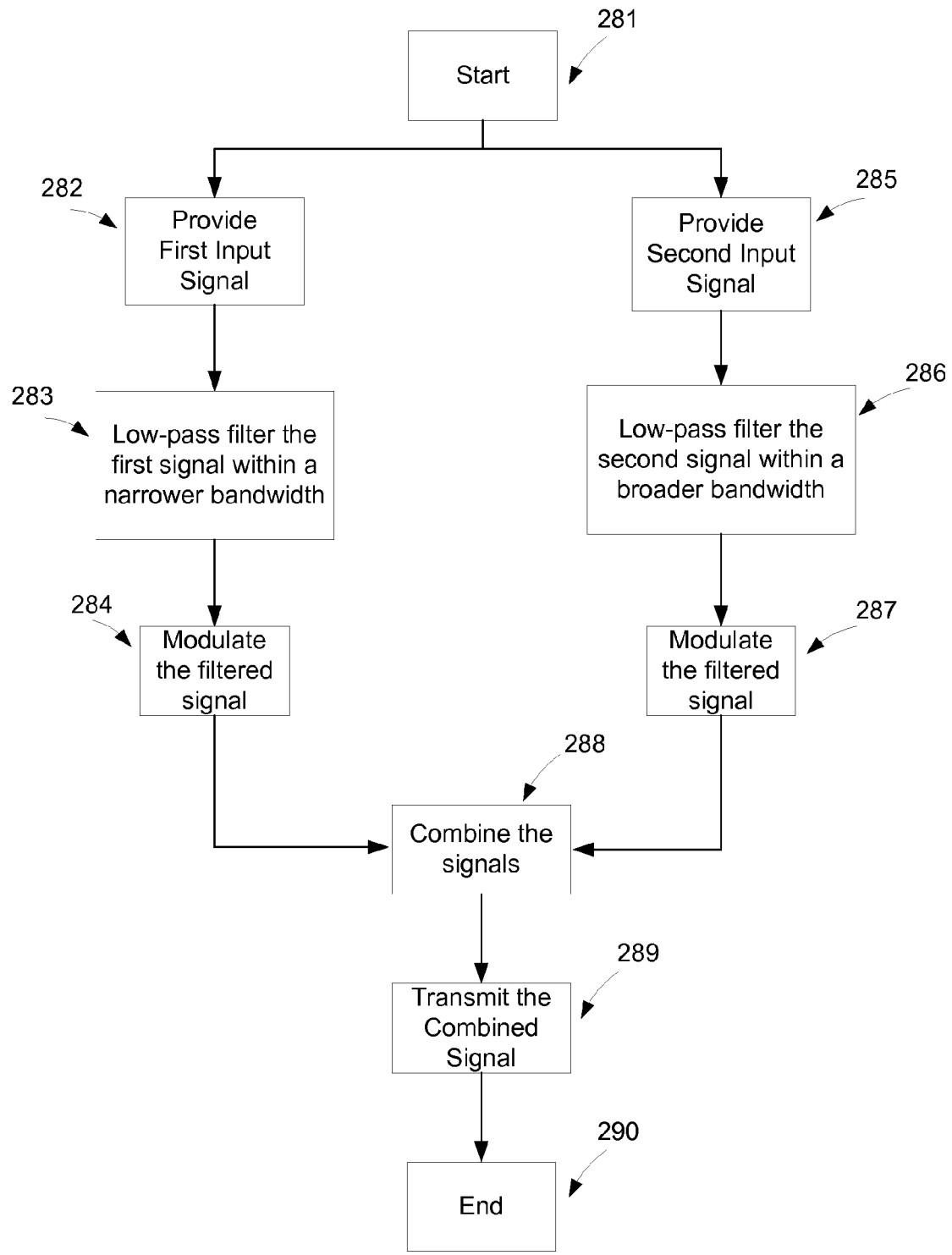
FIG. 28 is a diagram of a method for filtering, modulating, combining and transmitting two signals according to a first and second mode of operation respectively.

FIG. 28 is a diagram of a method for filtering, modulating, combining and transmitting two signals according to a first and second mode of operation respectively.

A first input signal is provided in block 282. The input signal is low-pass filtered in block 283 to produce a first low-pass filtered signal. The low-pass filtered signal is modulated in block 284 to produce a first modulated signal. A second input signal is provided in block 285. The second input signal is low-pass filtered in block 286 to produce a second low-pass filtered signal. The second low-pass filtered signal is modulated in block 287 to produce a second modulated signal. The first and second modulated signals are combined in block 288 to produce a combined signal. The combined signal is transmitted in block 289. The transmitted signal output from block 289 comprises first and second transmitted signals, for first and second input signals respectively. The first and second input signals are provided to blocks 282 and 283 respectively according to the relative required amplitudes for the first and second transmitted signals respectively.

Because the required amplitude of the first transmitted signal is higher than the required amplitude of the second transmitted signal, the first input signal is input to block 282 as shown.

As an alternative variation of this method (not illustrated in the accompanying drawings), the two modulated signals may each be transmitted separately and not combined. The combining operation 288 would thus not be performed and the modulated signals would be transmitted directly.

Figure 29:
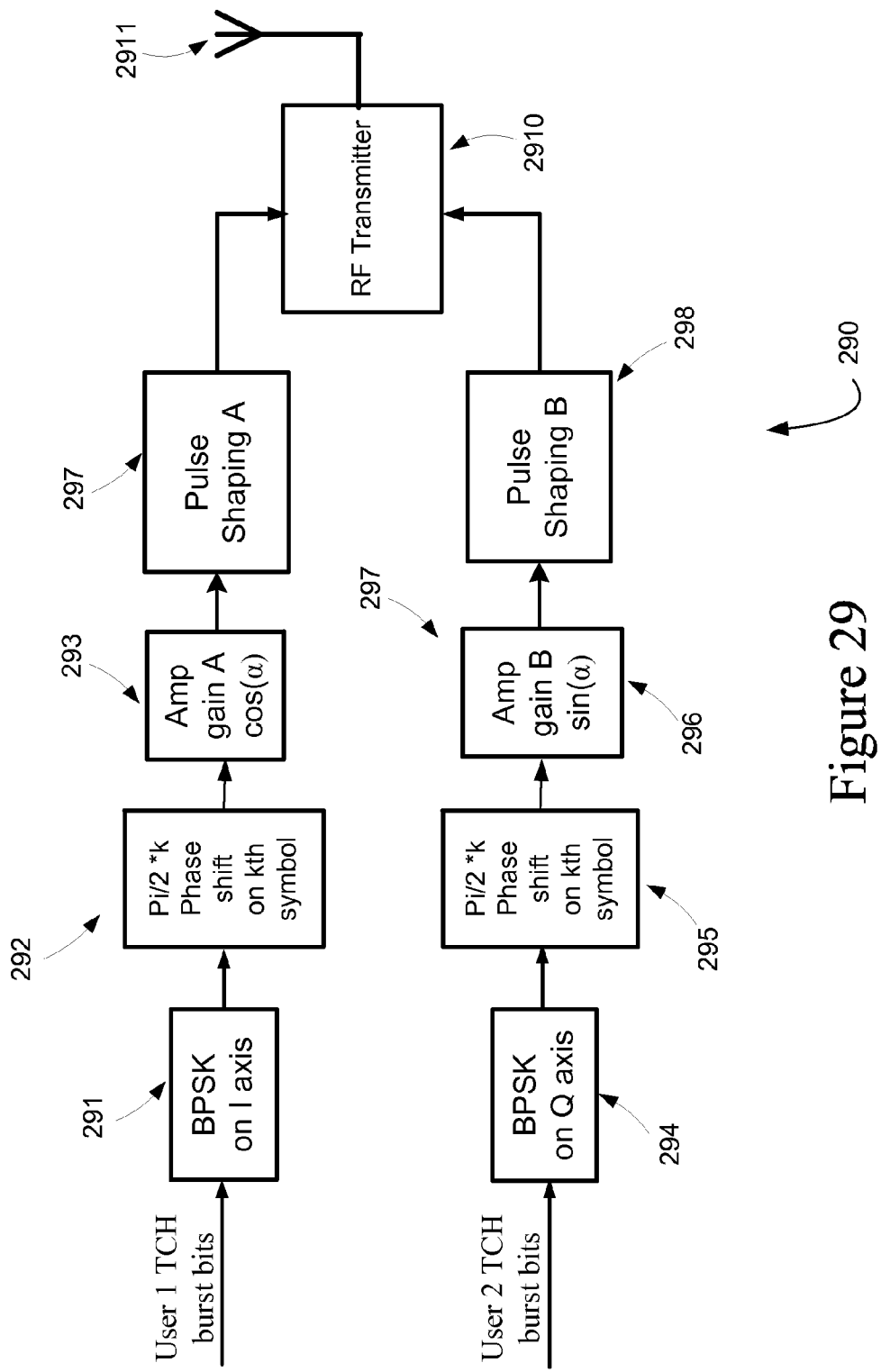
FIG. 29 is a diagram of a transmitting apparatus 290 for combining and transmitting two signals to produce a QPSK-modulated, phase-rotated signal.

FIG. 29 is a diagram of a transmitting apparatus 290 for combining and transmitting two signals to produce a QPSK-modulated, phase-rotated signal. A first input signal comprising a first sequence of symbols is input to a first BPSK modulator 291. The modulator 291 is configured to BPSK modulate the first input signal to produce a first BPSK-modulated signal. A first phase rotator 292, coupled to the first BPSK modulator 291, is configured to increment the phase of the first BPSK-modulated signal by a prescribed phase increment, in this example 90 degrees (pi/2 radians), on every symbol of the first sequence of symbols, to produce a first phase-shifted signal. A first amplifier 293, coupled to the first phase rotator 292, is configured to amplify the first phase-shifted signal by a first prescribed gain to produce a first amplified signal. In this example, the gain is shown as A, which is equal to the cosine of alpha ($\alpha$).

A first pulse-shaping filter 297, coupled to the first amplifier 293, is configured to low-pass filter the first amplified signal to produce a first filtered baseband signal.

A second input signal comprising a second sequence of symbols is input to a second BPSK modulator 294. The modulator 294 is configured to BPSK modulate the second input signal to produce a second BPSK-modulated signal. A second phase rotator 295, coupled to the second BPSK modulator 294, is configured to increment the phase of the second BPSK-modulated signal by a prescribed phase increment, in this example 90 degrees (pi/2 radians), on every symbol of the second sequence of symbols, to produce a second phase-shifted signal.

A second amplifier 296, coupled to the second phase rotator 295, is configured to amplify the second phase-shifted signal by a second prescribed gain to produce a second amplified signal. In this example, the gain is shown as B, which is equal to the sine of alpha ($\alpha$).

A second pulse-shaping filter 298, coupled to the second amplifier 296, is configured to low-pass filter the second amplified signal to produce a second filtered baseband signal.

A radio frequency (RF) transmitter circuit 291, coupled to the first and second pulse shaping filters 297, 298 is configured to modulate, combine, amplify and transmit the first and second filtered baseband signals to produce a combined, QPSK-modulated signal. In this example, the transmitter circuit 291 quadrature modulates the first and second filtered baseband signals so that the first filtered baseband signal forms an in-phase input, and the second filtered baseband signal forms a quadrature input, of an I-Q modulator.

The operations of the elements 291 to 2911 shown in the figure are controlled by a microprocessor (not shown) which is coupled to a solid state memory (not shown). The microprocessor is operable to control the elements according to instructions stored in the memory.

Figure 30:
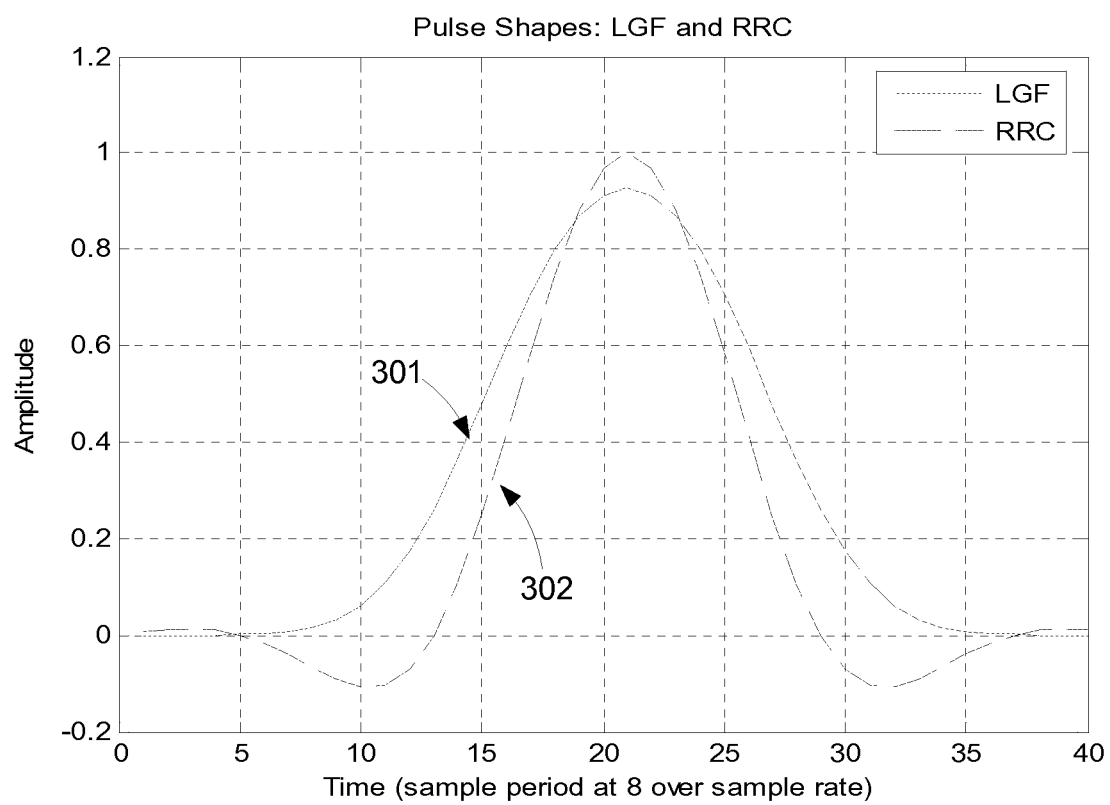
FIG. 30 is a graph 300 showing a broader pulse 301 and a narrower pulse 302.

FIG. 30 is a graph 300 showing a broader pulse 301 and a narrower pulse 302. The broader pulse 301 corresponds to the first mode (using the first filter) and the narrower pulse corresponds to the second mode (using the second filter). The horizontal axis of the graph represents units of time. The broader pulse 301 represents the time envelope of the first filtered signal and the narrower pulse represents the time envelope of the second filtered signal. The broader pulse 301 is output by the first filter which in this example is a linear Gaussian filter (LGF) and the narrower pulse is output by the second filter which in this example is a root raised cosine (RRC) filter.

As shown in FIG. 29, the first filtered signal is output from the first pulse shaping filter 297, and the second filtered signal is output from the second pulse shaping filter 299. The RRC filter is used to narrow the pulse width of the second signal (having a lower power level) in the time domain so that the frequency spectrum is correspondingly broader. When the second signal is added to the first signal the frequency spectral envelope of the combined first and second signal fits within the predefined spectral mask. Thus, the second signal, when transmitted, will contain greater power, which improves its performance.

Figure 31:
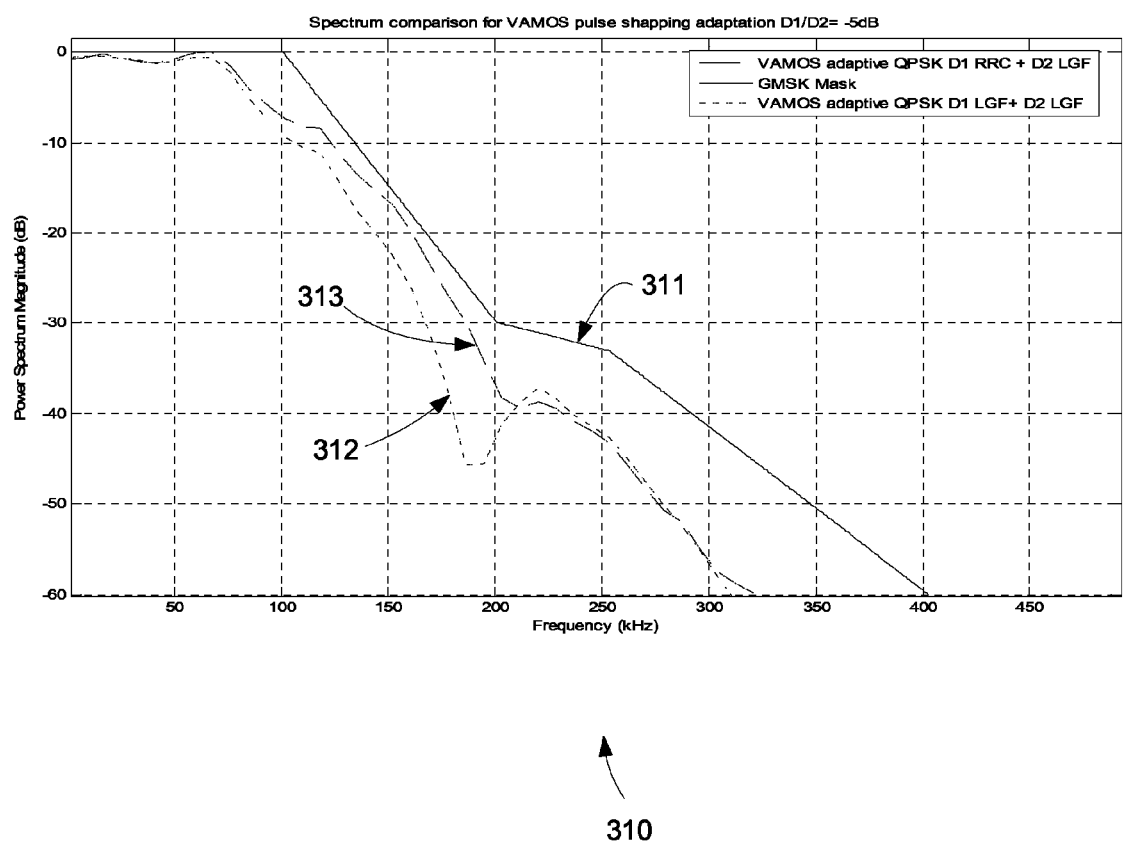
FIG. 31 is a graph 310 showing test results.

FIG. 31 is a graph 310 showing test results. A spectral mask 311 is shown as a solid line comprising three straight line portions. A first spectral envelope 312 is a curve representing the measured spectral envelope of a first transmitted signal corresponding to the first filtered signal produced using a LGF filter. A second spectral envelope 313 is the spectral envelope of a second transmitted signal corresponding to the second filtered signal. The second filtered signal is produced using a RRC filter which has broader bandwidth than the LGF filter.

The first transmitted signal has a power level which is 5 dB higher than that of the second transmitted signal. The spectral envelope of each signal is relative to the amplitude of the signal. The spectral envelopes have values of power spectrum magnitude, in units of dB, across a range of frequencies from zero to around 330 kHz. The graph shows that the spectral envelopes of both the first and second transmitted signal are within (i.e. below) the spectral mask 311 for all frequencies shown.

Figure 32:
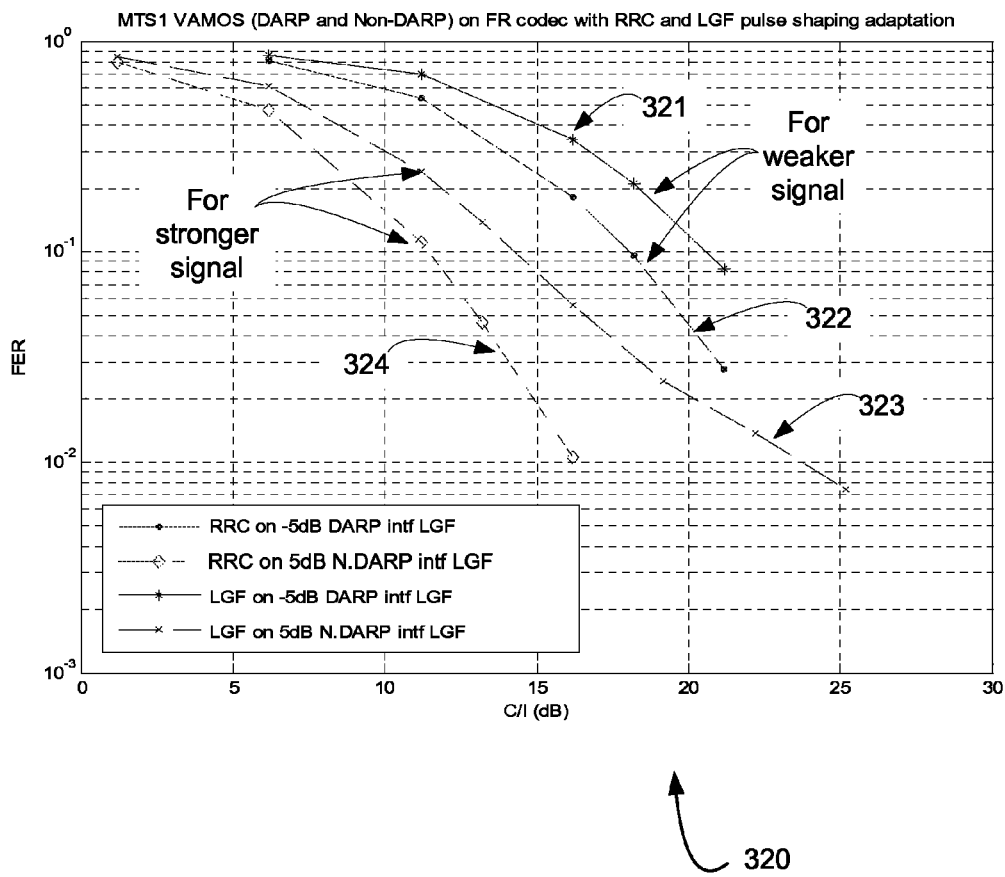
FIG. 32 is a graph showing the performances 321 to 324 of four receivers.

FIG. 32 is a graph showing curves 321 to 324 which represent the performances of four receivers. Curves 321 to 324 are each a set of straight line portions which join points representing values of frame error rate (FER) expressed as a ratio, each value being for a given carrier-to-interference ratio (C/I) expressed as a ratio in decibels (dB). Two of the receivers have enhanced capability known as Downlink Advanced Receiver Performance (DARP), i.e. they are DARP receivers. The other two receivers do not have this enhanced capability, i.e. they are non-DARP receivers. Curves 321 and 322 each correspond to a DARP receiver which receives a signal having a lower amplitude. Curves 323 and 324 each correspond to a non-DARP receiver which receives a signal having a higher amplitude.

Curves 321 and 323 each correspond to a receiver having a LGF pulse shaping filter. Curves 322 and 324 each correspond to a receiver having a RRC pulse shaping filter.

The results show that the use of the RRC filter (having a wider bandwidth) for producing the second (weaker) filtered signal gives a significant improvement in the FER for a given C/I, for the receiver receiving the second signal at a lower amplitude (see curves 321, 322). The results also show, surprisingly, that the use of the RRC filter for the first (stronger) signal also significantly improves the performance of the receiver receiving the first signal at a higher amplitude (see curves 323, 324). The RRC filter suppresses intersymbol interference (ISI) and minimizes the interference to the stronger signal, thus improving performance of the stronger signal as well.

It follows that, for a given FER, a lower amplitude signal can be transmitted for the second receiver and/or a higher amplitude can be transmitted for the first receiver, than would be the case if only LGF pulse shaping filters are used.

Figure 23:
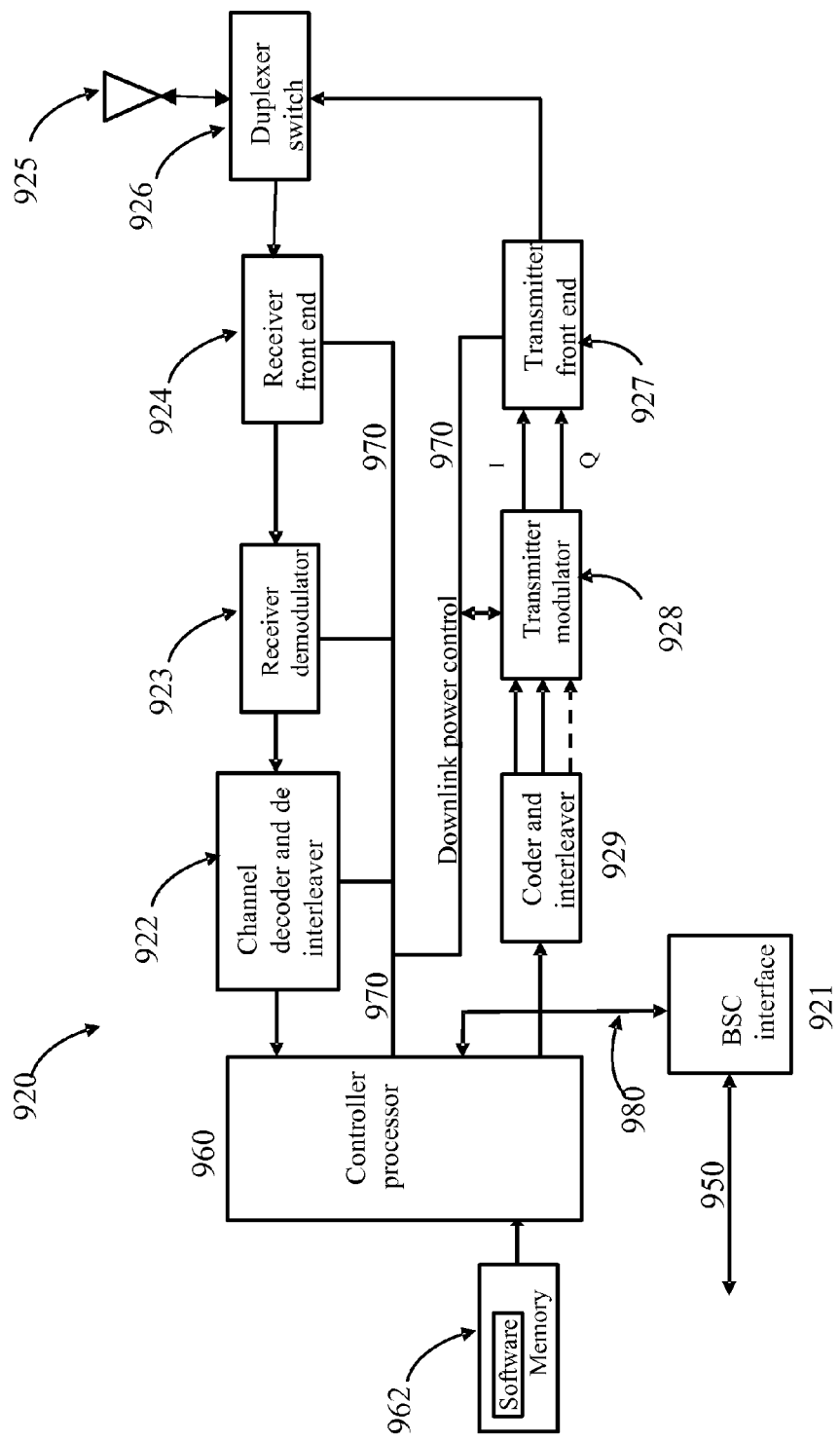
FIG. 23 shows a base station with software stored in memory which may execute the method illustrated in FIGS. 21A, 21B, 21C and 22.

This method may be stored as executable instructions in software stored in memory 962 which are executed by processor 960 in the BTS as shown in FIG. 23. It may also be stored as executable instructions in software stored in memory which are executed by a processor in the BSC 140-143. The remote station 123-127 uses the TSC it is instructed to use.

Narrowing the pulse in the time domain (and correspondingly making the bandwidth of the spectral envelope broader) is more efficient than retransmission of lost data, because time is not spent resending data.

A variable pulse shape can resolve fundamental trade-offs (such as (a) good power level on one channel vs. interference it may introduce to the nearby channel; and (b) a good throughput for one user vs capacity within a certain area, etc). Narrowing the pulse in the time domain may increase the power of the signal for a particular user, for example when the link conditions are not favourable, e.g. large path loss or bad channel distortion due to multipath.

The pulse shaping adaptation means that a particular technology (e.g. GSM or WCDMA) with each modulation scheme (e.g. GMSK and 8PSK) may have more than one pulse shaping to adapt to different situations. (Currently GMSK and 8PSK each have fixed pulse shaping and adaptation of pulse shaping may not be possible without change to the technology standards). The pulse shape can be broader or narrower to suit the situation (e.g. 8PSK can have more than one pulse shaping, and so can GMSK). The selection of different pulse shaping may be based on a feedback mechanism.

For example the transmitter (e.g. BS 110, 111, 114) can use different pulse shaping based on the transmitter receiving feedback signals/indications from the receiver (e.g. remote terminal 123-127) for different pulse shapes that are used. In this way the best pulse shaping for a particular situation may be used to get the best performance of the communication system. The feedback mechanism can be used for either a single transmitter-receiver pair or for several receivers (remote stations) with one transmitter. The feedback mechanism may thus improve the performance of the link either for an individual pair of one receiver and one transmitter or for multiple transmitter-receiver pairs in combination, e.g. a portion of a communication system (e.g. a cell, a site, a town or a city).

Pulse shaping adaptation as described above could have advantages as described below.

1. Adapting with Spectrum Usage

One way of defining the pulse shape is to fix the spectrum mask and design a pulse shape to ensure the spectral envelope falls within that mask. Non-linear elements of the transmitter e.g. the power amplifier (PA) 1830, 1823, in addition to narrow pulse width, can contribute to spectral re-growth whereby fluctuations in amplitude of the transmitted signal give rise to increased amplitude of the signal's spectral envelope due to AM-PM conversion in the PA. In modern devices, for example, the PA is more linear. The original mask allowed for margin due to e.g. non-linearity of older PAs. With pulse shaping adaption, the margin may be used to broaden the spectrum of the transmitted signal.

The communication system may be used for different amounts of traffic at any time. For example, there may be few users, or there may be many users in a cell or sector aa. The adaptive pulse shaping can make adaptations according to the amount of traffic. For example when there are a few users on one channel within a cell (a sparse user case which has no frequency reuse), the pulse shaping can be broader, yet minimal interference will be introduced between the signals for different users. When there are many users in the same area (a dense user case which has significant frequency reuse), the pulse shaping can be narrower to minimise the interference between the users' signals. Each case can be assessed and adapted by the feedback loop of the system, large or small.

2. Adapting with Type of Pulse Shaping to Reduce ISI

A family of RRC pulse shaping can put together with the GMSK and 8PSK so that when the conditions are right, they can both adapt to RRC pulse shaping to reduce ISI.

3. Adaption from Legacy Non-linear to Modern Linear Modulation

GMSK was originally chosen as the default GSM modulation because GMSK, being a constant envelope non-linear modulation, can make use of a low cost, non-linear PA, while achieving greater power efficiency. However from the performance point of view (e.g. non-linearity and inter-symbol interference or ISI), GMSK may not be as good as a linear modulation scheme such as BPSK or QPSK with the linear Gaussian pulse shaping. With the availability of linear PAs, other modulations beside GMSK may be used. For better performance, BPSK with a family of RRC pulse shaping may be used as an alternative to GMSK. It is worth noting that a further advantage may be achieved if the receiver can also be arranged to have a filter corresponding to that used in the transmitter. However without changing the filter of the receiver, the benefit is still significant.

In one example, the pulse shaping may be implemented as a finite impulse response (FIR) filter, for which an array holding the values of the pulse shaping is convolved with the symbols. The adaptive pulse shaping comprises multiple arrays that hold a family of pulse shapes. The arrays can be put into a linear memory and the pulse shapes' arrays can be accessed with an indexed pointer. The feedback mechanism provides the index, and the adaptive pointer using such an index will then point to the right pulse data array to be used. The penalty is larger memory for holding extra arrays of pulse shapes. The pulse shaping filters can be a family of RRC filters that have different properties, such as bandwidth.

Figure 33:
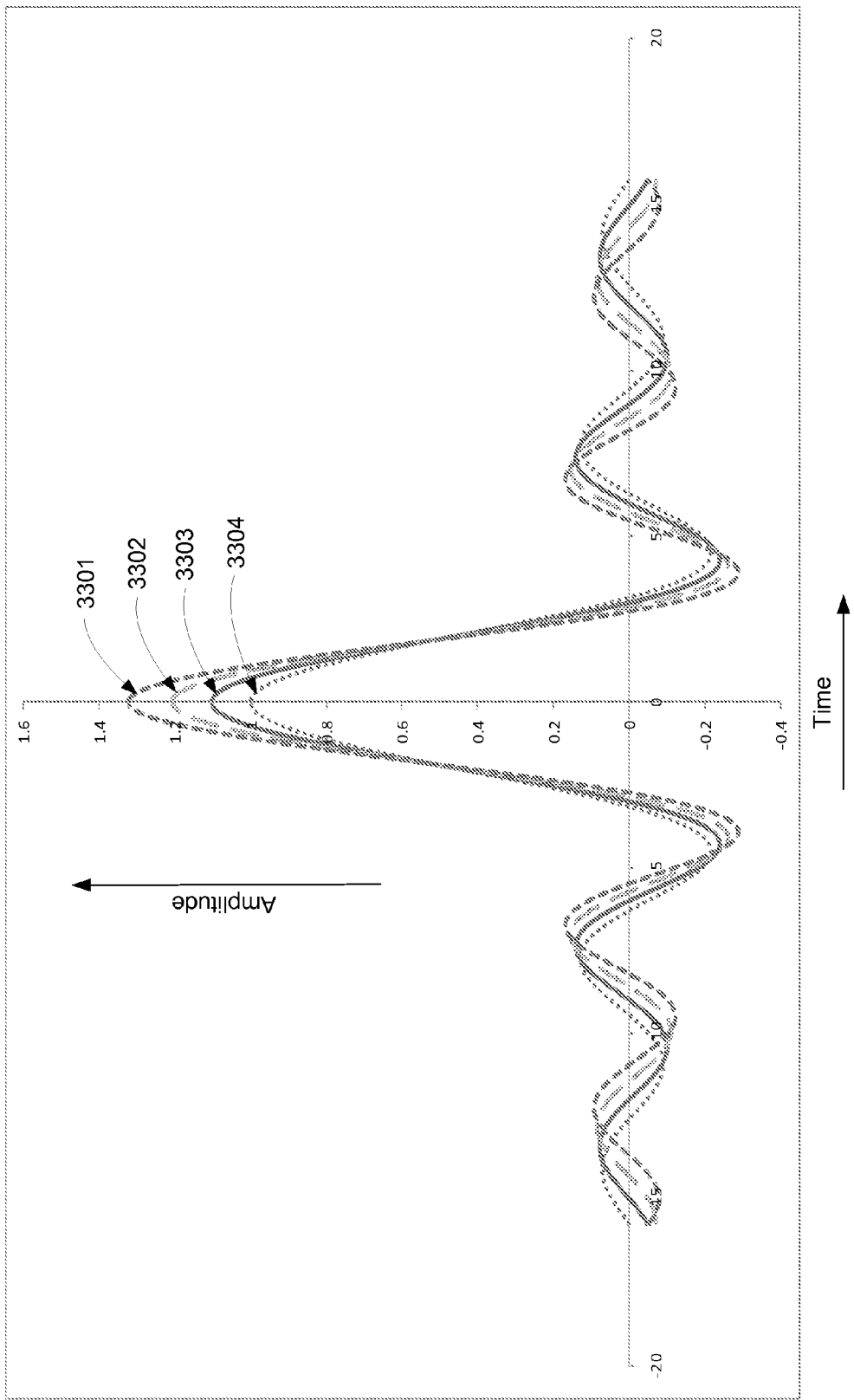
FIG. 33 comprises a selection of narrowed and broadened pulses.

FIG. 33 comprises a selection of narrower and broader pulses which result from using RRC filters having different bandwidths. The horizontal axis represents linear time. The vertical axis represents the amplitude of a data pulse at the output of the filter. The pulse labelled 3301 is narrowest in the time domain as shown in the figure. Therefore pulse 3301 has the broadest bandwidth. The pulse labelled 3302 has a bandwidth less than the bandwidth of pulse 3301, and so on. Pulse 3304 has the broadest bandwidth, It is better to include the existing pulse shaping in the family of the pulse shaping series, so that the series can start from this default pulse shaping, while adaptation can move to a better one when conditions allow. In this way, the adaptation would be no worse than the current performance as the default case is the baseline for adaptation. This helps the modulation to evolve to a better method with the control of the network. The simulation shown in FIG. 33 indicates that the a couple of dB gain may be obtained from this change.

Signaling

Because the signaling channel has good coding and forward error correction (FEC) capability, it only requires a minimal signal quality to detect a signal. Any higher signal power levels than that would waste power and create interference to other remote stations 123-127. In this way each communication will drop the power level to minimize interference to another remote station 123-127 in the network, while maintaining an acceptable BER which may processed by FEC to allow detection of the desired signal.

Benefits of the present method and apparatus include: avoiding excess interference in the network between signals for different users; and allowing the network to support potential increased capacity and saving battery life and prolong the talk time and standby time.

Vamos Uplink Modulation Adaptation

Two signals intended for two VAMOS remote stations can have a power imbalance due to their path loss differences as discussed above in the section titled "Adaptive Pulse Shaping." When that happens pulse shaping adaptation can be employed and can improve performance. Pulse shaping adaptation can also be used on the uplink to get similar benefit, although it might be difficult to get as much benefit from use of pulse shaping adaptation on the uplink as on the downlink since the two local oscillators (LO's) of the two remote stations are independent. Also, as each remote station in VAMOS mode doesn't know the power level of the other remote station, it may not be possible and or suitable for the remote stations (or handsets) to make a decision whether to employ pulse shaping adaptation on the uplink.

On the downlink pulse shaping adaptation can be implemented in a relatively straight forward manner as the BTS 110, 111, 114 has both remote stations' 123-127 reported data (e.g. received data quality indicator) and the base station transmits data for both remote stations at known power levels controlled by the base station. Therefore the base station can decide the power imbalance factor. However, this is not the case for the uplink since each remote station 123-127 is independent of each other and doesn't have any knowledge of the other co-TCH user's data and path loss to the base station 110, 111, 114. Therefore, it is not as straight forward to address the power imbalance by means of pulse shaping adaptation on the uplink. Methods and apparatus for implementing pulse shaping adaptation on the uplink will now be described, wherein a base station determines pulse shape adaptation at a remote station.

In one example, a power imbalance is addressed when a BS 110, 111, 114 uses control channel data (SACCH) messages to indicate to a VAMOS capable remote station 123-127 the power imbalance. There are three bits that are available to use in the SACCH for this function.

The SACCH's normal function is to carry system information messages on the downlink, carry receiver measurement reports on the uplink and to perform closed-loop power and timing control. Actual power and timing advance settings currently in use are transmitted on the uplink. Ordered (i.e. prescribed or selected) power and timing values are transmitted on the downlink.

The SACCH block structure defined in 3GPP TS 44.004 section 7.1.1 is shown in FIG. 33. The 23 parts of SACCH blocks are used in the downlink in the following way. The ordered remote station (or MS) 123-127 power level is carried in the first 5 bits of part 1. The ordered timing advance is carried in the 8 bits of part 2.

In the case of the GSM 400 band, the extended timing advance information element (IE) is supported and the maximum timing advance value $TA_{max}$ is specified to be 219. This is the only case in which ordered timing advance uses all eight bits of the ordered timing advance data bits (part 2), so as to allow for a cell size or range of up to 120 km. Otherwise, for a non-GSM 400 band, the ordered timing advance is a G-bit long information element to cover cell size or range up to 35 km (distance between remote station to BTS).

Changes to the existing SACCH can be made to implement the uplink VAMOS modulation adaptation method of the present patent application. In one example, Part 1 and part 2 are modified as shown in FIG. 34. As before, the ordered remote station (or MS) 123-127 power level is carried in the first 5 bits of part 1. However, bit 8 of part 1 carries a pulse shaping function (PSF) flag which indicates whether or not the BS 110, 111, 114 wants VAMOS PSF adaption on the uplink. The ordered timing advance has also changed. It is now carried in the first 6 bits of part 2. Bits 7 and 8 of part 2 designate the PSF type, i.e., RRC filter selection.

Thus, the present method and apparatus modifies two fields of the SACCH to enable pulse shaping filtering. First, the spare bit of part 1 is used to carry the PSF, the pulse shaping function flag, which indicates whether or not the BS 110, 111, 114 wants VAMOS PSF adaptation on the uplink. PSF=0 means no VAMOS PSF adaptation.

It is unlikely that, at a distance further than 35 km away from a BS 110, 111, 114 there is a dense population of remote stations that may cause voice service capacity issues. Therefore, using VAMOS and an extended timing advance may not be a major concern at this distance, and a remote station 123-127 may transmit data using the default modulation in the VAMOS mode using a LGF or standard GMSK. However, for a distance of 35 km or less, pulse shaping adaptation may be used for the uplink, for either a GSM 400 system or a non-GSM 400 system.

For a GSM 400 system, the timing advance field is 8 bits long and no spare bit may be used for the PSF type. However, the spare bit of part 1 may still be used to help the case of the GSM 400 MHz band. The remote station 123-127 may use all 8 bits of part 2 for the timing advance value for large cell operation. Thus, there won't be a 2-bit PSF type field in part 2. However, the 1-bit field in part 1 may be used. When the 1-bit field in part 1, the PSF flag, equals 1 VAMOS PSF adaptation on the uplink is on. Also, the 6-bit timing advance value indicates normal size cell operation. In addition, with the GSM 400 band or any band, the LGF or GMSK filtering may be used as the default pulse shaping as shown in Table 4. For the GSM 400 band, only one pulse shaping other than the default pulse shaping is provisioned for because there are no available bits to indicate a pulse shaping filter type to use.

Bits 7 and 8 of part 2 (part of ordered timing advance) are used to indicate PSF type, the index of pulse shapes, e.g., which RRC filter shape/type to use. This would only be effective or applicable when the pulse shaping function flag, $PSF_r = 1$.

The bits 7 and 8 describes RRC filter selections, such as

TABLE 4

| Bits 8, 7 | PSF type | Example of details for the adaptation |
|---|---|---|
| 00 | LGF or GMSK | Default pulse shaping |
| 01 | RRC-1 | 230 kHz bandwidth |
| 10 | RRC-2 | 250 kHz bandwidth |
| 11 | RRC-3 | 270 kHz bandwidth |

For the uplink example above, four values of PSF may be enough to provide a desired improvement in headroom. Therefore, a 2-bit field is just the right size ($2^2=4$) to carry the PSF information. Of course, in other examples, a different size field may be used. In addition, the PSF field is located in a good location within the downlink SACCH.

The proposed changes to the fields of the SACCH may not affect legacy remote stations 123-127 because the modified fields are not intended to be used by legacy remote stations 123-127.

The uplink modulation adaptation method and apparatus of the present patent application may be used to improve the Frame Error Rate performance in VAMOS mode. It makes use of the existing spare bits in the SAACH to enhance the modulation adaptation of the uplink. As a result, a voice call may be more reliable and have improved voice quality.

FIG. 35 is a flowchart illustrating the steps taken to modify fields of the SACCH to enable pulse shaping filtering in a GSM system. In a first step, a decision is made on whether there is a power imbalance that may be corrected (Step 802). If the answer is yes, then it is determined whether the system is a GSM 400 band system (Step 804). If the answer is yes, determine (in block 810) whether the range or distance between base station and remote station is greater than a threshold range. If the determination is that the range is above the threshold range, modify a first part of a SACCH to carry a pulse shaping function flag and use LGF or GMSK as default pulse shaping (Step 806). If the answer is no, modify a first part of a SACCH to carry a pulse shaping function flag and modify a second part to carry a pulse shaping type field. (Step 808).

If the determination in block 804 is no, i.e. the system is not a GSM 400 band system, then (in block 808) modify a first part of a SACCH to carry a pulse shaping function flag and modify a second part to carry a pulse shaping type field. Optionally, the block 810 may be omitted such that, if the determination of block 804 is yes, then the determination of block 806 is carried out directly.

This method may be stored as executable instructions in software stored in memory 962 which are executed by processor 960 in the BTS as shown in FIG. 23.

In one or more exemplary embodiments, the functions described may be implemented in hardware, software, firmware, or any combination thereof. If implemented in software, the functions may be stored on or transmitted as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM, DVD, HD-DVD, Blu-ray or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The methods described herein may be implemented by various means. For example, these methods may be implemented in hardware, firmware, software, or a combination thereof. For a hardware implementation, the processing units used to detect for ACI, filter the I and Q samples, cancel the CCI, etc., may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, circuits, and algorithm steps described in connection with the embodiments disclosed herein may be implemented as electronic hardware, computer software, or combinations of both.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal Therefore, the present invention is not to be limited except in accordance with the following claims.

The invention claimed is:

1. A transmitting apparatus for transmitting a signal within a predetermined spectral mask defining a range of power density limits across a frequency range, the apparatus comprising:
a first signal source for providing a first input signal;
a second signal source for providing a second input signal;
a filter coupled to the first signal source for low-pass filtering the first input signal to produce a first filtered signal and coupled to the second signal source for low-pass filtering the second input signal to produce a second filtered signal, the filter being selectively operable in a first mode in which an input signal is filtered within a narrower bandwidth and in a second mode in which an input signal is filtered within a broader bandwidth, wherein the first signal is filtered according to the first mode and the second signal is filtered according to the second mode;
a modulator coupled to the filter for modulating the first filtered signal to produce a first modulated signal and the second filtered signal to produce a second modulated signal;
a transmitter, coupled to the modulator, for transmitting the first modulated signal at a required power level as a transmitted signal having a spectral envelope and for transmitting the second modulated signal, wherein the first modulated signal and the second modulated signal are transmitted substantially simultaneously; and
a controller for controlling operation of the filter depending on the required power level such that the first input signal is so filtered in the first mode, when the required power level is higher, that the spectral envelope of the transmitted signal is within the spectral mask, and is so filtered in the second mode, when the required power level is lower, that the spectral envelope of the transmitted signal remains within the spectral mask.

2. The transmitting apparatus as claimed in claim 1, wherein the controller is arranged to control the filtering in the second mode so that the spectral envelope of the transmitted signal extends across substantially the whole of the frequency range of the spectral mask.

3. The transmitting apparatus as claimed in claim 1, wherein the transmitter is arranged to transmit a modulated signal at a maximum power level when the filter is operating in the first mode.

4. The transmitting apparatus as claimed in claim 1, comprising a combiner for combining the first and second modulated signals.

5. The transmitting apparatus as claimed in claim 1, comprising a phase shifter for phase shifting at least one of the first and second input signals by a phase shift to produce first and second phase-shifted signals, and wherein the first and second phase-shifted signals are coupled to the modulator.

6. The transmitting apparatus as claimed in claim 5, wherein the phase shifter is configured to perform the phase shifting so that the first and second phase shifted signals are offset from each other by a phase offset.

7. The transmitting apparatus according to claim 5, wherein the first and second input signals each comprise a sequence of symbols, and the phase shifter is operable to increment the phase shift for each symbol.

8. The transmitting apparatus as claimed in claim 1, comprising a phase shifter for phase shifting at least one of the first and second filtered signals by a phase shift to produce first and second phase-shifted signals, and wherein the first and second phase-shifted signals are coupled to the modulator.

9. The transmitting apparatus as claimed in claim 8, wherein the phase shifter is configured to perform the phase shifting so that the first and second phase shifted signals are offset from each other by a phase offset.

10. The transmitting apparatus according to claim 8, wherein the first and second input signals each comprise a sequence of symbols, and the phase shifter is operable to increment the phase shift for each symbol.

11. A method of transmitting a signal within a predetermined spectral mask defining a range of power density limits across a frequency range, the method comprising:
providing a first input signal;
providing a second input signal;

low-pass filtering the first input signal to produce a first filtered signal and low-pass filtering the second input signal to produce a second filtered signal, the filtering being performed in one of a first mode and a second mode, in which first mode an input signal is filtered within a narrower bandwidth and in which second mode an input signal is filtered within a broader bandwidth, wherein the first signal is filtered according to the first mode and the second signal is filtered according to the second mode;

modulating the first filtered signal to produce a first modulated signal and modulating the second filtered signal to produce a second modulated signal;

transmitting the first modulated signal at a required power level as a transmitted signal having a spectral envelope and transmitting the second modulated signal, wherein the first modulated signal and the second modulated signal are transmitted substantially simultaneously; and controlling the filtering depending on the required power level such that the first input signal is so filtered in the first mode, when the required power level is higher, that the spectral envelope of the transmitted signal is within the spectral mask, and is so filtered in the second mode, when the required power level is lower, that the spectral envelope of the transmitted signal remains within the spectral mask.

12. The method as claimed in claim 11, comprising controlling the filtering in the second mode so that the spectral envelope of the transmitted signal extends across substantially the whole of the frequency range of the spectral mask.

13. The method as claimed in claim 11, wherein in the first mode the required power level is a maximum power level.

14. The method as claimed in claim 11, comprising combining the first and second modulated signals.

15. The method as claimed in claim 11, comprising phase shifting at least one of the first and second input signals by a phase shift to produce first and second phase-shifted signals, and modulating the first and second phase-shifted signals.

16. The method as claimed in claim 15, comprising performing the phase shifting so that the first and second phase shifted signals are offset from each other by a phase offset.

17. The method according to claim 15, wherein the first and second input signals each comprise a sequence of symbols, and the method comprises incrementing the phase shift for each symbol.

18. The method as claimed in claim 11, comprising phase shifting at least one of the first and second filtered signals by a phase shift to produce first and second phase-shifted signals, and modulating the first and second phase-shifted signals.

19. The method as claimed in claim 18, comprising performing the phase shifting so that the first and second phase shifted signals are offset from each other by a phase offset.

20. The method according to claim 18, wherein the first and second input signals each comprise a sequence of symbols, and the method comprises incrementing the phase shift for each symbol.

21. A transmitting apparatus for transmitting a signal within a predetermined spectral mask defining a range of power density limits across a frequency range, the apparatus comprising:

means for providing a first input signal;

means for providing a second input signal;

means for filtering the first input signal to produce a first filtered signal and for filtering the second input signal to produce a second filtered signal, the means for filtering being selectively operable, in a first mode, to filter an input signal within a narrower bandwidth and, in a second mode, to filter an input signal within a broader bandwidth, wherein the first signal is filtered according to the first mode and the second signal is filtered according to the second mode;

means for modulating the first filtered signal to produce a first modulated signal and for modulating the second filtered signal to produce a second modulated signal;

means for transmitting the first modulated signal at a required power level as a transmitted signal having a spectral envelope and for transmitting the second modulated signal, wherein the first modulated signal and the second modulated signal are transmitted substantially simultaneously; and means for controlling operation of the filter depending on the required power level such that the input signal is so filtered in the first mod; when the required power level is higher, that the spectral envelope of the transmitted signal is within the spectral mask, and is so filtered in the second mode, when the required power level is lower, that the spectral envelope of the transmitted signal remains within the spectral mask.

22. The transmitting apparatus as claimed in claim 21, further comprising means for controlling the filtering in the second mode so that the spectral envelope of the transmitted signal extends across substantially the whole of the frequency range of the spectral mask.

23. The transmitting apparatus as claimed in claim 21, further comprising means for transmitting the first modulated signal at a maximum power level when the means for filtering is operating in the first mode.

24. The transmitting apparatus as claimed in claim 21, comprising combining means for combining the first and second modulated signals.

25. The transmitting apparatus as claimed in claim 21, comprising means for phase shifting at least one of the first and second input signals by a phase shift to produce first and second phase-shifted signals, and wherein the first and second phase-shifted signals are coupled to the means for modulating.

26. The transmitting apparatus as claimed in claim 25, wherein the means for phase shifting is configured to perform the phase shifting so that the first and second phase shifted signals are offset from each other by a phase offset.

27. The transmitting apparatus as claimed in claim 25, wherein the first and second signals each comprise a sequence of symbols, and the means for phase shifting is operable to increment the phase shift for each symbol.

28. The transmitting apparatus as claimed in claim 21, comprising means for phase shifting at least one of the first and second filtered signals by a phase shift to produce first and second phase-shifted signals, and wherein the first and second phase-shifted signals are coupled to the means for modulating.

29. The transmitting apparatus as claimed in claim 28, wherein the means for phase shifting is configured to perform the phase shifting so that the first and second phase shifted signals are offset from each other by a phase offset.

30. The transmitting apparatus as claimed in claim 28, wherein the first and second signals each comprise a sequence of symbols, and the means for phase shifting is operable to increment the phase shift for each symbol.

31. A transmitting apparatus for transmitting a signal within a predetermined spectral mask defining a range of power density limits across a frequency range, the apparatus comprising:

a processor;

memory in electronic communication with the processor; and instructions stored in memory, the instructions being executable by the processor to:

provide a first input signal;

provide a second input signal;

low-pass filter the first input signal to produce a first filtered signal and low-pass filter the second input signal to produce a second filtered signal, the filtering being performed in one of a first mode and a second mode, in which first mode an input signal is filtered within a narrower bandwidth and in which second mode an input signal is filtered within a broader bandwidth;

modulate the first filtered signal to produce a first modulated signal and modulate the second filtered signal to produce a second modulated signal;

transmit the first modulated signal at a required power level as a transmitted signal having a spectral envelope and transmit the second modulated signal, wherein the first modulated signal and the second modulated signal are transmitted substantially simultaneously; and control the filtering depending on the required power level such that the first input signal is so filtered in the first mod; when the required power level is higher, that the spectral envelope of the transmitted signal is within the spectral mask, and is so filtered in the second mode, when the required power level is lower, that the spectral envelope of the transmitted signal remains within the spectral mask.

32. The apparatus as claimed in claim 31, wherein the instructions are executable by the processor to control the filtering in the second mode so that the spectral envelope of the transmitted signal extends across substantially the whole of the frequency range of the spectral mask.

33. The apparatus as claimed in claim 31, wherein the instructions are executable by the processor, in the first mode, to control the filtering based on the required power level when the required power level is a maximum power level.

34. The apparatus as claimed in claim 31, wherein the instructions are executable by the processor to combine the first and second modulated signals.

35. The apparatus as claimed in claim 31, wherein the instructions are executable by the processor to phase shift at least one of the first and second input signals by a phase shift to produce first and second phase-shifted signals, and to modulate the first and second phase-shifted signals.

36. The apparatus as claimed in claim 35, wherein the instructions are executable by the processor to perform the phase shifting so that the first and second phase shifted signals are offset from each other by a phase offset.

37. The apparatus as claimed in claim 35, wherein the instructions are executable by the processor to perform the phase shifting when the first and second input signals each comprise a sequence of symbols, by incrementing the phase shift for each symbol.

38. The apparatus as claimed in claim 31, wherein the instructions are executable by the processor to phase shift at least one of the first and second filtered signals by a phase shift to produce first and second phase-shifted signals, and to modulate the first and second phase-shifted signals.

39. The apparatus as claimed in claim 38, wherein the instructions are executable by the processor to perform the phase shifting so that the first and second phase shifted signals are offset from each other by a phase offset.

40. The apparatus as claimed in claim 38, wherein the instructions are executable by the processor to perform the phase shifting when the first and second input signals each comprise a sequence of symbols, by incrementing the phase shift for each symbol.

41. A computer program product, comprising:

non-transitory computer readable medium comprising:

code for causing a computer to transmit a signal within a predetermined spectral mask defining a range of power density limits across a frequency range, the code comprising instructions to:

provide a first input signal;

provide a second input signal;

low-pass filter the input signal to produce a first filtered signal and low-pass filter the second input signal to produce a second filtered signal, the filtering being performed in one of a first mode in which an input signal is filtered within a narrower bandwidth and a second mode in which an input signal is filtered within a broader bandwidth, wherein the first signal is filtered according to the first mode and the second signal is filtered according to the second mode;

modulate the first filtered signal to produce a first modulated signal and modulate the second filtered signal to produce a second modulated signal;

transmit the first modulated signal at a required power level as a transmitted signal having a spectral envelope and transmit the second modulated signal, wherein the first modulated signal and the second modulated signal are transmitted substantially simultaneously; and control the filtering depending on the required power level such that the first input signal is so filtered in the first mod; when the required power level is higher, that the spectral envelope of the transmitted signal is within the spectral mask, and is so filtered in the second mode, when the required power level is lower, that the spectral envelope of the transmitted signal remains within the spectral mask.

* * * * *